United States Patent
Garrison

(10) Patent No.: US 11,686,346 B2
(45) Date of Patent: *Jun. 27, 2023

(54) CIRCUMFERENTIAL SEAL ASSEMBLY WITH MULTI-AXIS STEPPED GROOVES

(71) Applicant: Stein Seal Company, Kulpsville, PA (US)

(72) Inventor: Glenn M. Garrison, Perkiomenville, PA (US)

(73) Assignee: Stein Seal Company, Kulpsville, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/712,233

(22) Filed: Apr. 4, 2022

(65) Prior Publication Data

US 2022/0356905 A1    Nov. 10, 2022

Related U.S. Application Data

(63) Continuation of application No. 16/747,937, filed on Jan. 21, 2020, now Pat. No. 11,333,197, which is a
(Continued)

(51) Int. Cl.
*F16J 15/40* (2006.01)
*F16C 32/06* (2006.01)
(Continued)

(52) U.S. Cl.
CPC .......... *F16C 32/0662* (2013.01); *F01D 11/04* (2013.01); *F01D 25/22* (2013.01);
(Continued)

(58) Field of Classification Search
CPC .......... F16J 15/442; F16J 15/40; F16J 14/441; F01D 11/04
See application file for complete search history.

(56) References Cited

U.S. PATENT DOCUMENTS

| 3,744,805 A | 7/1973 | Heinrich |
| 4,212,475 A | 7/1980 | Sedy |

(Continued)

FOREIGN PATENT DOCUMENTS

| CN | 101644333 A | 2/2010 |
| EP | 0745794 A1 | 12/1996 |

(Continued)

OTHER PUBLICATIONS

Supplementary European Search Report issued by the European Patent Office under Application No. EP19833101 9, dated Feb. 16, 2022, 8 pages.

(Continued)

*Primary Examiner* — Vishal A Patel
(74) *Attorney, Agent, or Firm* — Michael Crilly, Esquire

(57) ABSTRACT

A circumferential seal assembly suitable for forming a thin film between a rotatable runner and a sealing ring is presented. The assembly includes an annular seal housing, a rotatable runner, an annular seal ring, and a plurality of groove structures. Each groove structure includes a groove and an optional feed groove. The groove includes at least two adjoining steps defined by base walls arranged to decrease depthwise. Two adjoining base walls are disposed about a base shoulder. Each base shoulder locally redirects a longitudinal flow to form an outward radial flow in the direction of the annular seal ring. The base walls are bounded by and intersect a pair of side walls. A side wall includes side shoulders which narrows the groove widthwise and locally redirects the longitudinal flow to form a lateral flow in the direction of the other side wall. Outward and lateral flows separately or in combination enhance stiffness of a thin-film layer between the annular seal ring and the rotatable runner.

20 Claims, 35 Drawing Sheets

Related U.S. Application Data continuation-in-part of application No. 16/167,708, filed on Oct. 23, 2018, now Pat. No. 10,948,014, and a continuation-in-part of application No. 16/030,927, filed on Jul. 10, 2018, now Pat. No. 10,711,839, which is a continuation-in-part of application No. 15/899,813, filed on Feb. 20, 2018, now Pat. No. 10,648,507, which is a continuation of application No. 14/845,947, filed on Sep. 4, 2015, now Pat. No. 9,970,482, which is a continuation-in-part of application No. 14/396,101, filed as application No. PCT/US2014/033736 on Apr. 11, 2014, now Pat. No. 9,194,424.

(60) Provisional application No. 61/811,900, filed on Apr. 15, 2013.

(51) Int. Cl.
    *F01D 11/04*    (2006.01)
    *F01D 25/22*    (2006.01)
    *F16J 15/44*    (2006.01)

(52) U.S. Cl.
    CPC ...... *F16C 32/0607* (2013.01); *F16C 32/0625* (2013.01); *F16J 15/40* (2013.01); *F16J 15/441* (2013.01); *F16J 15/442* (2013.01); *F05D 2250/75* (2013.01); *F16C 2360/23* (2013.01)

(56) References Cited

U.S. PATENT DOCUMENTS

| | | | |
|---|---|---|---|
| 4,471,963 A | 9/1984 | Airhart | |
| 5,090,712 A | 2/1992 | Pecht et al. | |
| 5,301,957 A | 4/1994 | Hwang et al. | |
| 5,441,283 A * | 8/1995 | Pecht | F16J 15/3412 277/400 |
| 5,447,316 A | 9/1995 | Matsui | |
| 5,498,007 A | 3/1996 | Kulkarni et al. | |
| 5,503,407 A | 4/1996 | McNickle | |
| 5,529,317 A * | 6/1996 | Muller | F16J 15/3404 277/400 |
| 5,605,339 A | 2/1997 | Pecht et al. | |
| 6,142,478 A | 11/2000 | Pecht et al. | |
| 6,425,583 B1 | 7/2002 | Muraki | |
| 6,726,213 B2 | 4/2004 | Wang | |
| 7,044,470 B2 | 5/2006 | Zhang | |
| 7,134,667 B2 | 11/2006 | Weiler | |
| 7,549,836 B2 | 6/2009 | Anderson et al. | |
| 7,648,143 B2 | 1/2010 | Davis et al. | |
| 7,744,094 B2 | 6/2010 | Yanagisawa et al. | |
| 7,905,495 B2 | 3/2011 | Munson | |
| 7,931,277 B2 | 4/2011 | Garrison | |
| 8,091,898 B2 | 1/2012 | Garrison | |
| 8,408,555 B2 | 4/2013 | Garrison | |
| 8,888,104 B2 | 11/2014 | Garrison | |
| 8,905,408 B2 | 12/2014 | Garrison | |
| 9,039,013 B2 | 5/2015 | Artiles et al. | |
| 9,062,775 B2 | 6/2015 | Short et al. | |
| 9,194,424 B2 | 11/2015 | Garrison | |
| 9,970,482 B2 | 5/2018 | Garrison | |
| 2003/0209859 A1 | 11/2003 | Young et al. | |
| 2007/0296156 A1 | 12/2007 | Yanagisawa | |
| 2008/0284105 A1 | 11/2008 | Vasagar et al. | |
| 2010/0164180 A1 | 7/2010 | Short | |
| 2011/0049809 A1 | 3/2011 | Garrison | |
| 2011/0210518 A1 | 9/2011 | Vasagar et al. | |
| 2011/0250056 A1 | 10/2011 | Munson | |
| 2012/0217703 A1 | 8/2012 | Garrison | |
| 2012/0280456 A1 | 11/2012 | Young | |
| 2013/0241153 A1 | 9/2013 | Garrison | |
| 2015/0049968 A1 | 2/2015 | Garrison | |
| 2016/0169394 A1 | 6/2016 | Ranz et al. | |
| 2017/0051834 A1 | 2/2017 | Webster et al. | |
| 2018/0180096 A1 | 6/2018 | Garrison | |

FOREIGN PATENT DOCUMENTS

| | | |
|---|---|---|
| EP | 0935086 B1 | 11/2004 |
| EP | 2754930 A1 | 7/2014 |
| KR | 1020120043504 A | 5/2012 |
| KR | 1020160065127 A | 6/2016 |
| WO | 2020013950 A1 | 1/2020 |

OTHER PUBLICATIONS

International Search Report prepared by the Korean Intellectual Property Office under Application No. PCT/US2021/012398, dated Apr. 13, 2021, 4 pages.
Written Opinion of the International Searching Authority prepared by the Korean Intellectual Property Office under Application No. PCT/US2021/012398, dated Apr. 13, 2021, 6 pages.
International Search Report for PCT/US2019/037153 by the Korean Intellectual Property Office; dated Oct. 15, 2019; 5 pages.
Written Opinion for PCT/US2019/037153 by the Korean Intellectual Property Office; completed Oct. 14, 2019; 6 pages.
Reply to International Search Report and Written Opinion for Patent Cooperation Treaty Application No. PCT/US2016/048309.
International Preliminary Examination Report issued by the South Korean Intellectual Property Office (KIPO) for Patent Cooperation Treaty Application No. PCT/US2016/048309.
International Search Report for PCT/US2019/040807 by the Korean Intellectual Property Office; dated Oct. 22, 2019; 4 pages.
Written Opinion for PCT/US2019/040807 by the Korean Intellectual Property Office; completed Oct. 21, 2019; 6 pages.

* cited by examiner $L = L_d \cos(\alpha)$

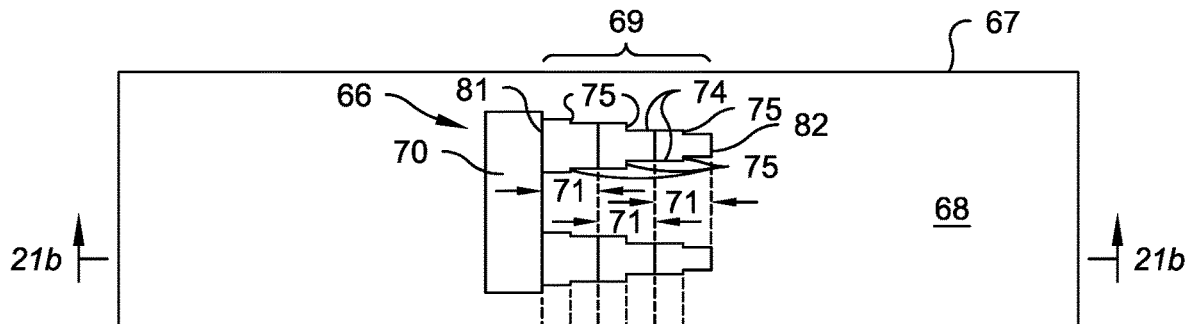
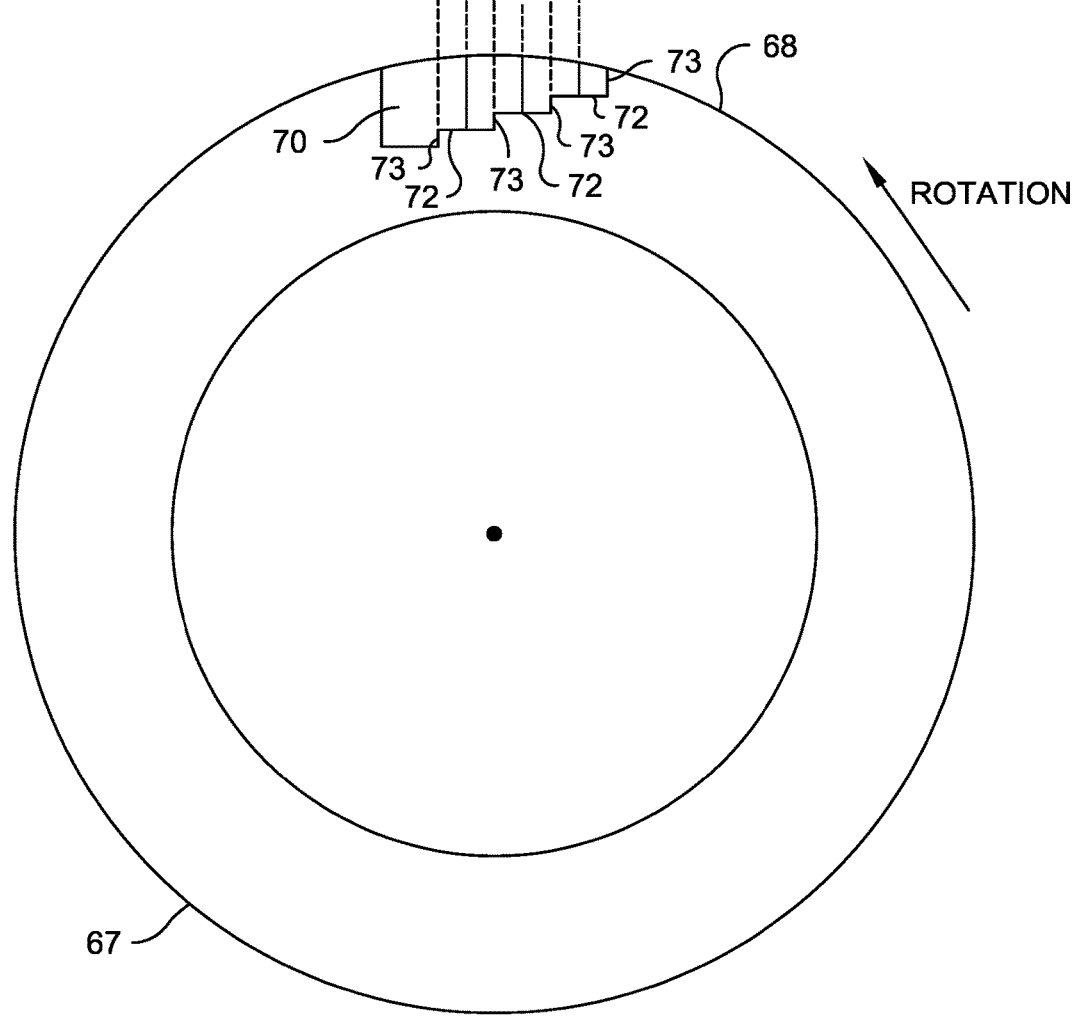

*Fig. 25a*
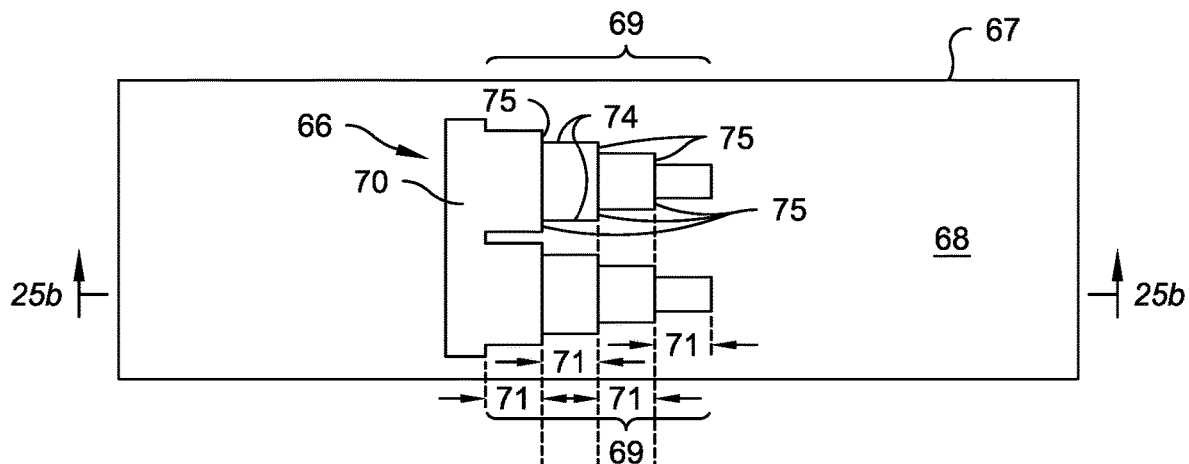
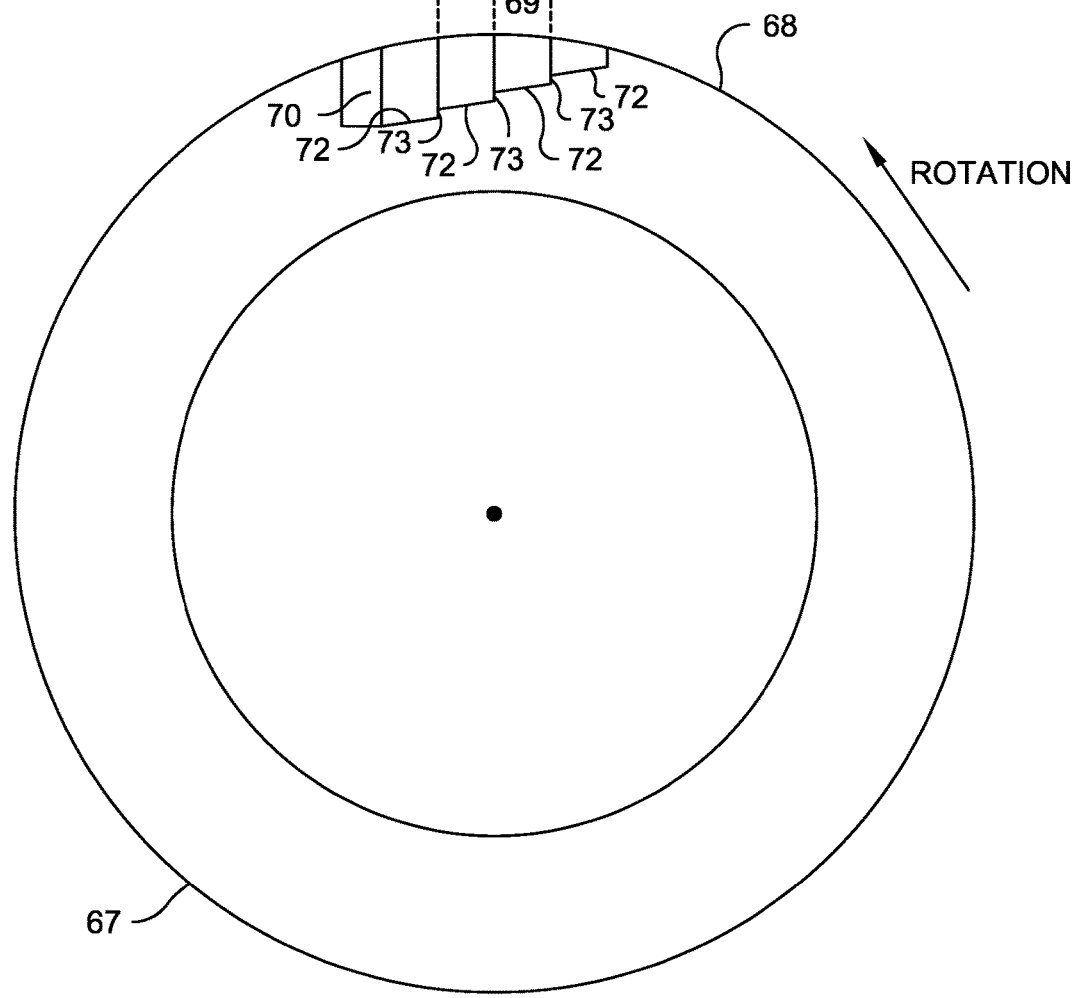
*Fig. 25b*

*Fig. 26a*
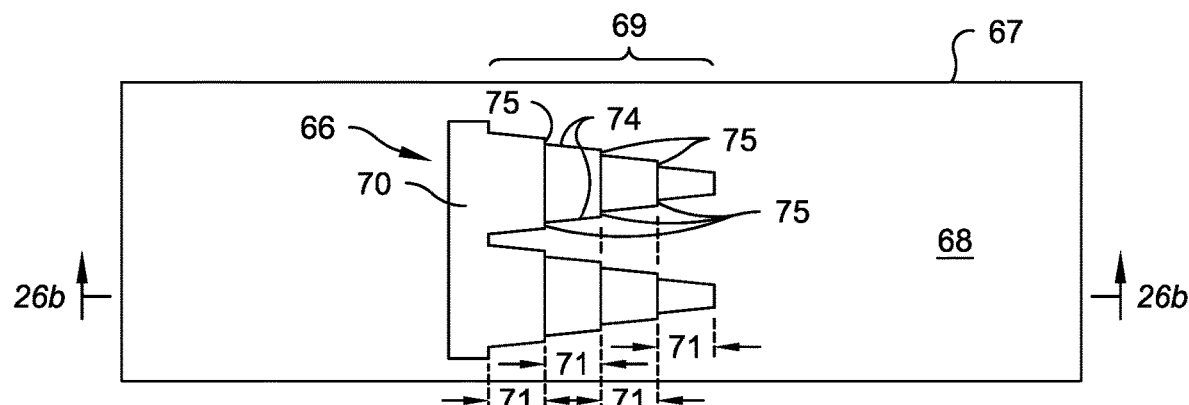
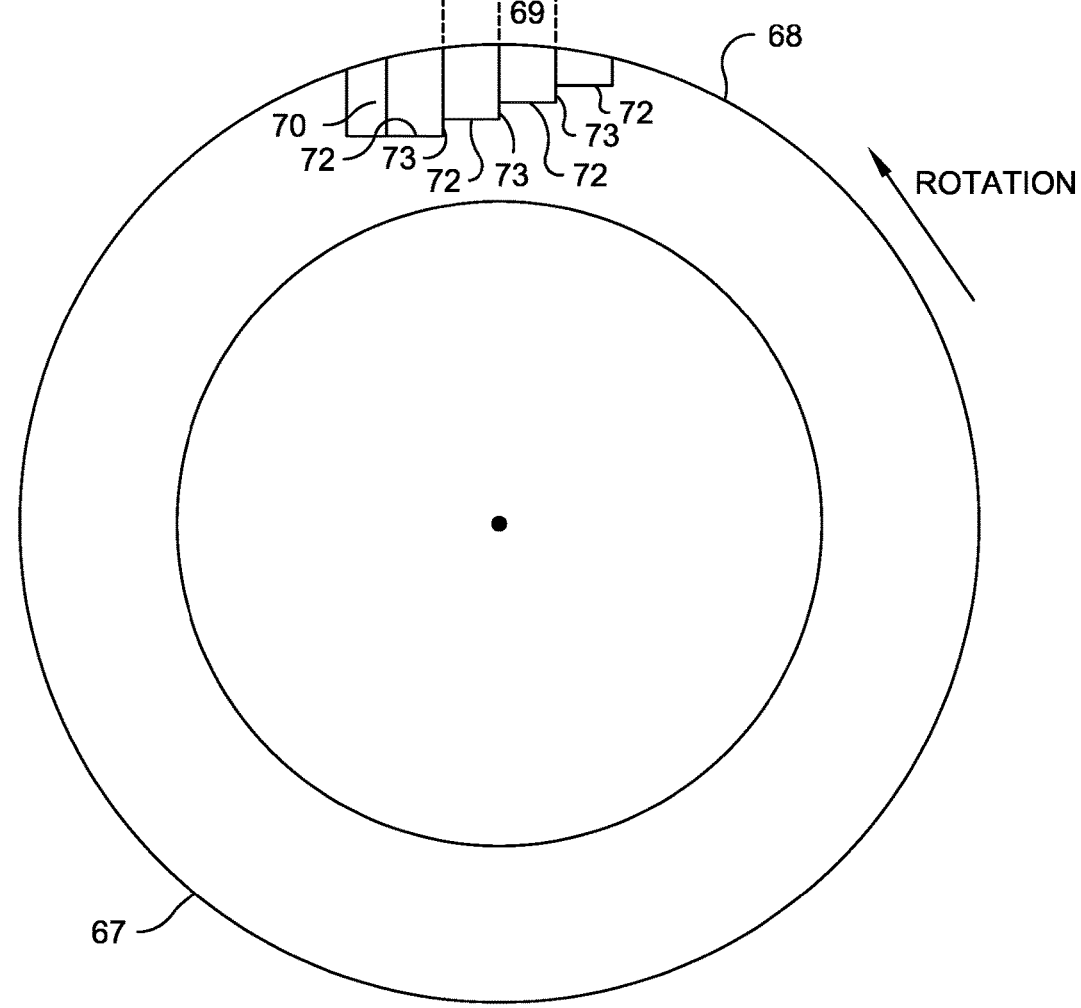
*Fig. 26b*

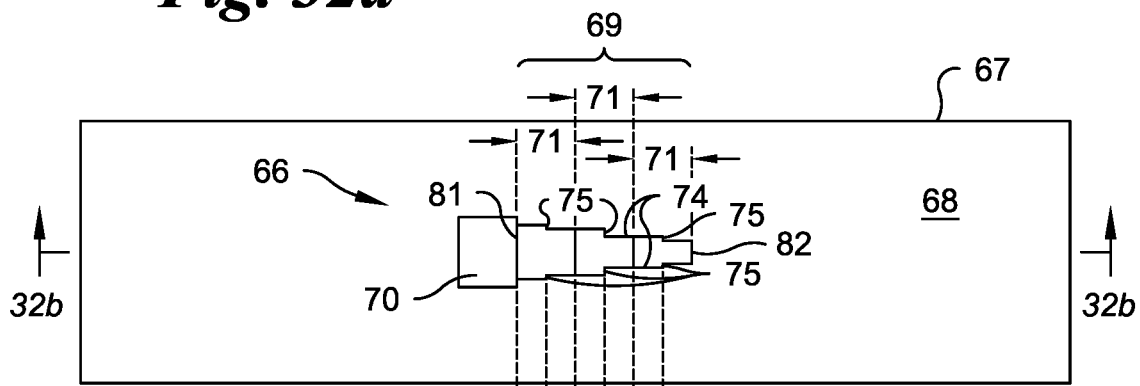
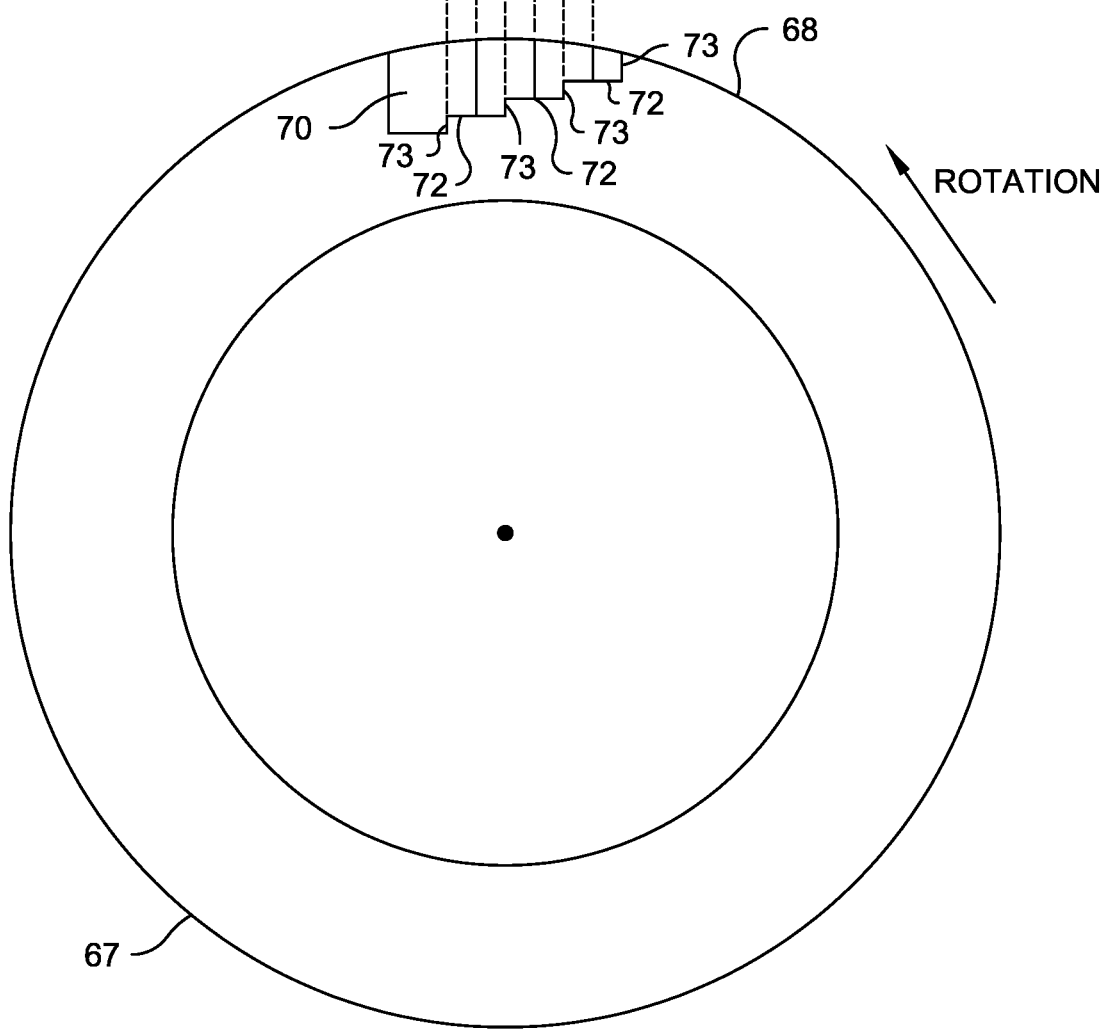

*Fig. 36a*
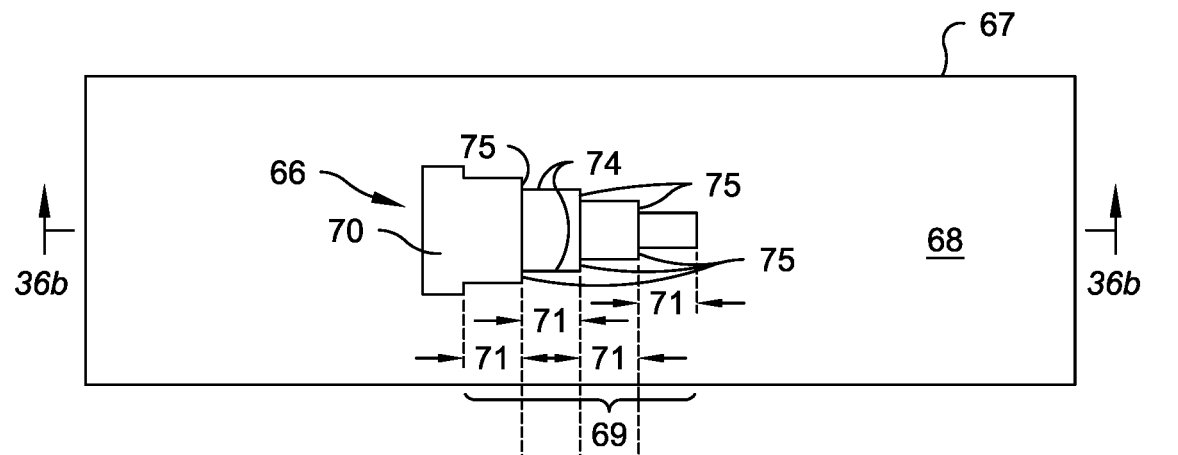
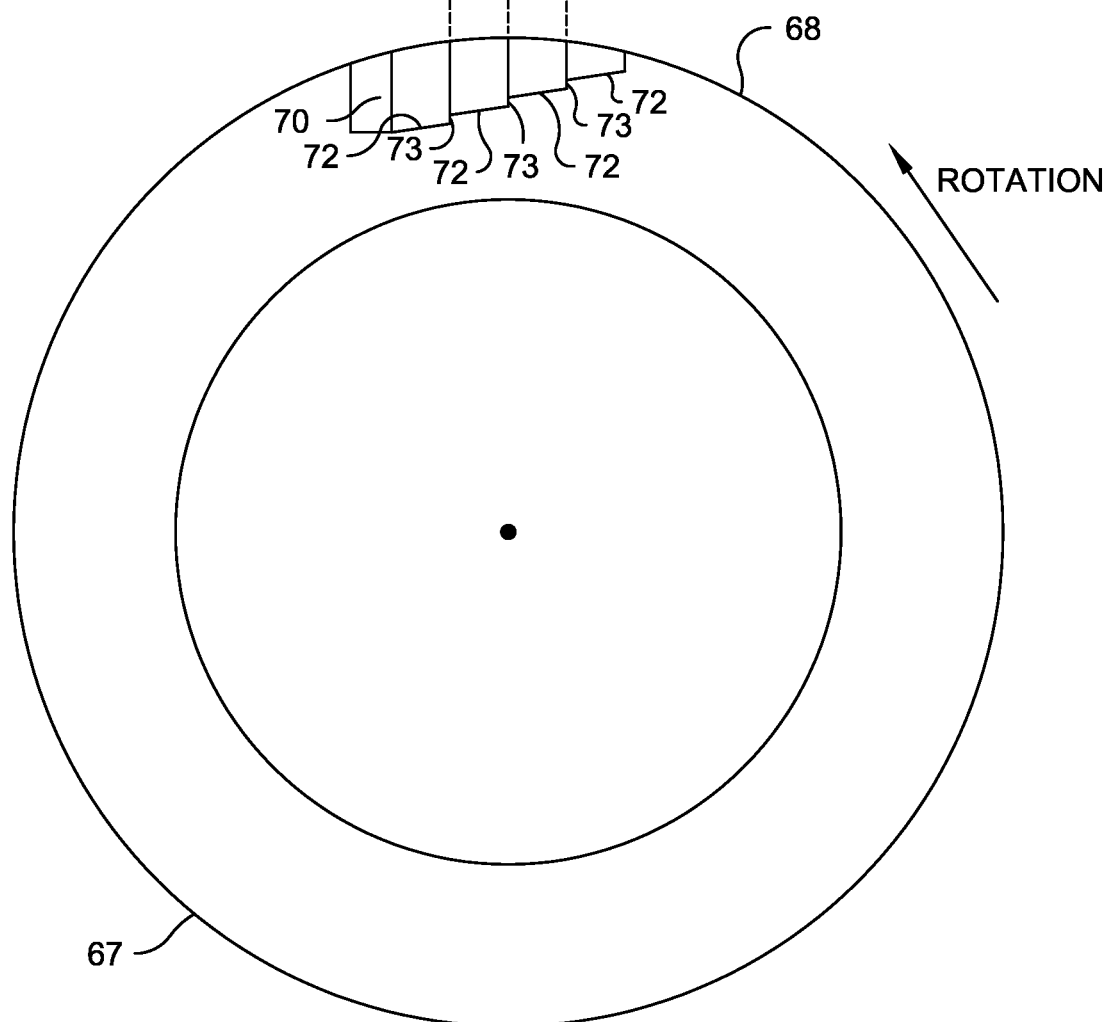
*Fig. 36b*

CIRCUMFERENTIAL SEAL ASSEMBLY WITH MULTI-AXIS STEPPED GROOVES

CROSS REFERENCE TO RELATED APPLICATIONS

This application is a continuation of U.S. patent application Ser. No. 16/747,937 filed Jan. 21, 2020 which is a continuation-in-part of U.S. patent application Ser. No. 16/030,927 filed Jul. 10, 2018 now U.S. Pat. No. 10,711,839 which is a continuation-in-part of U.S. patent application Ser. No. 15/899,813 filed Feb. 20, 2018 now U.S. Pat. No. 10,648,507 which is a continuation of U.S. patent application Ser. No. 14/845,947 filed Sep. 4, 2015 now U.S. Pat. No. 9,970,482 which is a continuation-in-part of U.S. patent application Ser. No. 14/396,101 filed Oct. 22, 2014 now U.S. Pat. No. 9,194,424 which is a National Phase of PCT Application No. PCT/US2014/033736 filed Apr. 11, 2014 which further claims priority from U.S. Provisional Application No. 61/811,900 filed Apr. 15, 2013.

This application is a continuation of U.S. patent application Ser. No. 16/747,937 filed Jan. 21, 2020 which is also a continuation-in-part of U.S. patent application Ser. No. 16/167,708 filed Oct. 23, 2018 now U.S. Pat. No. 10,948,014.

The subject matters of the prior applications are incorporated in their entirety herein by reference thereto.

GOVERNMENT SPONSORED RESEARCH AND DEVELOPMENT

None.

BACKGROUND OF THE INVENTION

1. Field of the Invention

The invention generally relates to a circumferential seal assembly for use within a gas turbine engine and more particularly is concerned, for example, with at least one annular seal ring disposed within an annular seal housing about a rotatable runner attached to a shaft, wherein the runner further includes a plurality of hydrodynamic grooves with both laterally-disposed steps and vertically-disposed steps which separate and direct flow onto the annular seal ring to form a thin-film layer sealing one compartment from another compartment.

2. Background

Turbine engines typically include a housing with compartments therein and a rotatable shaft that passes through adjoining compartments separately including at least one of a gas, a lubricant, or other fluid. Adjoining compartments must be isolated from one another by means of a sealing system that prevents one fluid from migrating along a rotatable shaft and entering a compartment so as to mix with another fluid therein.

By way of example to an aircraft engine, leakage of a lubricant or a gas across a seal into a neighboring compartment may cause oil coking or an engine fire. Oil coke is a byproduct formed when an oil lubricant and a gas mix at a temperature that chemically alters the oil. Oil coke can foul sealing surfaces thereby degrading bearing lubrication and impairing the integrity of a seal. It is important in similar applications, not just aircraft engines, that a lubricant be isolated within a lubricant sump and that a seal around a rotating shaft not allow a lubricant to escape the sump or a hot gas to enter the sump. Many applications will include either a circumferential seal or a face seal to prevent mixing of an oil lubricant and a hot gas; however, circumferential shaft seals are the most widely used under the above-noted conditions.

Presently known circumferential seal designs are particularly problematic when the pressure differential between compartments does not permit formation of a thin-film layer adequately capable of preventing migration of a fluid along the interface between a seal ring and a shaft.

Presently known circumferential seal designs are further problematic when used in conjunction with a translatable runner. The temperatures and/or mechanical loads within a turbine engine often cause a runner, and sealing surface thereon, to translate along the axial dimension of an engine. The result is a sealing interface that is difficult to optimize over the operational range of a turbine engine.

Accordingly, what is required is a circumferential seal assembly interposed between compartments that minimizes degradation to and/or failure of a seal between a rotatable runner and at least one seal element.

SUMMARY OF THE INVENTION

An object of the invention is to provide a circumferential seal assembly interposed between compartments that minimizes degradation to and/or failure of a seal between a rotatable runner and at least one seal element.

In accordance with embodiments of the invention, the circumferential seal assembly includes an annular seal housing, a rotatable runner, an annular seal ring, and a plurality of groove structures. The annular seal housing is disposed between a pair of compartments. The annular seal ring is disposed within the annular seal housing and disposed about the rotatable runner. The groove structures are disposed along an outer annular surface of the rotatable runner. Each groove structure includes a groove. The annular seal ring is disposed about the grooves. A source flow is communicated into the groove to form a longitudinal flow therein. Each groove includes at least two adjoining steps whereby each step is defined by a base wall. The base walls are arranged along the groove to decrease depthwise in direction opposite to rotation of the rotatable runner. Two adjoining base walls are disposed about a base shoulder. Each base shoulder locally redirects the longitudinal flow to form an outward radial flow in direction of the annular seal ring. The base walls are bounded by and intersect a pair of side walls. Each side wall includes at least one side shoulder which narrows the groove widthwise and locally redirects the longitudinal flow away from the side wall to form a lateral flow in direction of another side wall.

In accordance with other embodiments of the invention, one side shoulder along each side wall intersects one base shoulder so that the outward radial flow and the lateral flows interact.

In accordance with other embodiments of the invention, one base shoulder is disposed between a pair of side shoulders along each side wall.

In accordance with other embodiments of the invention, two side shoulders upstream of a base shoulder are disposed in an opposed arrangement.

In accordance with other embodiments of the invention, two side shoulders downstream of a base shoulder are disposed in an opposed arrangement.

In accordance with other embodiments of the invention, two side shoulders upstream of a base shoulder are disposed in an offset arrangement.

In accordance with other embodiments of the invention, two side shoulders downstream of a base shoulder are disposed in an offset arrangement.

In accordance with other embodiments of the invention, a side shoulder along one side wall is disposed upstream from a base shoulder.

In accordance with other embodiments of the invention, a side shoulder along one side wall is disposed downstream from a base shoulder.

In accordance with other embodiments of the invention, one side shoulder intersects a base shoulder.

In accordance with other embodiments of the invention, the base shoulder is disposed between two other side shoulders.

In accordance with other embodiments of the invention, two other side shoulders are disposed along one side wall and a side shoulder disposed along another side wall intersects a base shoulder.

In accordance with other embodiments of the invention, one of two other side shoulders is disposed along the same side wall as a side shoulder which intersects the base shoulder.

In accordance with other embodiments of the invention, a depth of each of two side shoulders are equal.

In accordance with other embodiments of the invention, a depth of each of two side shoulders differ.

In accordance with other embodiments of the invention, a depth of each of one side shoulder and one base shoulder differ.

In accordance with other embodiments of the invention, a depth of each of one side shoulder and one base shoulder are equal.

In accordance with other embodiments of the invention, at least one base wall is tapered.

In accordance with other embodiments of the invention, at least one side wall is tapered.

In accordance with other embodiments of the invention, base walls and side walls are tapered.

In accordance with other embodiments of the invention, at least one groove structure includes a feed groove disposed to receive the source flow and to communicate the source flow into a groove.

In accordance with other embodiments of the invention, the source flow passes through an inlet along the annular seal housing and around the annular seal ring before received by a feed groove.

In accordance with other embodiments of the invention, the source flow passes through an inlet along the rotatable runner before entering a feed groove.

In accordance with other embodiments of the invention, the feed groove is biased toward one compartment and the source flow is received by the feed groove adjacent to the compartment.

In accordance with method embodiments of the invention, a method for forming a thin-film layer between an annular seal ring and a rotatable runner is provided by communicating, forming, and redirecting steps. A source flow is communicated into a groove disposed along the rotatable runner. The annular seal ring is disposed about the rotatable runner and the groove. A longitudinal flow is formed within the groove from the source flow. The longitudinal flow is redirected via interaction with a base shoulder interposed between a pair of base walls to form an outward radial flow adjacent to the base shoulder. The base walls are disposed between a pair of side walls. The base walls are arranged along the groove to decrease depthwise in the direction opposite to rotation of the rotatable runner. The longitudinal flow is redirected via interaction with a side shoulder along at least one side wall to form a lateral flow in the direction of another side wall. The lateral flow and the outward radial flow are perpendicular to one another and to the longitudinal flow.

In accordance with other method embodiments of the invention, the method further includes the step of converging at least one lateral flow with the outward radial flow when at least one side shoulder intersects the base shoulder whereby the side shoulder(s) and the base shoulder are aligned along a plane that traverses a groove. The converging step enhances the stiffness of a thin-film layer between the annular seal ring and the rotatable runner.

In accordance with other method embodiments of the invention, at least one lateral flow is formed downstream from an outward radial flow.

In accordance with other method embodiments of the invention, at least one lateral flow is formed upstream from an outward radial flow.

In accordance with other method embodiments of the invention, the method further includes the step of converging the lateral flow from one side wall with another lateral flow from another side wall when the side shoulders are disposed in an opposed arrangement whereby the side shoulders are aligned along a plane that traverses the groove. The converging step enhances the stiffness of a thin-film layer between the annular seal ring and the rotatable runner.

In accordance with other method embodiments of the invention, the method further includes the step of impinging one side wall by the lateral flow formed by the side shoulder along another side wall. The impinging step enhances the stiffness of a thin-film layer between the annular seal ring and the rotatable runner.

In accordance with other method embodiments of the invention, the communicating step include the source flow passing through a feed groove before entering into the groove.

In accordance with other method embodiments of the invention, the source flow passes around the annular seal ring before entering the feed groove.

In accordance with other method embodiments of the invention, the source flow passes through a hole along the rotatable runner before entering the feed groove.

In accordance with other method embodiments of the invention, the feed groove extends toward a compartment at one side of the rotatable runner and the source flow originates from the compartment.

An advantage of the invention, by way of example, is that it facilitates a circumferential seal along a rotatable/translatable runner which minimizes mixing of fluids between adjacent compartments.

The above and other objectives, features, and advantages of the preferred embodiments of the invention will become apparent from the following description read in connection with the accompanying drawings, in which like reference numerals designate the same or similar elements.

BRIEF DESCRIPTION OF THE DRAWINGS

Additional aspects, features, and advantages of the invention will be understood and will become more readily apparent when the invention is considered in the light of the following description made in conjunction with the accompanying drawings.

FIG. 21a is a circumferential side view illustrating a rotatable runner with a groove structure including a feed groove communicating with grooves whereby each groove further includes side shoulders and base shoulders which are offset and the side shoulders arranged in an opposed arrangement in accordance with an embodiment of the invention.

FIG. 21b is a cross section view illustrating a rotatable runner with a groove structure including a feed groove communicating with grooves whereby each groove further includes side shoulders and base shoulders which are offset and the side shoulders arranged in an opposed arrangement in accordance with an embodiment of the invention.

FIG. 25a is a circumferential side view illustrating a rotatable runner with a groove structure including a feed groove communicating with grooves whereby each groove further includes side shoulders disposed along parallel side walls and base shoulders disposed between tapered base walls which intersect and the side shoulders arranged in an opposed arrangement in accordance with an embodiment of the invention.

FIG. 25b is a cross section view illustrating a rotatable runner with a groove structure including a feed groove communicating with grooves whereby each groove further includes side shoulders disposed along parallel side walls and base shoulders disposed between tapered base walls which intersect and the side shoulders arranged in an opposed arrangement in accordance with an embodiment of the invention.

FIG. 26a is a circumferential side view illustrating a rotatable runner with a groove structure including a feed groove communicating with grooves whereby each groove further includes side shoulders disposed along tapered side walls and base shoulders disposed between parallel base walls in accordance with an embodiment of the invention.

FIG. 26b is a cross section view illustrating a rotatable runner with a groove structure including a feed groove communicating with grooves whereby each groove further includes side shoulders disposed along tapered side walls and base shoulders disposed between parallel base walls in accordance with an embodiment of the invention.

FIG. 32a is a circumferential side view illustrating a rotatable runner with a groove structure including a feed groove communicating with a groove whereby the groove further includes side shoulders and base shoulders which are offset and the side shoulders arranged in an opposed arrangement in accordance with an embodiment of the invention.

FIG. 32b is a cross section view illustrating a rotatable runner with a groove structure including a feed groove communicating with a groove whereby the groove further includes side shoulders and base shoulders which are offset and the side shoulders arranged in an opposed arrangement in accordance with an embodiment of the invention.

FIG. 36a is a circumferential side view illustrating a rotatable runner with a groove structure including a feed groove communicating with a groove whereby the groove further includes side shoulders disposed along parallel side walls and base shoulders disposed between tapered base walls which intersect and the side shoulders arranged in an opposed arrangement in accordance with an embodiment of the invention.

FIG. 36b is a cross section view illustrating a rotatable runner with a groove structure including a feed groove communicating with a groove whereby the groove further includes side shoulders disposed along parallel side walls and base shoulders disposed between tapered base walls which intersect and the side shoulders arranged in an opposed arrangement in accordance with an embodiment of the invention.

DETAILED DESCRIPTION OF THE INVENTION

Figure 1:
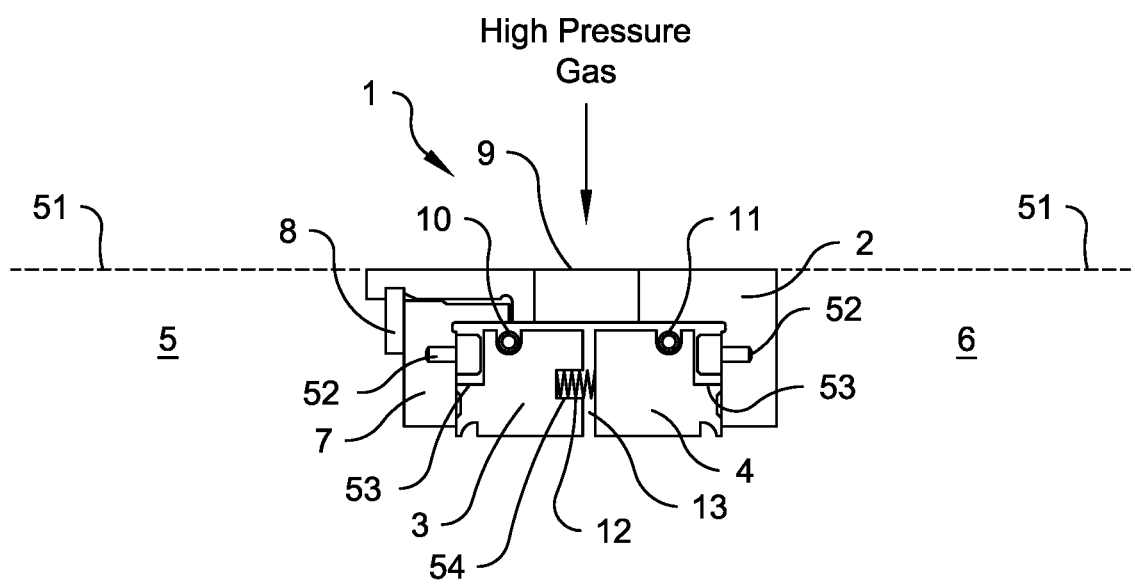
FIG. 1 is an enlarged cross section view illustrating an annular seal assembly including a pair of annular seal rings separated by a gap within a seal housing disposed about a runner attached to a shaft (cross section of annular seal assembly below centerline, runner, and shaft not shown) rotatable about a centerline within a turbine engine in accordance with an embodiment of the invention.

Reference will now be made in detail to several embodiments of the invention that are illustrated in the accompanying drawings. Wherever possible, same or similar reference numerals are used in the drawings and the description to refer to the same or like parts. The drawings are in simplified form and are not to precise scale.

While features of various embodiments are separately described throughout this document, it is understood that two or more such features are combinable to form other embodiments.

Referring now to FIG. 1, a seal assembly 1 is shown with an annular seal housing 2, a first annular seal ring 3, and a second annular seal ring 4, each disposed so as to be circumferentially arranged about a rotatable runner 15 (not shown). Components are composed of materials understood in the art. The rotatable runner 15 (see FIG. 2) is an element known within the art attached to a rotatable shaft. The rotatable runner 15 is rotatable within a turbine engine via the shaft. A seal is formed along the rotatable runner 15 by each annular seal ring 3, 4. The annular seal housing 2, annular seal rings 3, 4, and rotatable runner 15 are aligned along and disposed about a centerline 14, often coinciding with a rotational axis within a turbine engine. The annular seal housing 2 is attached to components comprising the housing structure 51 (generally shown) of a turbine engine fixing the annular seal housing 2 thereto. The housing structure 51 is stationary and therefore non-rotating. The housing structure 51, seal assembly 1, and the rotatable runner 15 generally define at least a first compartment 5 and a second compartment 6. The configuration of the housing structure 51 is design dependent; however, it is understood for purposes of the present invention that the housing structure 51 cooperates with the seal assembly 1 and rotatable runner 15 to define two separate compartments whereby a gas resides at a low pressure within one such compartment 5 and a lubricant resides at low pressure within another compartment 6.

The annular seal housing 2 generally defines a pocket within which the annular seal rings 3, 4 reside. The annular seal housing 2 has a U-shaped cross-section opening inward toward the centerline 14. One end of the annular seal housing 2 could include an insert 7 and a retaining ring 8 which allow for assembly/disassembly of the annular seal rings 3, 4 onto the annular seal housing 2. The annular seal rings 3, 4 could be fixed to the annular seal housing 2 via means known within the art to limit or to prevent relative rotational motion between the annular seal rings 3, 4 and the annular seal housing 2. In one non-limiting example, a pair of anti-rotation pins 52 is secured to the annular seal housing 2 to separately engage a pocket 53 along each of the first and second annular seal rings 3, 4. Interaction between the anti-rotation pin 52 and the pocket 53 functions as a positive stop to restrict rotation of each of the first and second annular seal rings 3, 4 with respect to the annular seal housing 2.

The first and second annular seal rings 3, 4 are ring-shaped elements. Each annular seal ring 3, 4 could be composed of at least two arcuate segments which form a generally circular-shaped ring when assembled about a rotatable runner 15. The segments of the first and second annular seal rings 3, 4 allow for radial expansion and contraction by the respective annular seal rings 3, 4 about a rotatable runner 15. Each annular seal ring 3, 4, is generally biased toward a rotatable runner 15 via a compressive force applied by a garter spring 10, 11. The garter spring 10, 11 could contact the outer circumference of the respective annular seal ring 3, 4 and apply a compressive force inward toward the rotatable runner 15.

A plurality of springs 12 could be separately positioned between the annular seal rings 3, 4. The springs 12 could be evenly spaced about the circumference of the annular seal rings 3, 4 so as to exert a generally uniform separation force onto the seal rings 3, 4. The springs 12 could be a coil-type device which generally resists compression. Each spring 12 could be attached or fixed to one annular seal ring 3, 4. For example, one end of each spring 12 could be partially recessed within a pocket 54 along at least one annular seal ring 3, 4. Each spring 12 should be sufficiently long so as to at least partially compress when assembled between the annular seal rings 3, 4. This arrangement ensures that each spring 12 exerts a force onto the annular seal rings 3, 4 causing the annular seal rings 3, 4 to separate, thereby pressing the annular seal rings 3, 4 onto opposite sides of the annular seal housing 2. The separation force exerted by the compression spring 12 ensures a gap 13 between the annular seal rings 3, 4.

At least one inlet 9 is disposed along an outer wall of the annular seal housing 2. The inlet(s) 9 is/are positioned so as to at least partially overlay the gap 13 between the annular seal rings 3, 4. Two or more inlets 9 could be uniformly positioned about the circumference of the annular seal housing 2. Each inlet 9 is a pathway through which a gas is communicated into and through the gap 13 between the annular seal rings 3, 4.

Figure 4:
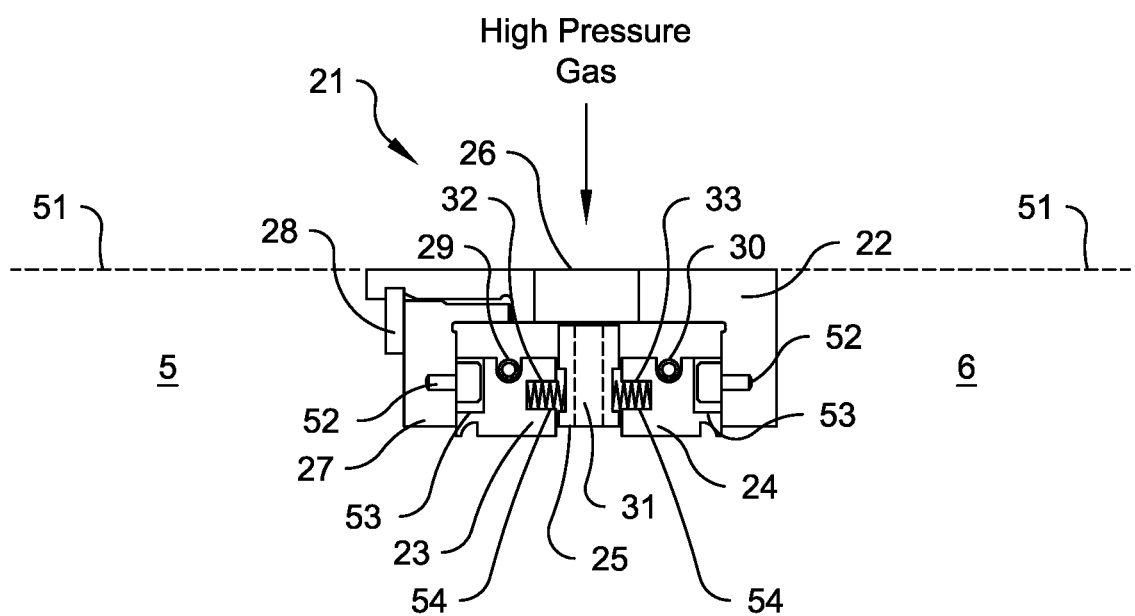
FIG. 4 is an enlarged cross section view illustrating an annular seal assembly including a pair of annular seal rings separated by a center ring within a seal housing disposed about a runner attached to a shaft (cross section of annular seal assembly below centerline, runner, and shaft not shown) rotatable about a centerline within a turbine engine in accordance with an embodiment of the invention.

Although various embodiments are described including a gap 13, it is understood that the gap 13 as described in FIG. 1 is an optional feature and that such embodiments could include a center ring 25 with optional gaps or optional holes 31 as shown in FIG. 4.

Figure 2:
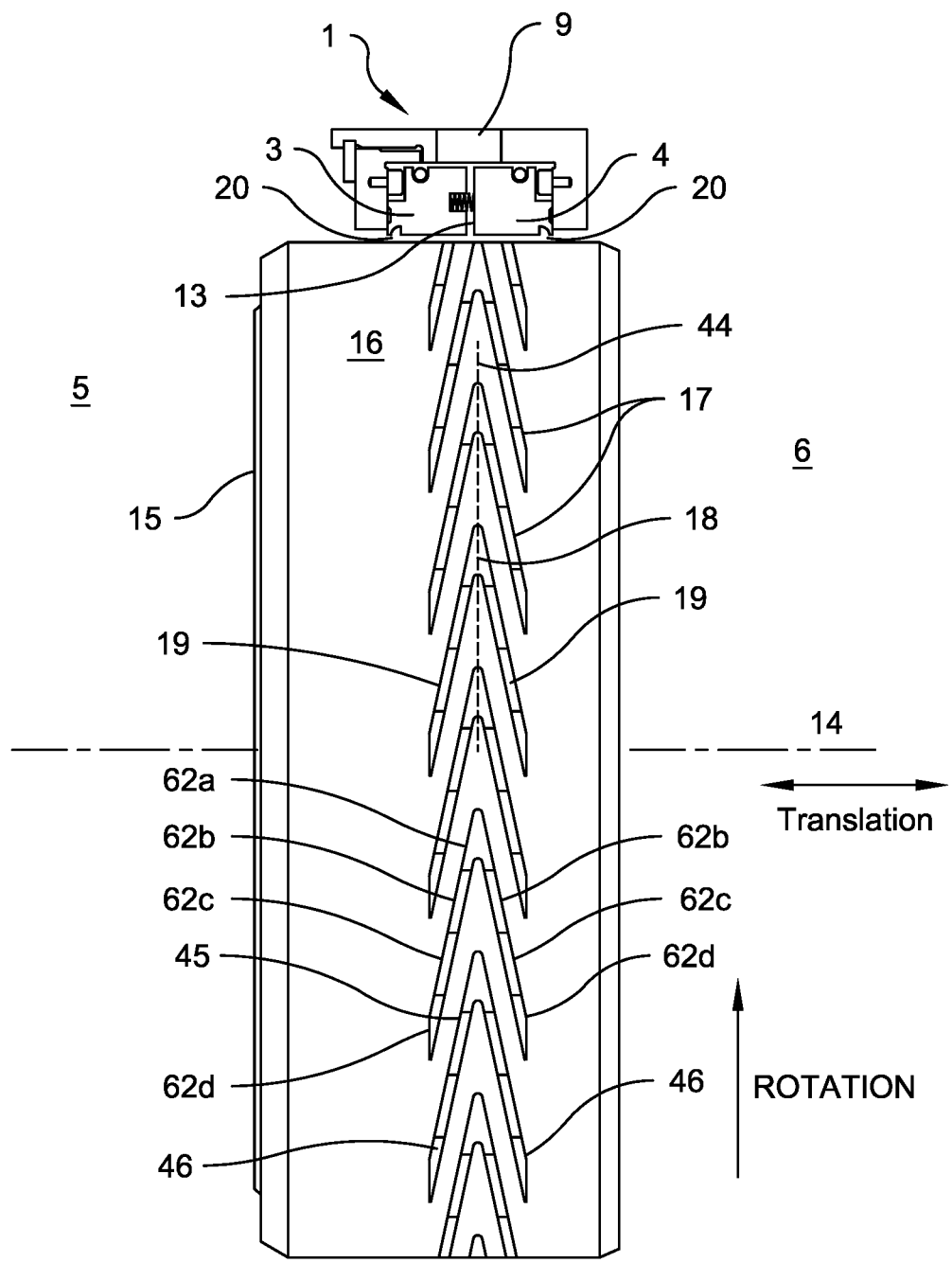
FIG. 2 is a partial cross section view illustrating an annular seal assembly including a pair of annular seal rings separated by a gap within a seal housing disposed about a rotatable runner attached to a shaft (cross section of annular seal assembly below runner and shaft not shown) wherein an outer annular surface along the runner includes a plurality of groove structures separately disposed thereon whereby each groove includes at least two steps and each groove structure communicates with both seal rings in accordance with an embodiment of the invention.

Referring now to FIG. 2, a seal assembly 1 is shown in cross-sectional form disposed about a rotatable runner 15, the latter illustrated in side-view form. The rotatable runner 15 includes a plurality of groove structures 17. The groove structures 17 are arranged circumferentially along the outer annular surface 16 of the rotatable runner 15 immediately adjacent to the seal assembly 1. The groove structures 17 are positioned so as to communicate a gas onto the annular seal rings 3, 4 as the rotatable runner 15 rotates with respect to the seal assembly 1. In some embodiments, it might be advantageous for adjacent grooves structures 17 to partially overlap as represented in FIG. 2. In other embodiments, adjacent groove structures 17 could be arranged in an end-to-end configuration or with a separation between the end of one groove structure 17 and the start of the next groove structure 17.

Each groove structure 17 further includes a pair of diagonal grooves 19 disposed about a central axis 44 circumferentially along the outer annular surface 16 of the rotatable runner 15. The diagonal grooves 19 could be aligned symmetrically or non-symmetrically about the central axis 44. Each diagonal groove 19 is a channel, depression, flute, or the like disposed along the outer annular surface 16. Although the diagonal grooves 19 are represented as linear elements, it is understood that other designs are possible including multi-linear and non-linear configurations. The central axis 44 could align with the gap 13 between the first and second annular seal rings 3, 4 or reside adjacent to the first and second annular seal rings 3, 4 to allow communication of a gas onto the groove structure 17 over the translational range of the rotatable runner 15. The diagonal grooves 19 are oriented so that the top of the left side extends toward the right and the top of the right side extends toward the left. The inward oriented ends of the diagonal grooves 19 intersect along or near the central axis 44 to form an apex 18. The apex 18 is further oriented toward the rotational direction of the rotatable runner 15 so that the diagonal grooves 19 expand outward opposite of the rotational direction. The dimensions and angular orientation of the diagonal grooves 19 and the apex 18 are design dependent and based in part on the translational range of the rotatable runner 15, the widths of the annular seal rings 3, 4 and gap 13, the extent of overlap or non-overlap between adjacent groove structures 17, the pressure required to adequately seal the interface between the rotatable runner 15 and the annular seal rings 3, 4, and/or other design factors.

Each diagonal groove 19 further includes at least two optional steps 62a-62d. Although four steps 62a-62d are illustrated along each diagonal groove 19 in FIG. 2, it is understood that two or more such steps 62a-62d may reside along each diagonal groove 19. Each step 62a-62d corresponds to a change in the local depth of the diagonal groove 19 relative to the outer annular surface 16. For example, if a diagonal groove 19 includes two steps 62a, 62b, then one step 62a would have a first depth and another step 62b would have a second depth. The depths differ so that one depth is deeper and another depth is shallower. In preferred arrangements, the steps 62a-62d are arranged so that the change in local depth from one step to another step results in a stepwise variation along the length of each diagonal groove 19.

When the diagonal grooves 19 intersect at an apex 18 or the like, the first step 62a may be located at the apex 18 and immediately adjacent to and communicable with the next step 62b along each diagonal groove 19 extending from the apex 18, as illustrated in FIG. 2. In other embodiments, two or more steps may reside within the apex 18 and at least one step along each diagonal groove 19. In yet other embodiments, one step 62a may reside along the apex 18 and a portion of one or more diagonal grooves 19 and the remaining step(s) 62b reside(s) exclusively along each diagonal groove 19. Regardless of the exact arrangement, the steps 62a-62d are arranged consecutively to effect a stepwise variation of the depth along the length of each groove structure 17.

In the various embodiments, the gas could originate from a combustion or mechanical source within a turbine engine. In some embodiments, the gas could be a gas heated by combustion events within an engine and communicated to the inlet(s) 9 from a compartment adjacent to the first and second compartments 5, 6. In other embodiments, the gas could be either a hot or cold gas pressurized and communicated to the outlet(s) 9 via a fan or a pump.

Referring again to FIG. 2, a gas enters the inlet(s) 9 and is directed inward across the gap 13 between the first and second annular seal rings 3, 4. After exiting the gap 13, the gas impinges the outer annular surface 16 of the rotatable runner 15, preferably at or near the apex 18 or inlet end 45. The gas enters the apex 18 or inlet end 45 and is bifurcated by the groove structure 17 so that a first portion is directed into the left-side diagonal groove 19 and a second portion is directed into the right-side diagonal groove 19. The quantity and/or rate of gas communicated onto each of the annular seal rings 3, 4 may be the same or different. The gas traverses the respective diagonal grooves 19 and is redirected outward from the rotatable runner 15 at the outlet end 46 of each diagonal groove 19. The gas exits the left-side diagonal groove 19 and impinges the first annular seal ring 3 forming a thin-film layer 20 between the first annular seal ring 3 and rotatable runner 15, thereby separating the first annular seal ring 3 from the rotatable runner 15. The gas exits the right-side diagonal groove 19 and impinges the second annular seal ring 4 forming a thin-film layer 20 between the second annular seal ring 4 and rotatable runner 15, thereby separating the second annular seal ring 4 from the rotatable runner 15.

Figure 3:
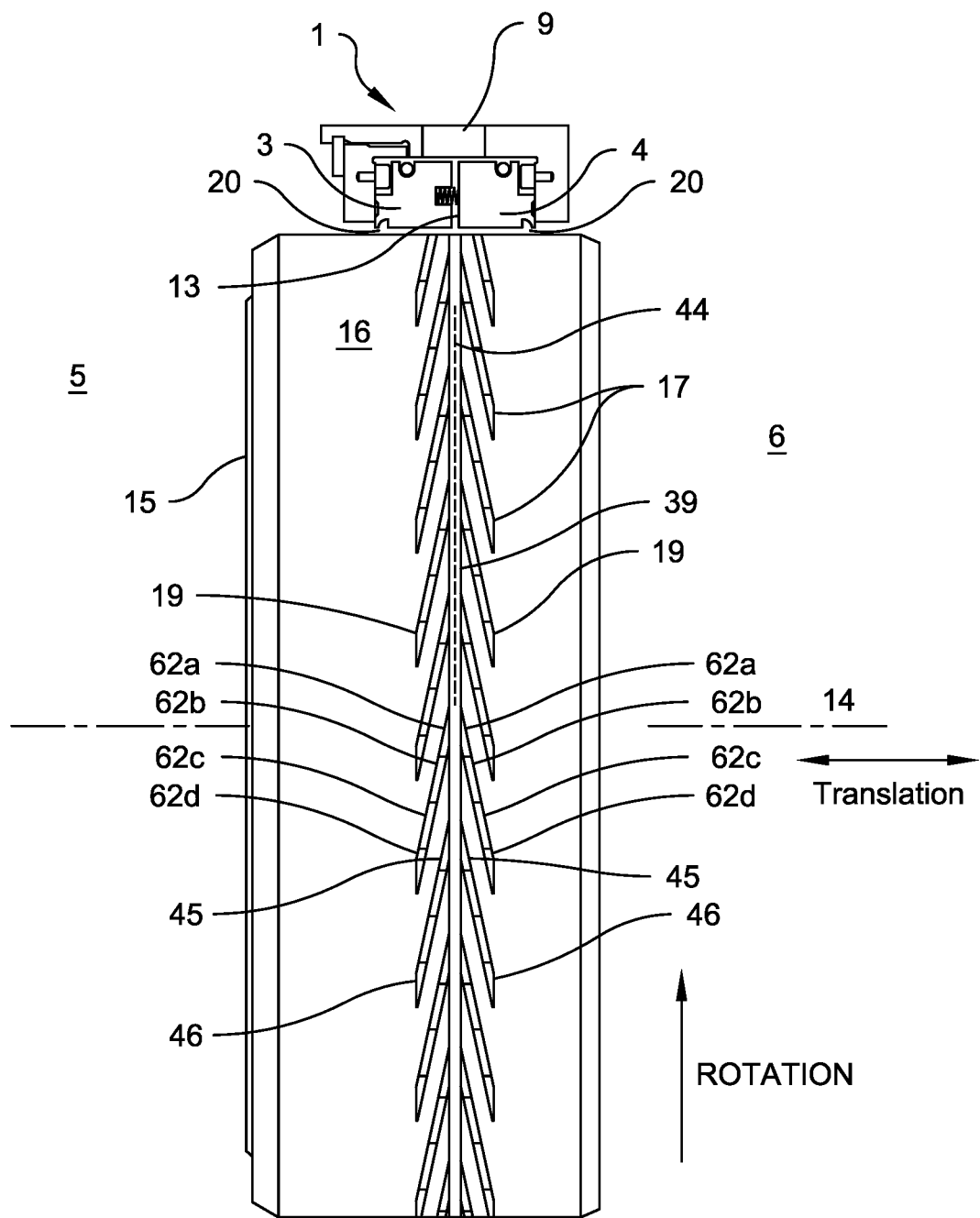
FIG. 3 is a partial cross section view illustrating an annular seal assembly including a pair of annular seal rings separated by a gap within a seal housing disposed about a rotatable runner attached to a shaft (cross section of annular seal assembly below runner and shaft not shown) wherein an outer annular surface along the runner includes a plurality of groove structures communicable with a single annular groove thereon whereby each groove includes at least two steps and each groove structure communicates with both seal rings in accordance with an embodiment of the invention.

Referring now to FIG. 3, a seal assembly 1 is shown in cross-sectional form disposed about a rotatable runner 15, the latter illustrated in side-view form, between a pair of compartments 5, 6. The rotatable runner 15 includes a plurality of groove structures 17. The groove structures 17 are arranged circumferentially along the outer annular surface 16 of the rotatable runner 15 immediately adjacent to the seal assembly 1. The groove structures 17 are positioned so as to communicate a gas onto the annular seal rings 3, 4 as the rotatable runner 15 rotates with respect to the seal assembly 1. In some embodiments, it might be advantageous for adjacent grooves structures 17 to partially overlap as represented in FIG. 3. In other embodiments, adjacent groove structures 17 could be arranged in an end-to-end configuration or with a separation between the end of one groove structure 17 and the start of the next groove structure 17.

Each groove structure 17 further includes a pair of diagonal grooves 19 disposed about a central axis 44 circumferentially along an outer annular surface 16 of the rotatable runner 15. The diagonal grooves 19 could be aligned symmetrically or non-symmetrically about the central axis 44. Each diagonal groove 19 is a channel, depression, flute, or the like disposed along the outer annular surface 16. Although the diagonal grooves 19 are represented as linear elements, it is understood that other designs are possible including multi-linear and non-linear configurations. The central axis 44 could align with the gap 13 between first and second annular seal rings 3, 4 or reside adjacent to the first and second annular seal rings 3, 4 to allow communication of a gas onto the groove structure 17 over the translational range of the rotatable runner 15. The diagonal grooves 19 are oriented so that the top of the left-side extends toward the right and the top of the right-side extends toward the left. The inward oriented ends of the diagonal grooves 19 intersect an annular groove 39 along the central axis 44. The annular groove 39 is a channel, depression, flute, or the like circumferentially along the outer annular surface 16 of the rotatable runner 15. Although the annular groove 39 is represented as linear elements, it is understood that other designs are possible including multi-linear and non-linear configurations. The intersection point between the diagonal grooves 19 and the annular groove 39 is oriented toward the rotational direction of the rotatable runner 15 so that the diagonal grooves 19 expand outward opposite of the rotational direction. The dimensions and angular orientation of the diagonal grooves 19 and annular groove 39 are design dependent and based in part on the translational range of the rotatable runner 15, the width of the annular seal rings 3, 4 and gap 13, the extent of overlap or non-overlap between adjacent groove structures 17, the pressure required to adequately seal the interface between the rotatable runner 15 and annular seal rings 3, 4, and/or other design factors.

Each diagonal groove 19 further includes at least two optional steps 62a-62d. Although four steps 62a-62d are illustrated along each diagonal groove 19 in FIG. 3, it is understood that two or more such steps 62a-62d may reside along each diagonal groove 19. Each step 62a-62d corresponds to a change in the local depth of the diagonal groove 19 relative to the outer annular surface 16. For example, if a diagonal groove 19 includes two steps 62a, 62b, then one step 62a would have a first depth and another step 62b would have a second depth. The depths differ so that one depth is deeper and another depth is shallower. In preferred arrangements, the steps 62a-62d are arranged so that the change in local depth from one step to another step results in a stepwise variation along the length of each diagonal groove 19.

When the diagonal grooves 19 intersect an annular groove 39 or the like, the first step 62a is immediately adjacent to and communicable with the annular groove 39 as illustrated in FIG. 3. The depth of the first step 62a may be deeper than, shallower than, or the same as the depth of the annular groove 39. Regardless of the exact arrangement, the steps 62a-62d are arranged consecutively to effect a stepwise variation of the depth along the length of each groove structure 17.

Referring again to FIG. 3, a gas enters the inlet(s) 9 and is directed inward across the gap 13 between the first and second annular seal rings 3, 4. After exiting the gap 13, the gas impinges the outer annular surface 16 of the rotatable runner 15, preferably at or near the annular groove 39. The gas enters the annular groove 39 and is bifurcated by the groove structure 17 so that a first portion is directed into the inlet end 45 of the left-side diagonal groove 19 and a second portion is directed into the inlet end 45 of the right-side diagonal groove 19. The quantity and/or rate of gas communicated onto each of the annular seal rings 3, 4 may be the same or different. The continuity of the annular groove 39 allows for uninterrupted communication of the gas into the diagonal grooves 19. The gas traverses the respective diagonal grooves 19 and is redirected outward from the rotatable runner 15 at the outlet end 46 of each diagonal groove 19. The gas exits the left-side diagonal groove 19 and impinges the first annular seal ring 3 forming a thin-film layer b 20 between the first annular seal ring 3 and rotatable runner 15, thereby separating the first annular seal ring 3 from the rotatable runner 15. The gas exits the right-side diagonal groove 19 and impinges the second annular seal ring 4 forming a thin-film layer 20 between the second annular seal ring 4 and rotatable runner 15, thereby separating the second annular seal ring 4 from the rotatable runner 15.

Figure 5:
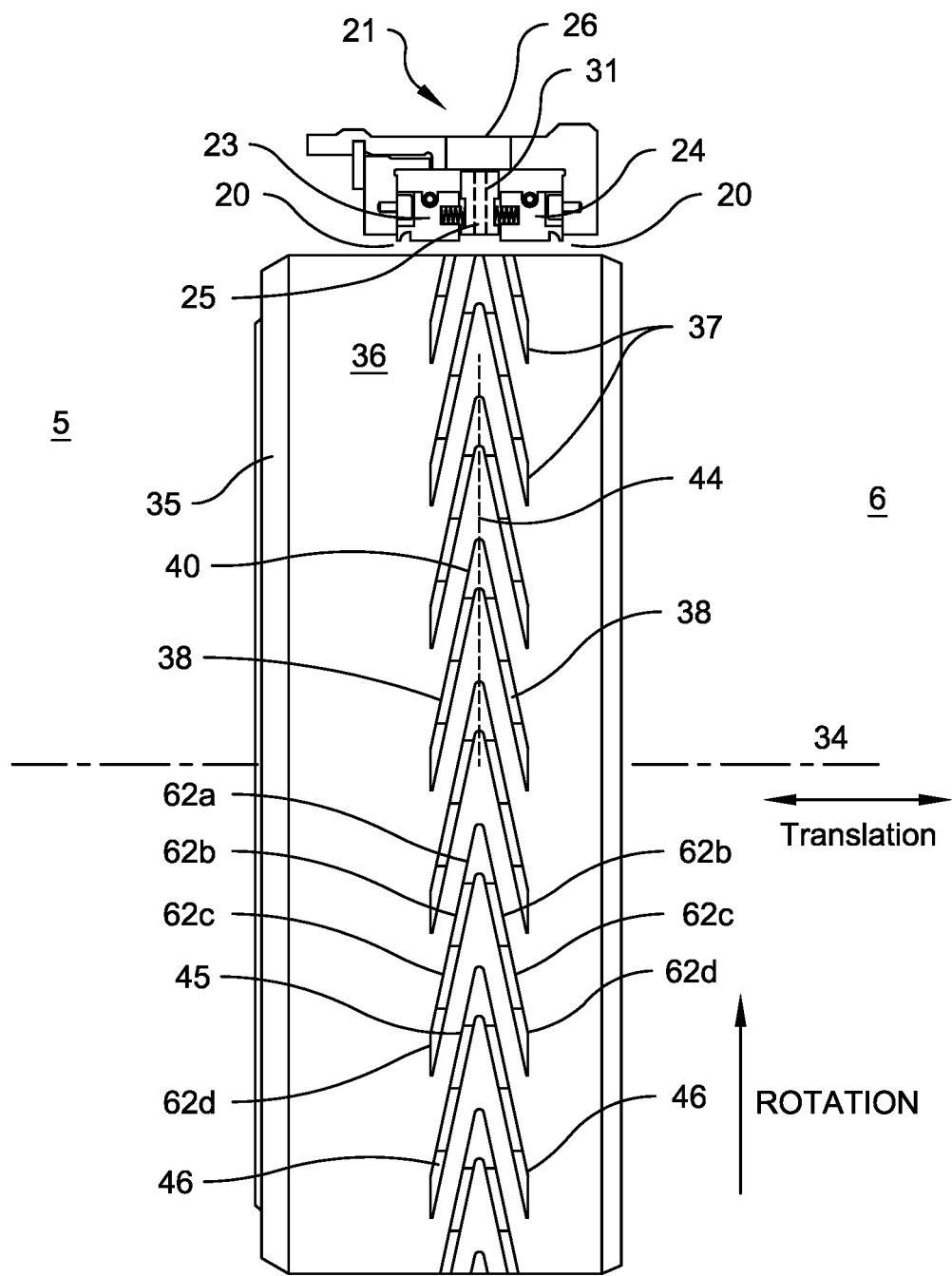
FIG. 5 is a partial cross section view illustrating an annular seal assembly including a pair of annular seal rings separated by a center ring within a seal housing disposed about a rotatable runner attached to a shaft (cross section of annular seal assembly below runner and shaft not shown) wherein an outer annular surface along the runner includes a plurality of groove structures separately disposed thereon whereby each groove includes at least two steps and each groove structure communicates with both seal rings in accordance with an embodiment of the invention.

Referring now to FIG. 4, a seal assembly 21 is shown with an annular seal housing 22, a first annular seal ring 23, a second annular seal ring 24, and a center ring 25, each disposed so as to be circumferentially arranged about a rotatable runner 35 (see FIG. 5). Components are composed of materials understood in the art. The rotatable runner 35 is an element known within the art attached to a rotatable shaft (not shown). The rotatable runner 35 is rotatable within the turbine engine via the shaft. A seal is formed along the rotatable runner 35 by each annular seal ring 23, 24. The annular seal housing 22, annular seal rings 23, 24, center ring 25, and rotatable runner 35 are aligned along and disposed about a centerline 34, often coinciding with a rotational axis along a turbine engine. The annular seal housing 22 is attached to components comprising the housing structure 51 (generally shown) of a turbine engine fixing the annular seal housing 22 thereto. The housing structure 51 is stationary and therefore non-rotating. The housing structure 51, seal assembly 21, and the rotatable runner 35 generally define at least a first compartment 5 and a second compartment 6. The configuration of the housing structure 51 is design dependent; however, it is understood for purposes of the present invention that the housing structure 51 cooperates with the seal assembly 1 and rotatable runner 35 to define two separate compartments whereby a gas resides at a low pressure within one such compartment 5 and a lubricant resides at low pressure within another compartment 6.

The annular seal housing 22 generally defines a pocket within which the annular seal rings 23, 24 and center ring 25 reside. The annular seal housing 22 could have a U-shaped cross-section opening inward toward the centerline 34. One end of the annular seal housing 22 could include an insert 27 and a retaining ring 28 which allow for assembly/disassembly of the annular seal rings 23, 24 and center ring 25 onto the annular seal housing 22. The annular seal rings 23, 24 could be fixed to the annular seal housing 22 via means known within the art to limit or to prevent relative rotational motion between the annular seal rings 23, 24 and the annular seal housing 22. In one non-limiting example, a pair of anti-rotation pins 52 is secured to the annular seal housing 22 to separately engage a pocket 53 along each of the first and second annular seal rings 23, 24. Interaction between anti-rotation pin 52 and pocket 53 functions as a positive stop to restrict rotation of each of the first and second annular seal rings 23, 24 with respect to the annular seal housing 22.

The first and second annular seal rings 23, 24 are ring-shaped elements. Each annular seal ring 23, 24 could comprise at least two arcuate segments which form a generally circular-shaped ring when assembled about a rotatable runner 35. The segmented construction of the first and second annular seal rings 3, 4 allows for radial expansion and contraction by the respective annular seal rings 23, 24 about a rotatable runner 35. Each annular seal ring 23, 24, is generally biased toward a rotatable runner 35 via a compressive force applied by a garter spring 29, 30. The garter spring 29, 30 could contact the outer circumference of the respective annular seal ring 23, 24 and apply the compressive force inward toward the rotatable runner 35.

The center ring 25 is interposed between the first and second annular seal rings 23, 24 within the annular seal housing 22. A plurality of first springs 32 are interposed between the first annular seal ring 23 and the center ring 25. A plurality of second springs 33 are interposed between the second annular seal ring 24 and the center ring 25. The first and second springs 32, 33 could be evenly spaced about the circumference of the respective annular seal rings 23, 24 so as to exert a generally uniform separation force onto each annular seal ring 23, 24 with respect to the center ring 25. The first and second springs 32, 33 could be a coil-type device which generally resists compression. Each spring 32, 33 could be attached or fixed to the respective annular seal ring 23, 24. For example, one end of each first and second spring 32, 33 could be partially recessed within a pocket 54 along the respective annular seal ring 23, 24. First and second springs 32, 33 should be sufficiently long so as to at least partially compress when assembled between the respective annular seal rings 23, 24 and center ring 25. First and second springs 32, 33 should exert a force onto the annular seal rings 23, 24 causing the annular seal rings 23, 24 to separate from the center ring 25, thereby pressing the annular seal rings 23, 24 onto opposite sides of the annular seal housing 22 with the center ring 25 substantially centered between the annular seal rings 23, 24. The separation force exerted by the compression springs 32, 33 could form an optional gap (not shown) between the center ring 25 and each annular seal ring 23, 24.

At least one inlet 26 is disposed along an outer wall of the annular seal housing 22. The inlet(s) 26 is/are positioned so as to at least partially overlay the center ring 25 between the annular seal rings 23, 24. Two or more inlets 26 could be uniformly positioned about the circumference of the annular seal housing 22. Each inlet 26 is a pathway through which a gas is communicated between the annular seal rings 23, 24.

In some embodiments, the center ring 25 could include a plurality of holes 31 traversing the radial dimension of the center ring 25. The holes 31 could be evenly spaced about the circumference of the center ring 25 and positioned so as to at least partially overlay the inlet(s) 26.

Although various embodiments are described including a center ring 25, it is understood that the center ring 25 is an optional feature and that such embodiments could include the gap 13 arrangement shown in FIG. 1.

Referring now to FIG. 5, a seal assembly 21 is shown in cross-sectional form disposed about a rotatable runner 35, the latter illustrated in side-view form, between a pair of compartments 5, 6. The rotatable runner 35 includes a plurality of groove structures 37. The groove structures 37 are arranged circumferentially along the outer annular surface 36 of the rotatable runner 35 immediately adjacent to the seal assembly 21. The groove structures 37 are positioned so as to communicate a gas onto the annular seal rings 23, 24 as the rotatable runner 35 rotates with respect to the seal assembly 21. In some embodiments, it might be advantageous for adjacent grooves structures 37 to partially overlap as represented in FIG. 5. In other embodiments, adjacent groove structures 37 could be arranged in an end-to-end configuration or with a separation between the end of one groove structure 37 and the start of the next groove structure 37.

Each groove structure 37 further includes a pair of diagonal grooves 38 disposed about a central axis 44 circumferentially along an outer annular surface 36 of the rotatable runner 35. The diagonal grooves 38 could be aligned symmetrically or non-symmetrically about the central axis 44. Each diagonal groove 38 is a channel, depression, flute, or the like disposed along the outer annular surface 36. Although the diagonal grooves 38 are represented as linear elements, it is understood that other designs are possible including multi-linear and non-linear configurations. The central axis 44 could align with the center ring 25 between first and second annular seal rings 23, 24 or reside adjacent to the first and second annular seal rings 23, 24 to allow communication of a gas onto the groove structures 37 over the translational range of the rotatable runner 35. The diagonal grooves 38 are oriented so that the top of the left-side diagonal groove 38 extends toward the right and the top of the right-side diagonal groove 38 extends toward the left. The inward oriented ends of the diagonal grooves 38 intersect along or near the central axis 44 to form an apex 40. The apex 40 is further oriented toward the rotational direction of the rotatable runner 35 so that the diagonal grooves 38 expand outward opposite of the rotational direction. The dimensions and angular orientation of the diagonal grooves 38 and the apex 40 are design dependent and based in part on the translational range of the rotatable runner 35, the widths of the annular seal rings 23, 24, center ring 25 and optional hole 31, the extent of overlap or non-overlap between adjacent groove structures 37, the pressure required to adequately seal the interface between the rotatable runner 35 and annular seal rings 23, 24, and/or other design factors.

Each diagonal groove 38 further includes at least two optional steps 62a-62d. Although four steps 62a-62d are illustrated along each diagonal groove 38 in FIG. 5, it is understood that two or more such steps 62a-62d may reside along each diagonal groove 38. Each step 62a-62d corresponds to a change in the local depth of the diagonal groove 38 relative to the outer annular surface 36. For example, if a diagonal groove 38 includes two steps 62a, 62b, then one step 62a would have a first depth and another step 62b would have a second depth. The depths differ so that one depth is deeper and another depth is shallower. In preferred arrangements, the steps 62a-62d are arranged so that the change in local depth from one step to another step results in a stepwise variation along the length of each diagonal groove 38.

When the diagonal grooves 38 intersect at an apex 40 or the like, the first step 62a may be located at the apex 40 and immediately adjacent to and communicable with the next step 62b along each diagonal groove 38 extending from the apex 40, as illustrated in FIG. 5. In other embodiments, two or more steps may reside within the apex 40 and at least one step along each diagonal groove 38. In yet other embodiments, one step 62a may reside along the apex 40 and a portion of one or more diagonal grooves 38 and the remaining step(s) 62b reside(s) exclusively along each diagonal groove 38. Regardless of the exact arrangement, the steps 62a-62d are arranged consecutively to effect a stepwise variation of the depth along the length of each groove structure 37.

Referring again to FIG. 5, a gas enters the inlet(s) 26 and is directed inward onto the center ring 25. The gas flows around the center ring 25 traversing the gaps between the center ring 25 and the first and second annular seal rings 23, 24 when the center ring 25 does not include the optional holes 31. The gas traverses the holes 31 when the center ring 25 includes the optional holes 31. Next, the gas impinges the outer annular surface 36 of the rotatable runner 35, preferably at or near the apex 40 or inlet end 45. The gas enters the apex 40 or inlet end 45 and is bifurcated by the groove structure 37 so that a first portion is directed into the left-side diagonal groove 38 and a second portion is directed into the right-side diagonal groove 38. The quantity and/or rate of gas communicated onto each of the annular seal rings 23, 24 may be the same or different. The gas traverses the respective diagonal grooves 38 and is redirected outward from the rotatable runner 35 at the outlet end 46 of each diagonal groove 38. The gas exits the left-side diagonal groove 38 and impinges the first annular seal ring 23 forming a thin-film layer 20 between the first annular seal ring 23 and rotatable runner 35, thereby separating the first annular seal ring 23 from the rotatable runner 35. The gas exits the right-side diagonal groove 38 and impinges the second annular seal ring 24 forming a thin-film layer 20 between the second annular seal ring 24 and rotatable runner 35, thereby separating the second annular seal ring 24 from the rotatable runner 35.

Figure 6:
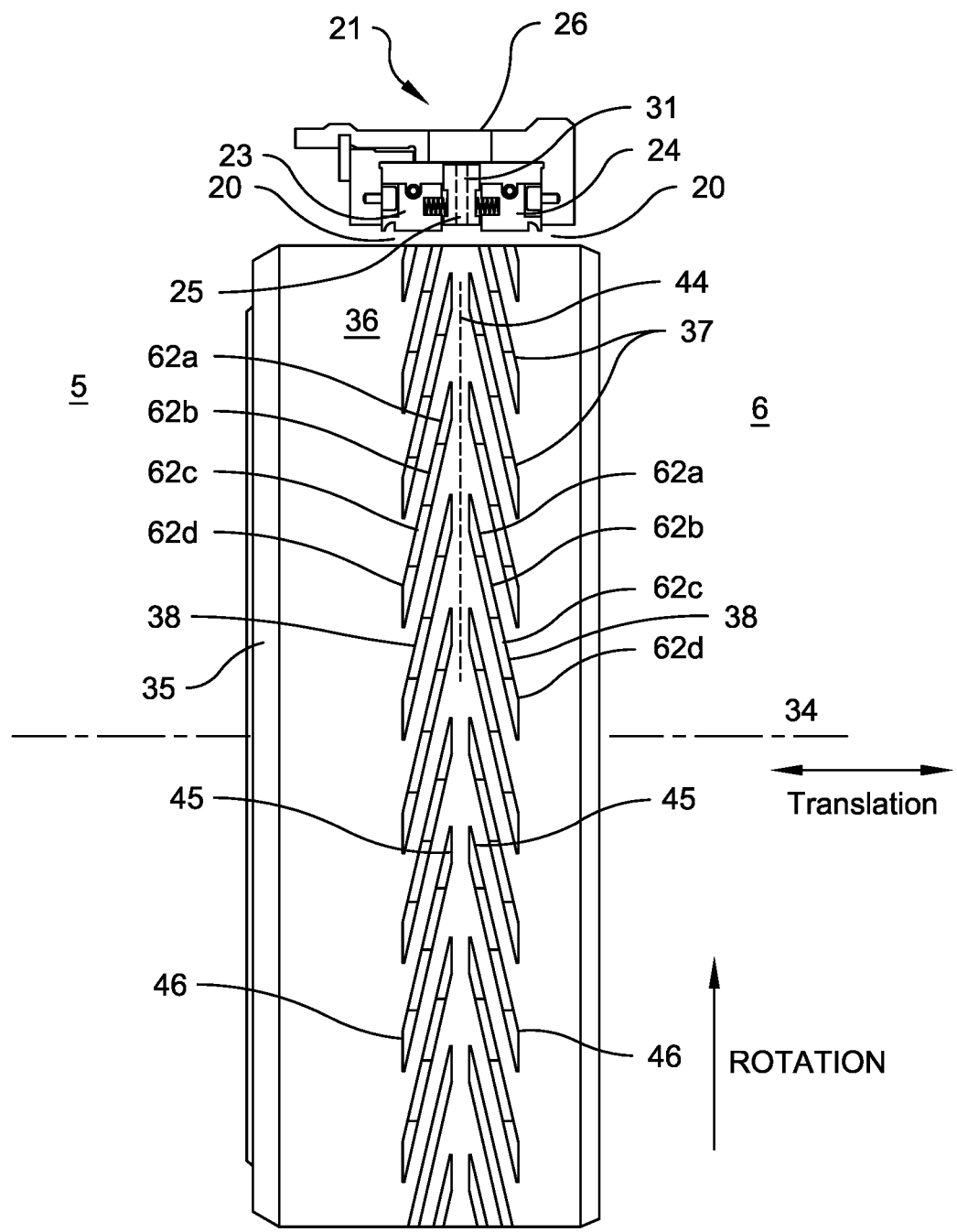
FIG. 6 is a partial cross section view illustrating an annular seal assembly including a pair of annular seal rings separated by a center ring within a seal housing disposed about a rotatable runner attached to a shaft (cross section of annular seal assembly below runner and shaft not shown) wherein an outer annular surface along the runner includes a plurality of bifurcated groove structures separately disposed thereon whereby each groove includes at least two steps and each pair of non-intersecting groove structures communicates with both seal rings in accordance with an embodiment of the invention.

Referring now to FIG. 6, a seal assembly 21 is shown in cross-sectional form disposed about a rotatable runner 35, the latter illustrated in side-view form, between a pair of compartments 5, 6. The rotatable runner 35 includes a plurality of groove structures 37. The groove structures 37 are arranged circumferentially along the outer annular surface 36 of the rotatable runner 35 immediately adjacent to the seal assembly 21. The groove structures 37 are positioned so as to communicate a gas onto the annular seal rings 23, 24 as the rotatable runner 35 rotates with respect to the seal assembly 21. In some embodiments, it might be advantageous for adjacent grooves structures 37 to partially overlap as represented in FIG. 6. In other embodiments, adjacent groove structures 37 could be arranged in an end-to-end configuration or with a separation between the end of one groove structure 37 and the start of the next groove structure 37.

Each groove structure 37 further includes a pair of diagonal grooves 38 disposed about a central axis 44 circumferentially along an outer annular surface 36 of the rotatable runner 35. The diagonal grooves 38 could be aligned symmetrically or non-symmetrically about the central axis 44. Each diagonal groove 38 is a channel, depression, flute, or the like disposed along the outer annular surface 36. Although the diagonal grooves 38 are represented as linear elements, it is understood that other designs are possible including multi-linear and non-linear configurations. The central axis 44 could align with the center ring 25 between first and second annular seal rings 23, 24 or reside adjacent to the first and second annular seal rings 23, 24 to allow communication of a gas onto the groove structures 37 over the translational range of the rotatable runner 35. The diagonal grooves 38 are oriented so that the top of the left-side diagonal groove 38 extends toward the right and the top of the right-side diagonal groove 38 extends toward the left. The inward oriented ends of the diagonal grooves 38 are separately disposed about the central axis 44 so that the diagonal grooves 38 expand outward opposite of the rotational direction. The dimensions and angular orientation of the diagonal grooves 38 are design dependent and based in part on the translational range of the rotatable runner 35, the widths of the annular seal rings 23, 24, center ring 25 and optional hole 31, the extent of overlap or non-overlap between adjacent groove structures 37, the pressure required to adequately seal the interface between the rotatable runner 35 and annular seal rings 23, 24, and/or other design factors.

Each diagonal groove 38 further includes at least two optional steps 62a-62d. Although four steps 62a-62d are illustrated along each diagonal groove 38 in FIG. 6, it is understood that two or more such steps 62a-62d may reside along each diagonal groove 38. Each step 62a-62d corresponds to a change in the local depth of the diagonal groove 38 relative to the outer annular surface 36. For example, if a diagonal groove 38 includes two steps 62a, 62b, then one step 62a would have a first depth and another step 62b would have a second depth. The depths differ so that one depth is deeper and another depth is shallower. In preferred arrangements, the steps 62a-62d are arranged so that the change in local depth from one step to another step results in a stepwise variation along the length of each diagonal groove 38. Regardless of the exact arrangement, the steps 62a-62d are arranged consecutively to effect a stepwise variation of the depth along the length of each groove structure 37.

Referring again to FIG. 6, a gas enters the inlet(s) 26 and is directed inward onto the center ring 25. The gas flows around the center ring 25 traversing the gaps between the center ring 25 and the first and second annular seal rings 23, 24 when the center ring 25 does not include the optional holes 31. The gas traverses the holes 31 when the center ring 25 includes the optional holes 31. Next, the gas impinges the outer annular surface 36 of the rotatable runner 35, preferably at or near inlet ends 45. The gas is bifurcated by the groove structure 37 at the inlet ends 45 so that a first portion is directed into the left-side diagonal groove 38 and a second portion is directed into the right-side diagonal groove 38. The quantity and/or rate of gas communicated onto each of the annular seal rings 23, 24 may be the same or different. The gas traverses the respective diagonal grooves 38 and is redirected outward from the rotatable runner 35 at the outlet end 46 of each diagonal groove 38. The gas exits the left-side diagonal groove 38 and impinges the first annular seal ring 23 forming a thin-film layer 20 between the first annular seal ring 23 and rotatable runner 35, thereby separating the first annular seal ring 23 from the rotatable runner 35. The gas exits the right-side diagonal groove 38 and impinges the second annular seal ring 24 forming a thin-film layer 20 between the second annular seal ring 24 and rotatable runner 35, thereby separating the second annular seal ring 24 from the rotatable runner 35.

Figure 7:
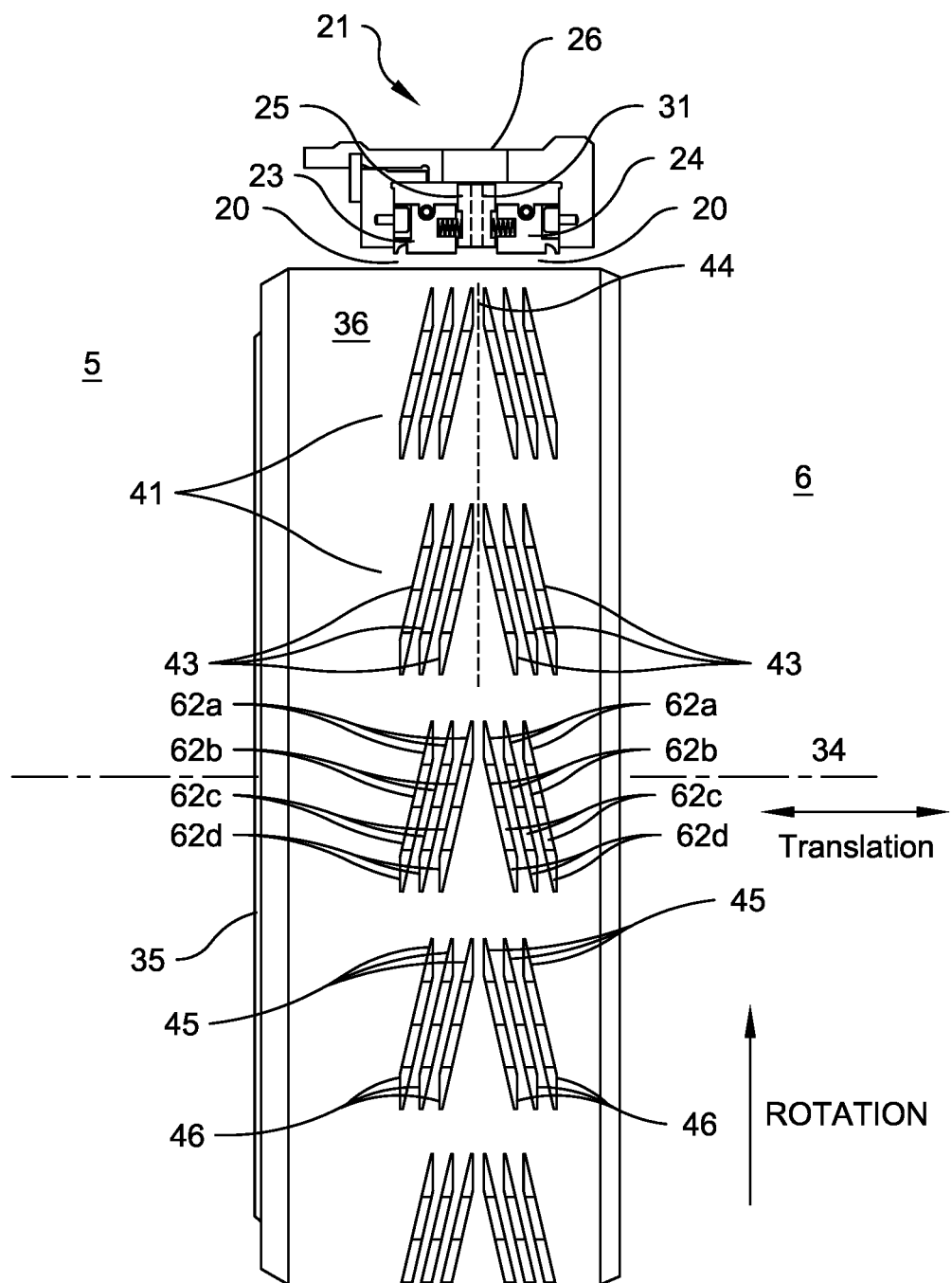
FIG. 7 is a partial cross section view illustrating an annular seal assembly including a pair of annular seal rings separated by a center ring within a seal housing disposed about a rotatable runner attached to a shaft (cross section of annular seal assembly below runner and shaft not shown) wherein an outer annular surface along the runner includes a plurality of bifurcated multi-groove structures separately disposed thereon whereby each groove includes at least two steps and each pair of non-intersecting multi-groove structures communicates with both seal rings in accordance with an embodiment of the invention.

Referring now to FIG. 7, a seal assembly 21 is shown in cross-sectional form disposed about a rotatable runner 35, the latter illustrated in side-view form, between a pair of compartments 5, 6. The rotatable runner 35 includes a plurality of groove structures 41. The groove structures 41 are arranged circumferentially along the outer annular surface 36 of the rotatable runner 35 immediately adjacent to the seal assembly 21. The groove structures 41 are positioned so as to communicate a gas onto the annular seal rings 23, 24 as the rotatable runner 35 rotates with respect to the seal assembly 21. In some embodiments, it might be advantageous for adjacent grooves structures 41 to partially overlap. In other embodiments, adjacent groove structures 41 could be arranged in an end-to-end configuration or with a separation between the end of one groove structure 41 and the start of the next groove structure 41, the latter represented in FIG. 7.

Each groove structure 41 further includes a plurality of diagonal grooves 43 disposed about a central axis 44 circumferentially along an outer annular surface 36 of the rotatable runner 35. The diagonal grooves 43 could be aligned symmetrically or non-symmetrically about the central axis 44. Each diagonal groove 43 is a channel, depression, flute, or the like disposed along the outer annular surface 36. Although the diagonal grooves 43 are represented as linear elements, it is understood that other designs are possible including multi-linear and non-linear configurations. The central axis 44 could align with the center ring 25 between first and second annular seal rings 23, 24 or reside adjacent to the first and second annular seal rings 23, 24 to allow communication of a gas onto the groove structures 41 over the translational range of the rotatable runner 35. The diagonal grooves 43 are oriented so that the top of each left-side diagonal groove 43 extends toward the right and the top of each right-side diagonal groove 43 extends toward the left. The inward oriented ends of the diagonal grooves 43 are separately disposed about the central axis 44 so that the diagonal grooves 43 expand outward opposite of the rotational direction.

At least two diagonal grooves 43 are disposed along each side of the central axis 44. In some embodiments, the diagonal grooves 43 could be substantially parallel to other diagonal grooves 43 along the same side of the central axis 44 as represented by the set of three diagonal grooves 43 along each side of the central axis 44 in FIG. 7. In other embodiments, the diagonal grooves 43 could be oriented at two or more angles with respect to the rotational direction and/or central axis 44 whereby the diagonal grooves 43 along the same side of the central axis 44 are non-parallel. It is also possible in some embodiments for the inlet ends 45 and the outlet ends 46 to be aligned circumferentially as represented in FIG. 7. In yet other embodiments, the inlet ends 45 and the outlet ends 46 could be skewed or staggered and/or the diagonal grooves 43 have the same or different lengths.

The dimensions, angular orientation and number of the diagonal grooves 43 are design dependent and based in part on the translational range of the rotatable runner 35, the widths of the annular seal rings 23, 24, center ring 25 and optional hole 31, the extent of overlap or non-overlap between adjacent groove structures 41, the number of flows from a groove structure 41 required to impinge each annular seal ring 23, 24, the pressure required to adequately seal the interface between the rotatable runner 35 and annular seal rings 23, 24, and/or other design factors.

Each diagonal groove 43 further includes at least two optional steps 62a-62d. Although four steps 62a-62d are illustrated along each diagonal groove 43 in FIG. 7, it is understood that two or more such steps 62a-62d may reside along each diagonal groove 43. Each step 62a-62d corresponds to a change in the local depth of the diagonal groove 43 relative to the outer annular surface 36. For example, if a diagonal groove 43 includes two steps 62a, 62b, then one step 62a would have a first depth and another step 62b would have a second depth. The depths differ so that one depth is deeper and another depth is shallower. In preferred arrangements, the steps 62a-62d are arranged so that the change in local depth from one step to another step results in a stepwise variation along the length of each diagonal groove 43. Regardless of the exact arrangement, the steps 62a-62d are arranged consecutively to effect a stepwise variation of the depth along the length of each groove structure 41.

Referring again to FIG. 7, a gas enters the inlet(s) 26 and is directed inward onto the center ring 25. The gas flows around the center ring 25 traversing the gaps between the center ring 25 and the first and second annular seal rings 23, 24 when the center ring 25 does not include the optional holes 31. The gas traverses the holes 31 when the center ring 25 includes the optional holes 31. Next, the gas impinges the outer annular surface 36 of the rotatable runner 35, preferably at or near inlet ends 45. The gas is bifurcated by the groove structure 41 at the inlet ends 45 so that a first portion is directed into the left-side diagonal grooves 43 and a second portion is directed into the right-side diagonal grooves 43. The quantity and/or rate of gas communicated onto each of the annular seal rings 23, 24 may be the same or different. The gas traverses the respective diagonal grooves 43 and is redirected outward from the rotatable runner 35 at the outlet end 46 of each diagonal groove 43. The gas exits at least one left-side diagonal groove 43 within a groove structure 41 and impinges the first annular seal ring 23 forming a thin-film layer 20 between the first annular seal ring 23 and rotatable runner 35, thereby separating the first annular seal ring 23 from the rotatable runner 35. The gas exits at least one right-side diagonal groove 43 within a groove structure 41 and impinges the second annular seal ring 24 forming a thin-film layer 20 between the second annular seal ring 24 and rotatable runner 35, thereby separating the second annular seal ring 24 from the rotatable runner 35.

Figure 8:
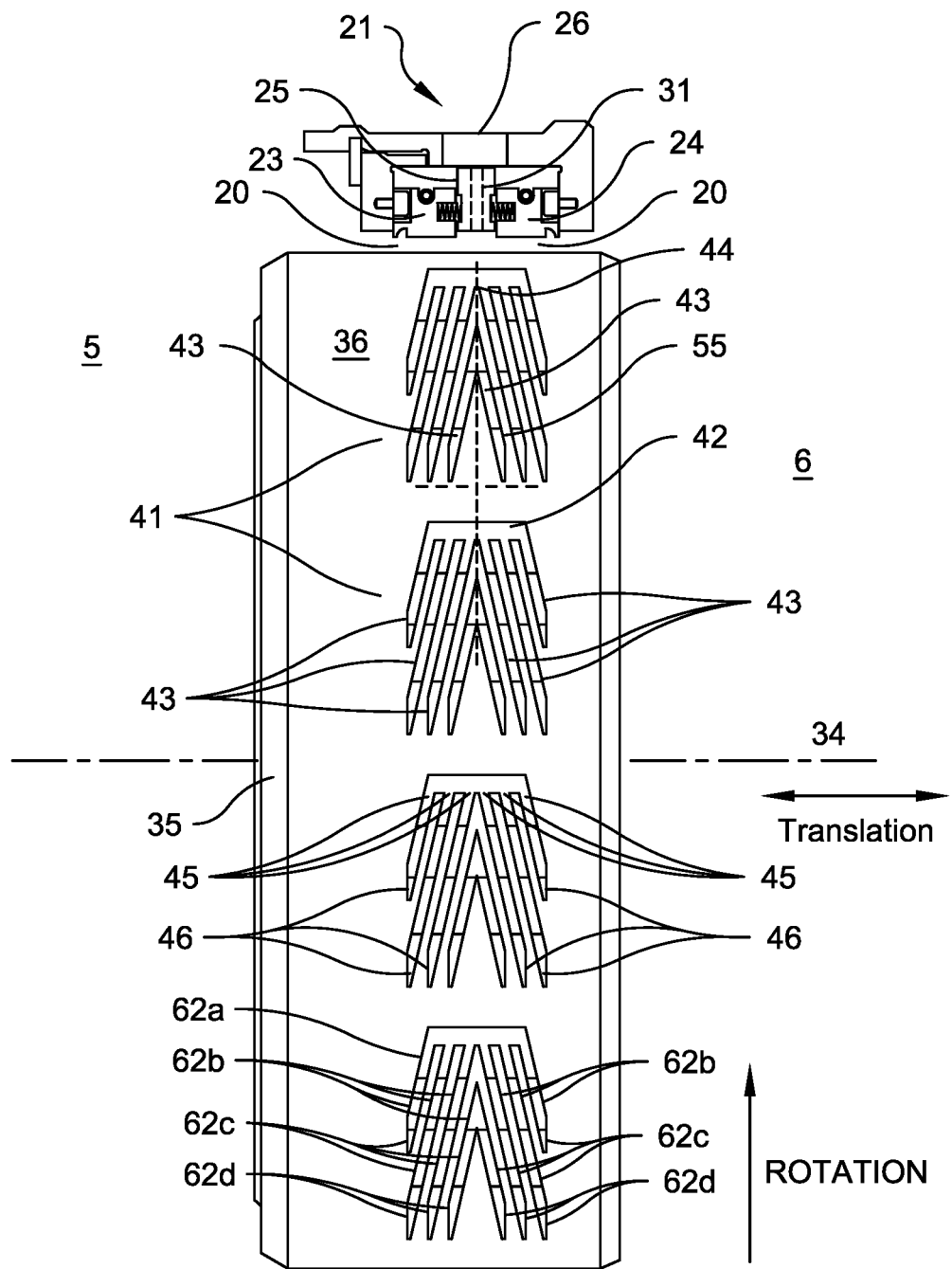
FIG. 8 is a partial cross section view illustrating an annular seal assembly including a pair of annular seal rings separated by a center ring within a seal housing disposed about a rotatable runner attached to a shaft (cross section of annular seal assembly below runner and shaft not shown) wherein an outer annular surface along the runner includes a plurality of multi-groove structures separately disposed thereon whereby each groove includes at least two steps and each multi-groove structure communicates with both seal rings in accordance with an embodiment of the invention.

Referring now to FIG. 8, a seal assembly 21 is shown in cross-sectional form disposed about a rotatable runner 35, the latter illustrated in side-view form, between a pair of compartments 5, 6. The rotatable runner 35 includes a plurality of groove structures 41. The groove structures 41 are arranged circumferentially along the outer annular surface 36 of the rotatable runner 35 immediately adjacent to the seal assembly 21. The groove structures 41 are positioned so as to communicate a gas onto the annular seal rings 23, 24 as the rotatable runner 35 rotates with respect to the seal assembly 21. In some embodiments, it might be advantageous for adjacent grooves structures 41 to partially overlap. In other embodiments, adjacent groove structures 41 could be arranged in an end-to-end configuration or with a separation between the end of one groove structure 41 and the start of the next groove structure 41, the latter represented in FIG. 8.

Each groove structure 41 further includes at least two of diagonal grooves 43 disposed about a central axis 44 circumferentially along an outer annular surface 36 of the rotatable runner 35. The diagonal grooves 43 could be aligned symmetrically or non-symmetrically about the central axis 44. Each diagonal groove 43 is a channel, depression, flute, or the like disposed along the outer annular surface 36. Although the diagonal grooves 43 are represented as linear elements, it is understood that other designs are possible including multi-linear and non-linear configurations. The central axis 44 could align with the center ring 25 between first and second annular seal rings 23, 24 or reside adjacent to the first and second annular seal rings 23, 24 to allow communication of a gas onto the groove structures 41 over the translational range of the rotatable runner 35. The diagonal grooves 43 are oriented so that the top of each left-side diagonal groove 43 extends toward the right and the top of each right-side diagonal groove 43 extends toward the left. The inward oriented ends of the diagonal grooves 43 are separately disposed about the central axis 44 so that the diagonal grooves 43 expand outward opposite of the rotational direction.

At least one diagonal groove 43 is disposed along each side of the central axis 44. When two or more diagonal grooves 43 are disposed along each side of the central axis 44, the diagonal grooves 43 could be substantially parallel to other diagonal grooves 43 along the same side of the central axis 44 as represented by the set of three diagonal grooves 43 along each side of the central axis 44 in FIG. 8. In other embodiments, the diagonal grooves 43 could be oriented at two or more angles with respect to the rotational direction and/or central axis 44 whereby the diagonal grooves 43 along the same side of the central axis 44 are non-parallel. Two or more of the inlet ends 45 and the outlet ends 46 could be aligned circumferentially as represented in FIG. 8. Two or more of other inlet ends 45 and outlet ends 46 could be skewed or staggered as also represented in FIG. 8. Two or more diagonal grooves 43 could have the same or different lengths as further represented in FIG. 8.

Two or more diagonal grooves 43 could communicate with a feed groove 42 at the inlet ends 45 of the diagonal grooves 43. The feed groove 42 is a channel, depression, flute, or the like disposed along the outer annular surface 36.

Although the feed groove 42 is represented as a linear element, it is understood that other designs are possible including multi-linear and non-linear configurations. The feed groove 42 is generally oriented to traverse the central axis 44 so as to communication with diagonal grooves 43 along both sides of the groove structure 41. The feed groove 42 could be substantially perpendicular to the rotational direction of the rotatable runner 35 and/or the central axis 44 as represented in FIG. 8. In other embodiments the feed groove 42 could be obliquely oriented with respect to the rotational direction and/or central axis 44. When less than all diagonal grooves 43 communicate with a feed groove 42 it is possible for the diagonal grooves 43 to intersect as described in FIGS. 2 and 5 to form a secondary groove structure 55 within the larger primary groove structure 41, as represented in FIG. 8.

The dimensions, angular orientation and number of the diagonal grooves 43 and feed groove 42 are design dependent and based in part on the translational range of the rotatable runner 35, the widths of the annular seal rings 23, 24, center ring 25 and optional hole 31, the extent of overlap or non-overlap between adjacent groove structures 41 with or without secondary groove structures 55, the number of flows from a groove structure 41 required to impinge each annular seal ring 23, 24, the pressure required to adequately seal the interface between the rotatable runner 35 and annular seal rings 23, 24, and/or other design factors.

Each diagonal groove 43 further includes at least two optional steps 62a-62d. Although three or four steps 62a-62d are illustrated along the diagonal grooves 43 in FIG. 8, it is understood that two or more such steps 62a-62d may reside along each diagonal groove 43. Each step 62a-62d corresponds to a change in the local depth of the diagonal groove 43 relative to the outer annular surface 36. For example, if a diagonal groove 43 includes two steps 62a, 62b, then one step 62a would have a first depth and another step 62b would have a second depth. The depths differ so that one depth is deeper and another depth is shallower. In preferred arrangements, the steps 62a-62d are arranged so that the change in local depth from one step to another step results in a stepwise variation along the length of each diagonal groove 43.

When the diagonal grooves 43 intersect at an apex as otherwise described herein or a feed groove 42, the first step 62a may be located at the apex or the feed groove 42 and immediately adjacent to and communicable with the next step 62b along each diagonal groove 43, as illustrated in FIG. 8. In other embodiments, two or more steps may reside within the apex or the feed groove 42 and at least one step along each diagonal groove 43. In yet other embodiments, one step 62a may reside along the apex or the feed groove 42 and a portion of one or more diagonal grooves 43 and the remaining step(s) 62b reside(s) exclusively along each diagonal groove 43, as also illustrated in FIG. 8. Regardless of the exact arrangement, the steps 62a-62d are arranged consecutively to effect a stepwise variation of the depth along the length of each groove structure 41 and each secondary groove structure 55.

Referring again to FIG. 8, a gas enters the inlet(s) 26 and is directed inward onto the center ring 25. The gas flows around the center ring 25 traversing the gaps between the center ring 25 and the first and second annular seal rings 23, 24 when the center ring 25 does not include the optional holes 31. The gas traverses the holes 31 when the center ring 25 includes the optional holes 31. Next, the gas impinges the feed groove 42 along the outer annular surface 36 of the rotatable runner 35. The gas is bifurcated along the feed groove 42 allowing the gas to enter the inlet ends 45 so that a first portion is directed into the left-side diagonal grooves 43 and a second portion is directed into the right-side diagonal grooves 43. The quantity and/or rate of gas communicated onto each of the annular seal rings 23, 24 may be the same or different. The gas traverses the respective diagonal grooves 43 and is redirected outward from the rotatable runner 35 at the outlet end 46 of each diagonal groove 43. The gas exits at least one left-side diagonal groove 43 within a groove structure 41 and impinges the first annular seal ring 23 forming a thin-film layer 20 between the first annular seal ring 23 and rotatable runner 35, thereby separating the first annular seal ring 23 from the rotatable runner 35. The gas exits at least one right-side diagonal groove 43 within a groove structure 41 and impinges the second annular seal ring 24 forming a thin-film layer 20 between the second annular seal ring 24 and rotatable runner 35, thereby separating the second annular seal ring 24 from the rotatable runner 35. The flow characteristics of the secondary groove structure 55 are as described for FIGS. 2 and 5.

Figure 9:
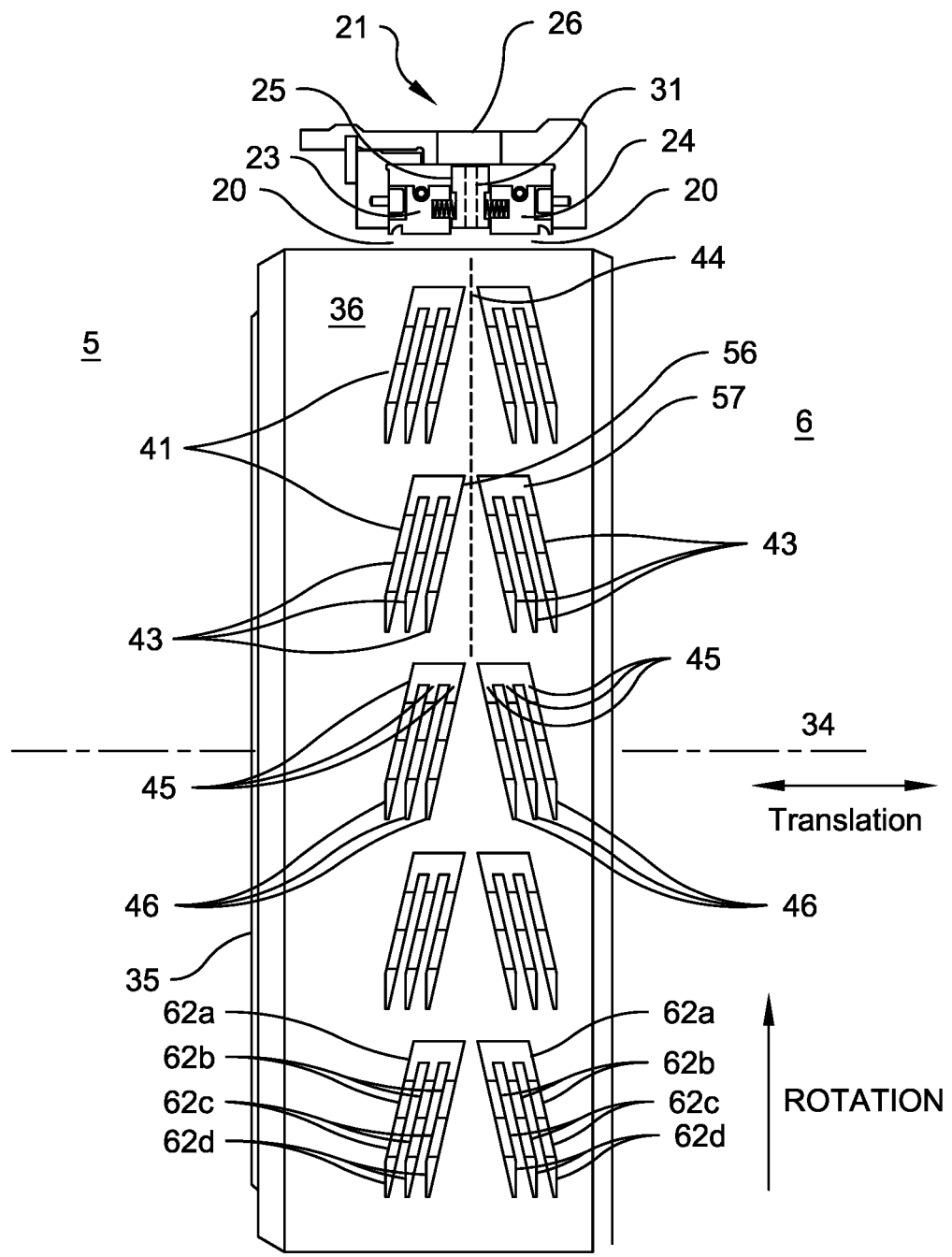
FIG. 9 is a partial cross section view illustrating an annular seal assembly including a pair of annular seal rings separated by a center ring within a seal housing disposed about a rotatable runner attached to a shaft (cross section of annular seal assembly below runner and shaft not shown) wherein an outer annular surface along the runner includes a plurality of bifurcated multi-groove structures separately disposed thereon whereby the multi-grooves form two separate substructures within each multi-groove structure, each groove includes at least two steps, and each multi-groove structure communicates with both seal rings in accordance with an embodiment of the invention.

Referring now to FIG. 9, a seal assembly 21 is shown in cross-sectional form disposed about a rotatable runner 35, the latter illustrated in side-view form, between a pair of compartments 5, 6. The rotatable runner 35 includes a plurality of groove structures 41. The groove structures 41 are arranged circumferentially along the outer annular surface 36 of the rotatable runner 35 immediately adjacent to the seal assembly 21. The groove structures 41 are positioned so as to communicate a gas onto the annular seal rings 23, 24 as the rotatable runner 35 rotates with respect to the seal assembly 21. In some embodiments, it might be advantageous for adjacent grooves structures 41 to partially overlap. In other embodiments, adjacent groove structures 41 could be arranged in an end-to-end configuration or with a separation between the end of one groove structure 41 and the start of the next groove structure 41, the latter represented in FIG. 9.

Each groove structure 41 further includes at least two diagonal grooves 43 disposed about a central axis 44 circumferentially along an outer annular surface 36 of the rotatable runner 35. The diagonal grooves 43 could be aligned symmetrically or non-symmetrically about the central axis 44. Each diagonal groove 43 is a channel, depression, flute, or the like disposed along the outer annular surface 36. Although the diagonal grooves 43 are represented as linear elements, it is understood that other designs are possible including multi-linear and non-linear configurations. The central axis 44 could align with the center ring 25 between first and second annular seal rings 23, 24 or reside adjacent to the first and second annular seal rings 23, 24 to allow communication of a gas onto the groove structures 41 over the translational range of the rotatable runner 35. The diagonal grooves 43 are oriented so that the top of each left-side diagonal groove 43 extends toward the right and the top of each right-side diagonal groove 43 extends toward the left. The inward oriented ends of the diagonal grooves 43 are separately disposed about the central axis 44 so that the diagonal grooves 43 expand outward opposite of the rotational direction.

At least two diagonal grooves 43 are disposed along each side of the central axis 44. The diagonal grooves 43 could be substantially parallel to other diagonal grooves 43 along the same side of the central axis 44 as represented by the set of three diagonal grooves 43 along each side of the central axis 44 in FIG. 9. In other embodiments, the diagonal grooves 43 could be oriented at two or more angles with respect to the rotational direction and/or central axis 44 whereby the diagonal grooves 43 along the same side of the central axis 44 are non-parallel. Two or more of the inlet ends 45 and the outlet ends 46 could be aligned circumferentially as represented in FIG. 9. Two or more inlet ends 45 and outlet ends 46 could be skewed or staggered. Two or more diagonal groove 43 could have the same or different lengths.

Two or more diagonal grooves 43 could communicate with a first feed groove 56 at the inlet ends 45 of the left-side diagonal grooves 43. Two or more other diagonal grooves 43 could communicate with a second feed groove 57 at the inlet ends 45 of the right-side diagonal grooves 43. Each first and second feed groove 56, 57 is a channel, depression, flute, or the like disposed along the outer annular surface 36. Although the feed grooves 56, 57 are represented as linear elements, it is understood that other designs are possible including multi-linear and non-linear configurations. The feed grooves 56, 57 are separately oriented to either side of the central axis 44. The feed grooves 56, 57 could be substantially perpendicular or oblique to the rotational direction and/or central axis 44, the former represented in FIG. 9.

The dimensions, angular orientation and number of the diagonal grooves 43 and feed grooves 56, 57 are design dependent and based in part on the translational range of the rotatable runner 35, the widths of the annular seal rings 23, 24, center ring 25 and optional hole 31, the extent of overlap or non-overlap between adjacent groove structures 41, the number of flows from a groove structure 41 required to impinge each annular seal ring 23, 24, the pressure required to adequately seal the interface between the rotatable runner 35 and annular seal rings 23, 24, and/or other design factors.

Each diagonal groove 43 further includes at least two optional steps 62a-62d. Although four steps 62a-62d are illustrated along the diagonal grooves 43 in FIG. 9, it is understood that two or more such steps 62a-62d may reside along each diagonal groove 43. Each step 62a-62d corresponds to a change in the local depth of the diagonal groove 43 relative to the outer annular surface 36. For example, if a diagonal groove 43 includes two steps 62a, 62b, then one step 62a would have a first depth and another step 62b would have a second depth. The depths differ so that one depth is deeper and another depth is shallower. In preferred arrangements, the steps 62a-62d are arranged so that the change in local depth from one step to another step results in a stepwise variation along the length of each diagonal groove 43.

When the diagonal grooves 43 intersect a first feed groove 56 or a second feed groove 57, the first step 62a may be located at the first feed groove 56 or the second feed groove 57 and immediately adjacent to and communicable with the next step 62b along each diagonal groove 43. In other embodiments, two or more steps may reside within the first feed groove 56 or the second feed groove 57 and at least one step along each diagonal groove 43. In yet other embodiments, one step 62a may reside along the first feed groove 56 or the second feed groove 57 and a portion of one or more diagonal grooves 43 and the remaining step(s) 62b reside(s) exclusively along each diagonal groove 43, as illustrated in FIG. 9. Regardless of the exact arrangement, the steps 62a-62d are arranged consecutively to effect a stepwise variation of the depth along the length of each groove structure 41.

Referring again to FIG. 9, a gas enters the inlet(s) 26 and is directed inward onto the center ring 25. The gas flows around the center ring 25 traversing the gaps between the center ring 25 and the first and second annular seal rings 23, 24 when the center ring 25 does not include the optional holes 31. The gas traverses the holes 31 when the center ring 25 includes the optional holes 31. Next, the gas impinges along or near the feed grooves 56, 57 along outer annular surface 36 of the rotatable runner 35. The gas is bifurcated by the groove structure 41 so as to separately enter the first and second feed grooves 56, 57 so that a first portion is directed into the inlet ends 45 of the left-side diagonal grooves 43 and a second portion is directed into the inlet ends 45 of the right-side diagonal grooves 43. The quantity and/or rate of gas communicated onto each of the annular seal rings 23, 24 may be the same or different. The gas traverses the respective diagonal grooves 43 and is redirected outward from the rotatable runner 35 at the outlet end 46 of each diagonal groove 43. The exits at least one left-side diagonal groove 43 within a groove structure 41 and impinges the first annular seal ring 23 forming a thin-film layer 20 between the first annular seal ring 23 and rotatable runner 35, thereby separating the first annular seal ring 23 from the rotatable runner 35. The gas exits at least one right-side diagonal groove 43 within a groove structure 41 and impinges the second annular seal ring 24 forming a thin-film layer 20 between the second annular seal ring 24 and rotatable runner 35, thereby separating the second annular seal ring 24 from the rotatable runner 35.

Referring now to FIGS. 10-13, several seal assemblies 1 are shown in cross-sectional form disposed about a rotatable runner 15, the latter illustrated in side-view form, between a pair of compartments 5, 6. The rotatable runner 15 includes a plurality of groove structures 41. The groove structures 41 are arranged circumferentially along the outer annular surface 16 of the rotatable runner 15 immediately adjacent to the seal assembly 1. The groove structures 41 are positioned so as to communicate a gas onto the annular seal rings 3, 4 as the rotatable runner 15 rotates with respect to the seal assembly 1. In some embodiments, it might be advantageous for adjacent grooves structures 41 to partially overlap. In other embodiments, adjacent groove structures 41 could be arranged in an end-to-end configuration or with a separation between the end of one groove structure 41 and the start of the next groove structure 41, the latter represented in FIGS. 10-13.

Each groove structure 41 further includes at least two axial grooves 49 disposed about a central axis 44 circumferentially along an outer annular surface 16 of the rotatable runner 15. The axial grooves 49 could be aligned symmetrically or non-symmetrically about the central axis 44. Each axial groove 49 is a channel, depression, flute, or the like disposed along the outer annular surface 16. Although the axial grooves 49 are represented as linear elements, it is understood that other designs are possible including multi-linear and non-linear configurations. The central axis 44 could align with the gap 13 between the first and second annular seal rings 3, 4 or reside adjacent to the first and second annular seal rings 3, 4 to allow communication of a gas onto the groove structures 41 over the translational range of the rotatable runner 15. The axial grooves 49 are oriented substantially parallel to the rotational direction of the rotatable runner 15 and/or the central axis 44.

At least two axial grooves 49 are disposed along each side of the central axis 44. The axial grooves 49 could be substantially parallel to other axial grooves 49 along the same side of the central axis 44 as represented by the set of two or more axial grooves 49 along each side of the central axis 44 in FIGS. 10-13. Two or more of the inlet ends 45 and the outlet ends 46 could be aligned circumferentially as represented in FIGS. 10-13. It is also possible for the inlet ends 45 and the outlet ends 46 to be skewed or staggered and/or and the axial grooves 49 to have the same or different lengths.

The axial grooves 49 communicate with a feed groove 42 at the inlet ends 45 of the axial grooves 49. The feed groove 42 is a channel, depression, flute, or the like disposed along the outer annular surface 16. Although the feed groove 42 is represented as a linear element, it is understood that other designs are possible including multi-linear and non-linear configurations. The feed groove 42 traverses the central axis 44. The feed groove 42 could be substantially perpendicular or oblique to the rotational direction and/or central axis 44.

The dimensions, angular orientation and number of the axial grooves 49 are design dependent and based in part on the translational range of the rotatable runner 15, the widths of the annular seal rings 3, 4, the extent of overlap or non-overlap between adjacent groove structures 41, the number of flows from a groove structure 41 required to impinge each annular seal ring 3, 4, the pressure required to adequately seal the interface between the rotatable runner 15 and annular seal rings 3, 4, and/or other design factors.

An optional windback thread 47 could extend from the annular seal housing 2 in the direction of the second compartment 6. The windback thread 47 is an element known within the art that utilizes the shear forces produced by a rotating shaft to circumferentially wind a fluid along one or more threads. The threads are disposed along the inner annular surface of the windback thread 47 and oriented so that a fluid enters the threads and is directed away from the annular seal rings 3, 4 within a seal assembly 1. The windback thread 47 could be machined into the annular seal housing 2 or mechanically attached or fastened thereto as a separate element via methods understood in the art. The windback thread 47 is disposed about the runner 15 so as to overlay the runner 15 without contact. A plurality of optional slots 48 are positioned along one end of the rotatable runner 15 adjacent to the windback thread 47. The slots 48 could interact with the windback thread 47 to sling a fluid away from the annular seal rings 3, 4 in the direction of the second compartment 6. Although shown with several embodiments, it is understood that an optional windback thread 47 is applicable to other embodiments described herein.

Figure 11:
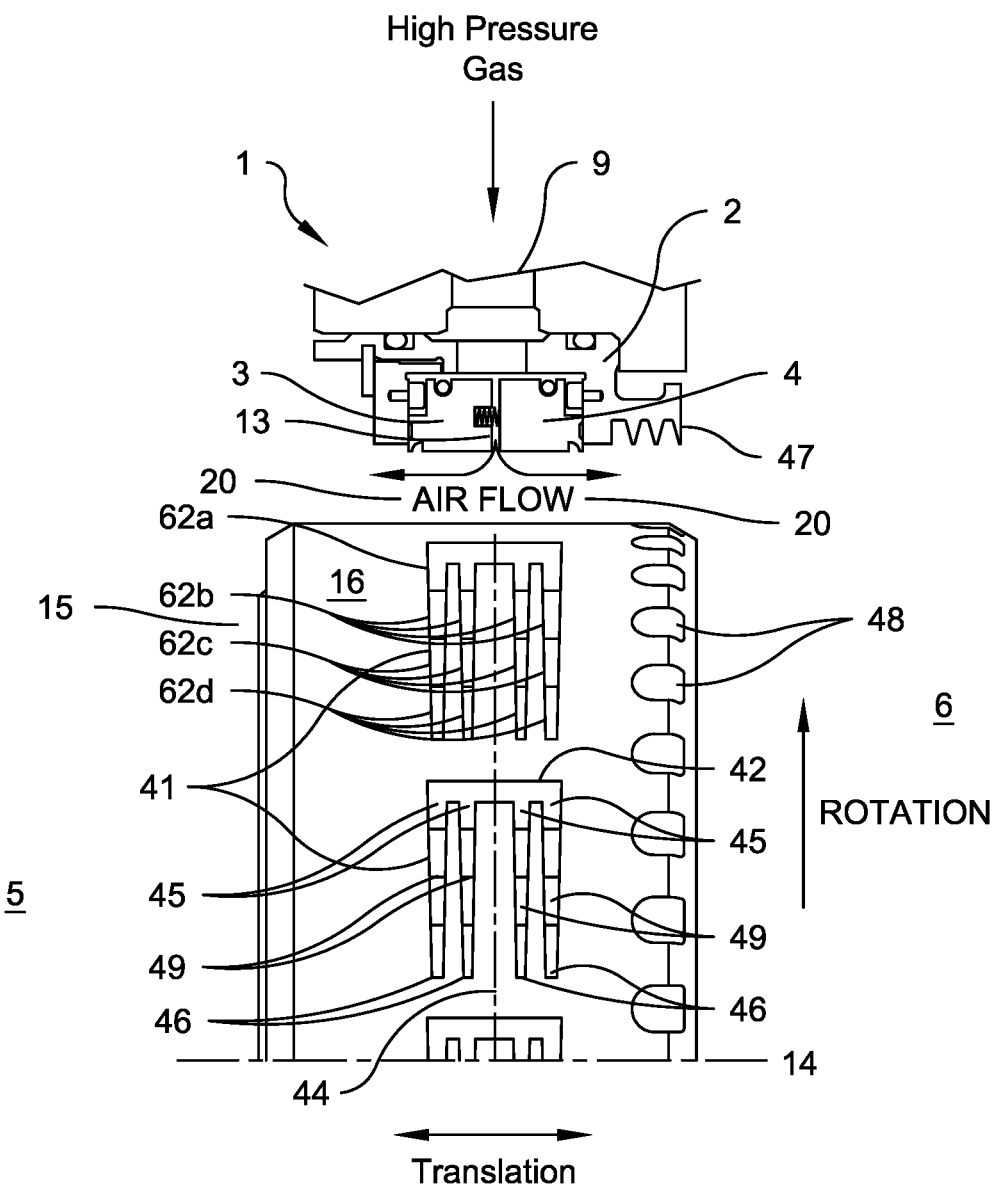
FIG. 11 is a partial cross section view illustrating an annular seal assembly including a pair of annular seal rings separated by a gap within a seal housing with an optional windback thread disposed about a rotatable runner attached to a shaft (cross section of annular seal assembly and runner below centerline and shaft not shown) and optional slots positioned along one end of the rotatable runner adjacent to the windback thread wherein an outer annular surface along the runner includes a plurality of multi-groove structures separately disposed thereon whereby the grooves are tapered, each groove includes at least two steps, and each multi-groove structure communicates with both seal rings in accordance with an embodiment of the invention.

In some embodiments, it might be advantageous to taper the axial grooves 49 as represent in FIG. 11. The axial groove 49 could include a width at the inlet end 45 that is greater than the width at the outlet end 46 so that the width decreases with distance along the axial groove 49. This arrangement progressively reduces the volume through which the gas passes causing a gas to compress with distance along the axial groove 49, thereby further increasing the pressure otherwise achieved along an axial groove 49 with uniform width. This effect is also possible by tapering the axial groove 49 depthwise along the length of the axial groove 49 so that the depth at the inlet end 45 is greater than the depth at the outlet end 46.

Figure 12:
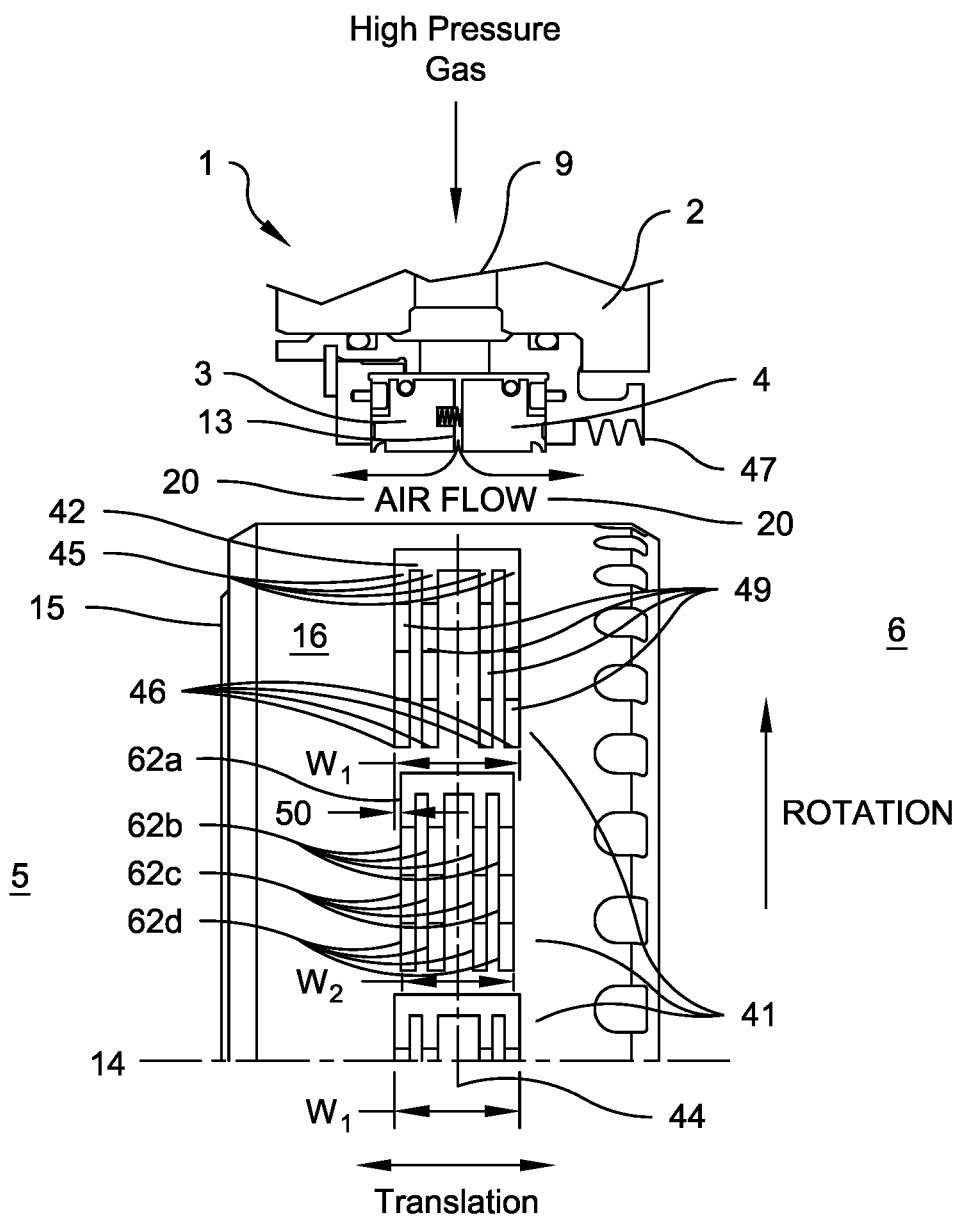
FIG. 12 is a partial cross section view illustrating an annular seal assembly including a pair of annular seal rings separated by a gap within a seal housing with an optional windback thread disposed about a rotatable runner attached to a shaft (cross section of annular seal assembly and runner below centerline and shaft not shown) wherein an outer annular surface along the runner includes a plurality of multi-groove structures separately disposed thereon whereby the width of adjacent multi-groove structures vary, each groove includes at least two steps, and each multi-groove structure communicates with both seal rings in accordance with an embodiment of the invention.
Figure 13:
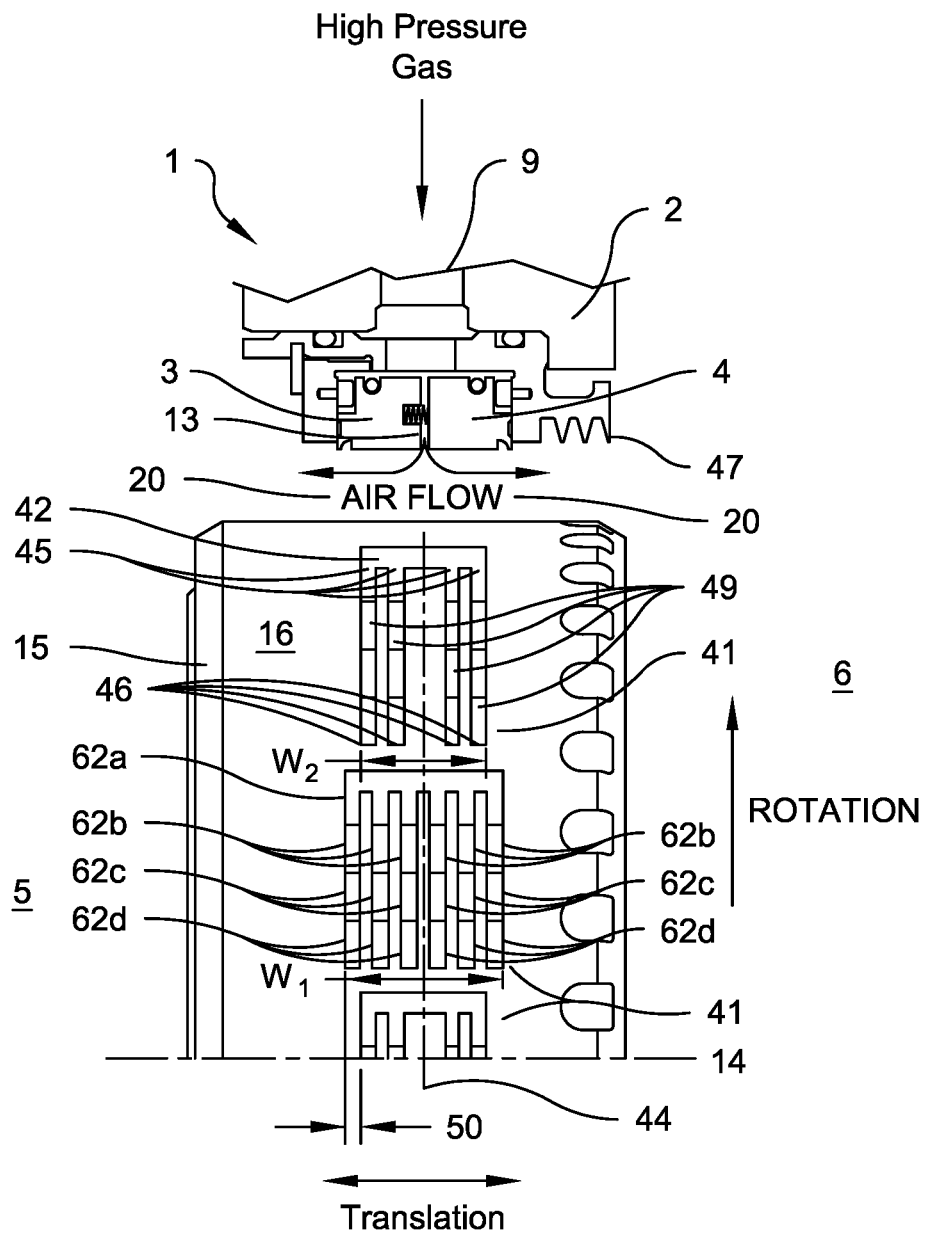
FIG. 13 is a partial cross section view illustrating an annular seal assembly including a pair of annular seal rings separated by a gap within a seal housing with an optional windback thread disposed about a rotatable runner attached to a shaft (cross section of annular seal assembly and runner below centerline and shaft not shown) wherein an outer annular surface along the runner includes a plurality of multi-groove structures separately disposed thereon whereby the number of grooves within adjacent multi-groove structures vary, each groove includes at least two steps, and each multi-groove structure communicates with both seal rings in accordance with an embodiment of the invention.

In yet other embodiments, the groove structures 41 could vary widthwise as represented in FIGS. 12 and 13. The width between adjacent groove structures 41 could differ so that the axial width $W_1$ of one groove structure 41 is greater than the axial width $W_2$ of the next groove structure 41 resulting in an overhang 50. The overhang 50 facilitates a staggered arrangement of axial grooves 49 between adjacent groove structures 41 when the total number of axial grooves 49 is the same in each groove structure 41 as represented in FIG. 12 and when the total numbers of axial grooves 49 differ between groove structures 41 as represented in FIG. 13. Both embodiments increase sealing effects over a greater range of translations by a rotatable runner 15.

Each axial groove 49 further includes at least two optional steps 62a-62d. Although four steps 62a-62d are illustrated along the axial grooves 49 in FIGS. 10-13, it is understood that two or more such steps 62a-62d may reside along each axial groove 49. Each step 62a-62d corresponds to a change in the local depth of the axial groove 49 relative to the outer annular surface 16. For example, if an axial groove 49 includes two steps 62a, 62b, then one step 62a would have a first depth and another step 62b would have a second depth. The depths differ so that one depth is deeper and another depth is shallower. In preferred arrangements, the steps 62a-62d are arranged so that the change in local depth from one step to another step results in a stepwise variation along the length of each axial groove 49.

When the axial grooves 49 intersect a feed groove 42, the first step 62a may be located at the feed groove 42 and immediately adjacent to and communicable with the next step 62b along each axial groove 49. In other embodiments, two or more steps may reside within the feed groove 42 and at least one step along each axial groove 49. In yet other embodiments, one step 62a may reside along the feed groove 42 and a portion of one or more axial grooves 49 and the remaining step(s) 62b reside(s) exclusively along each axial groove 49, as illustrated in FIGS. 10-13. Regardless of the exact arrangement, the steps 62a-62d are arranged consecutively to effect a stepwise variation of the depth along the length of each groove structure 41.

Referring again to FIGS. 10-13, a gas enters the inlet(s) 9 and is directed into the gap 13 between the annular seal rings 3, 4. The gas traverses the gap 13 thereafter impinging the feed groove 42 along outer annular surface 16 of the rotatable runner 15. The gas is bifurcated along the feed groove 42 allowing the gas to enter the inlet ends 45 so that a first portion is directed into the left-side axial grooves 49 and a second portion is directed into the right-side axial grooves 49. The quantity and/or rate of gas communicated onto each of the annular seal rings 3, 4 may be the same or different. The gas traverses the respective axial grooves 49 and is redirected outward from the rotatable runner 15 at the outlet end 46 of each axial groove 49. The gas exits at least one left-side axial groove 49 within a groove structure 41 and impinges the first annular seal ring 3 forming a thin-film layer 20 between the first annular seal ring 3 and rotatable runner 15, thereby separating the first annular seal ring 3 from the rotatable runner 15. The gas exits at least one right-side axial groove 49 within a groove structure 41 and impinges the second annular seal ring 4 forming a thin-film layer 20 between the second annular seal ring 4 and rotatable runner 15, thereby separating the second annular seal ring 4 from the rotatable runner 15.

In some embodiments, it might be advantageous to direct a gas through the rotatable runner 15 or 35 rather than or in addition to between the first and second annular seal rings 3, 4 or 23, 24.

Figure 14:
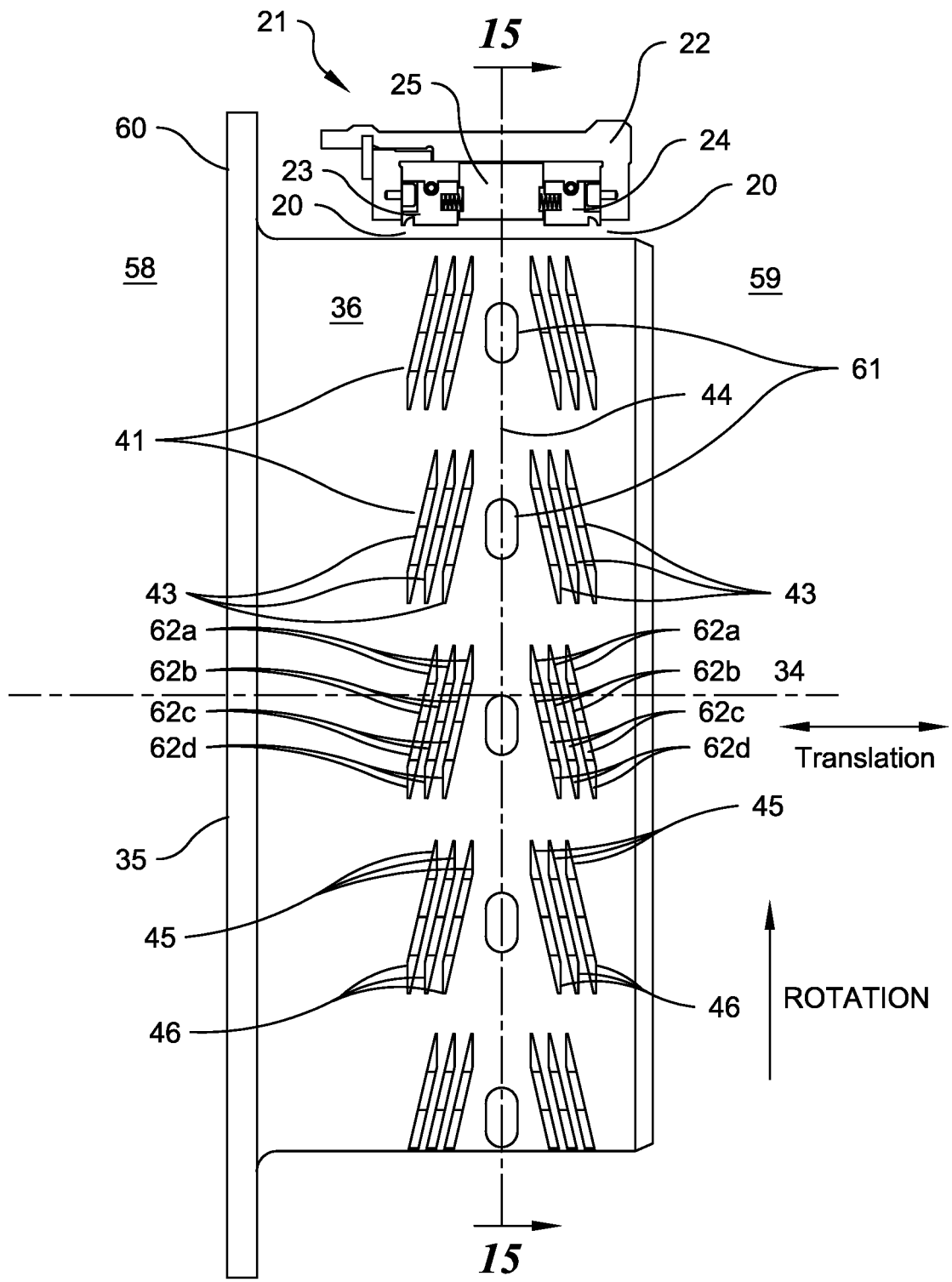
FIG. 14 is a partial cross section view illustrating an annular seal assembly including a pair of annular seal rings separated by a center ring within a seal housing disposed about a rotatable runner attached to a shaft (cross section of annular seal assembly below runner and shaft not shown) wherein an outer annular surface along the runner includes a plurality of bifurcated multi-groove structures separately disposed thereon whereby each groove includes at least two steps, each multi-groove structure communicates with both seal rings, and a plurality of through holes are disposed along the rotatable runner in accordance with an embodiment of the invention.
Figure 15:
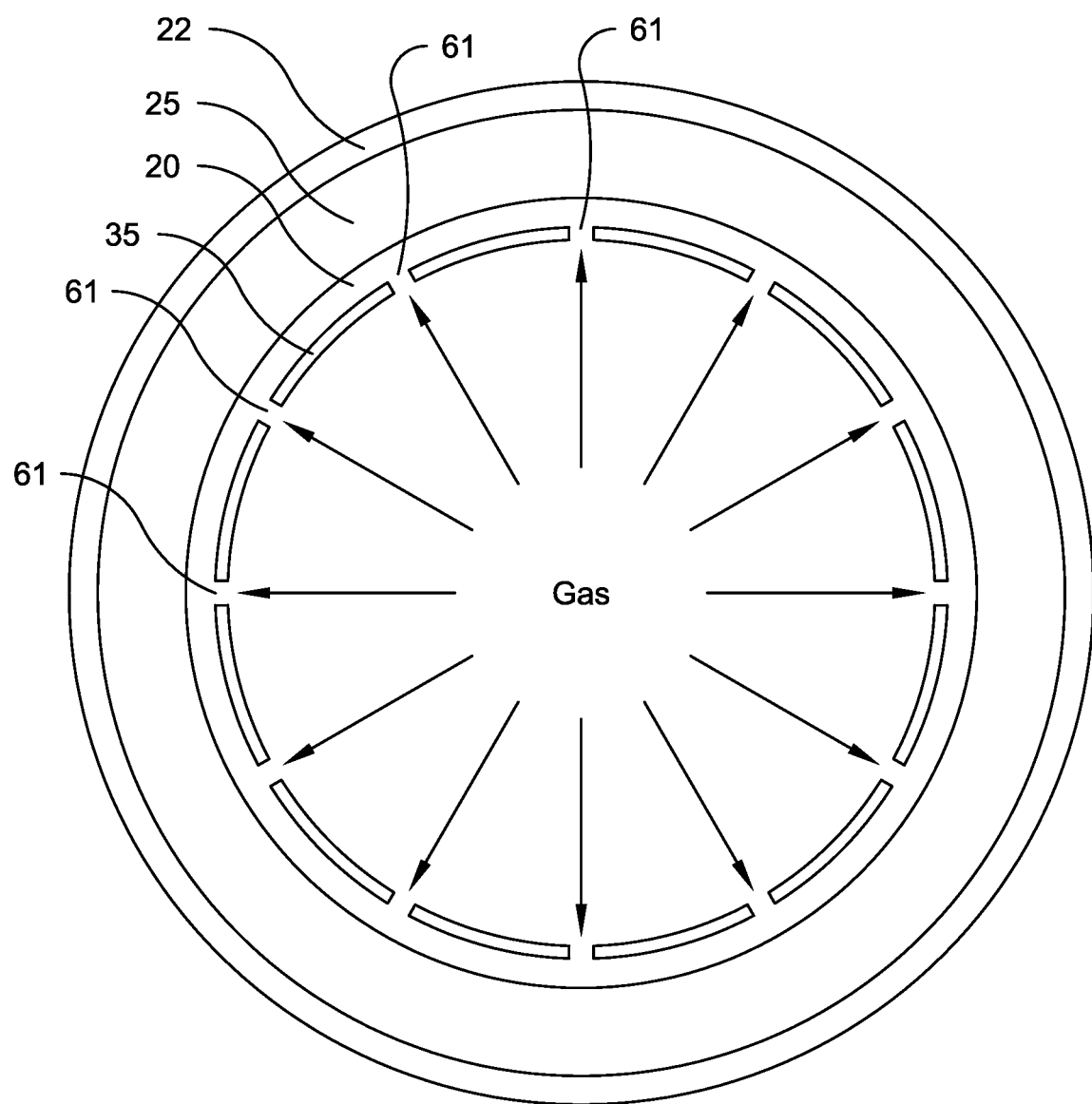
FIG. 15 is a cross section view illustrating the annular seal housing, the center ring, and the rotatable runner with through holes wherein the holes communicate a gas through the rotatable runner and onto the outer annular surface of the rotatable runner so that the gas enters the stepped grooves along the rotatable runner for redirection onto the inner annular surface of a first annular seal ring and a second annular seal ring in accordance with an embodiment of the invention.

Referring now to FIGS. 14 and 15, a seal assembly 21 is shown in cross-sectional form disposed about a rotatable runner 35, the latter illustrated in side-view form, between a first compartment 58 and a second compartment 59. The first and second compartments 58, 59 could include a low-pressure gas. Gas within the second compartment 59 could be at a higher pressure than the first compartment 58. One or both compartments 58, 59 could further include a lubricant. The annular seal housing 22 could include an optional windback thread 47 as illustrated in FIGS. 10-13.

The rotatable runner 35 includes a plurality of groove structures 41 and could further include an optional flange 60. The groove structures 41 are arranged circumferentially along the outer annular surface 36 of the rotatable runner 35 immediately adjacent to the seal assembly 21. The groove structures 41 are positioned so as to communicate a gas onto the annular seal rings 23, 24 as the rotatable runner 35 rotates with respect to the seal assembly 21. While FIG. 14 shows bifurcated groove structures 41, it is understood that all groove structures 17, 37, 41, 55 described herein are applicable to embodiments wherein a gas is directed through a rotatable runner 15, 35. An optional center ring 25 could be interposed between the first and second annular seal rings 23, 24, as otherwise described herein. It is likewise possible for the seal assembly 21 to not include a center ring 25, as also described herein.

A plurality of through holes 61 are separately disposed about the circumference of the rotatable runner 35, as represented in FIGS. 14 and 15. Each through hole 61 could traverse the rotatable runner 35 so as to allow passage of a gas along one side of the rotatable runner 35 to another side of the rotatable runner 35, preferably from a region adjacent to the inner portion of the rotatable runner 35 and onto the outer annular surface 36 of the rotatable runner 35 adjacent to the groove structures 41 and the first and second annular seal rings 23, 24.

The number, size, shape, location, and arrangement of the through holes 61 should allow communication of a gas through the rotatable runner 35 and onto the outer annular surface 36 so as to form a thin-film layer 20 between the first and second annular seal rings 23, 24 and the rotatable runner 35. In some embodiments, it might be advantageous for each through hole 61 to be elongated along the central axis 44 and aligned therewith with one such through hole 61 interposed between each paired arrangement of diagonal grooves 43, as represented in FIG. 14. Other configurations are possible.

Each diagonal groove 43 further includes at least two optional steps 62a-62d. Although four steps 62a-62d are illustrated along each diagonal groove 43 in FIG. 14, it is understood that two or more such steps 62a-62d may reside along each diagonal groove 43. Each step 62a-62d corresponds to a change in the local depth of the diagonal groove 43 relative to the outer annular surface 36. For example, if a diagonal groove 43 includes two steps 62a, 62b, then one step 62a would have a first depth and another step 62b would have a second depth. The depths differ so that one depth is deeper and another depth is shallower. In preferred arrangements, the steps 62a-62d are arranged so that the change in local depth from one step to another step results in a stepwise variation along the length of each diagonal groove 43. Regardless of the exact arrangement, the steps 62a-62d are arranged consecutively to effect a stepwise variation of the depth along the length of each groove structure 41.

Referring again to FIGS. 14 and 15, a gas enters the through holes 61 along the rotatable runner 35 and is directed outward in the direction of the first and second annular seal rings 23, 24 with or without the center ring 25. The gas flows onto the rotatable runner 35 so as to impinge the outer annular surface 36 of the rotatable runner 35, preferably at or near the inlet ends 45. The gas is bifurcated by the groove structure 41 at the inlet ends 45 so that a first portion is directed into the left-side diagonal grooves 43 and a second portion is directed into the right-side diagonal grooves 43. The quantity and/or rate of gas communicated onto each of the annular seal rings 23, 24 may be the same or different. The gas traverses the respective diagonal grooves 43 and is redirected outward from the rotatable runner 35 at the outlet end 46 of each diagonal groove 43. The gas exits at least one left-side diagonal groove 43 within a groove structure 41 and impinges the first annular seal ring 23 forming a thin-film layer 20 between the first annular seal ring 23 and rotatable runner 35, thereby separating the first annular seal ring 23 from the rotatable runner 35. The gas exits at least one right-side diagonal groove 43 within a groove structure 41 and impinges the second annular seal ring 24 forming a thin-film layer 20 between the second annular seal ring 24 and rotatable runner 35, thereby separating the second annular seal ring 24 from the rotatable runner 35.

As described herein, a gas enters the diagonal or axial groove 19, 38, 43 49 so that some or all of the gas entering the groove 19, 38, 43, 49 either partially or completely traverses the length thereof. The inward flow of the gas results in a pressure gradient. The result is a pressure profile that steadily increases along the length of the groove 19, 38, 43, 49 so that the pressure downstream is generally higher than the pressure upstream. The pressure profile may be linear, non-linear, or a combination thereof.

Figure 16:
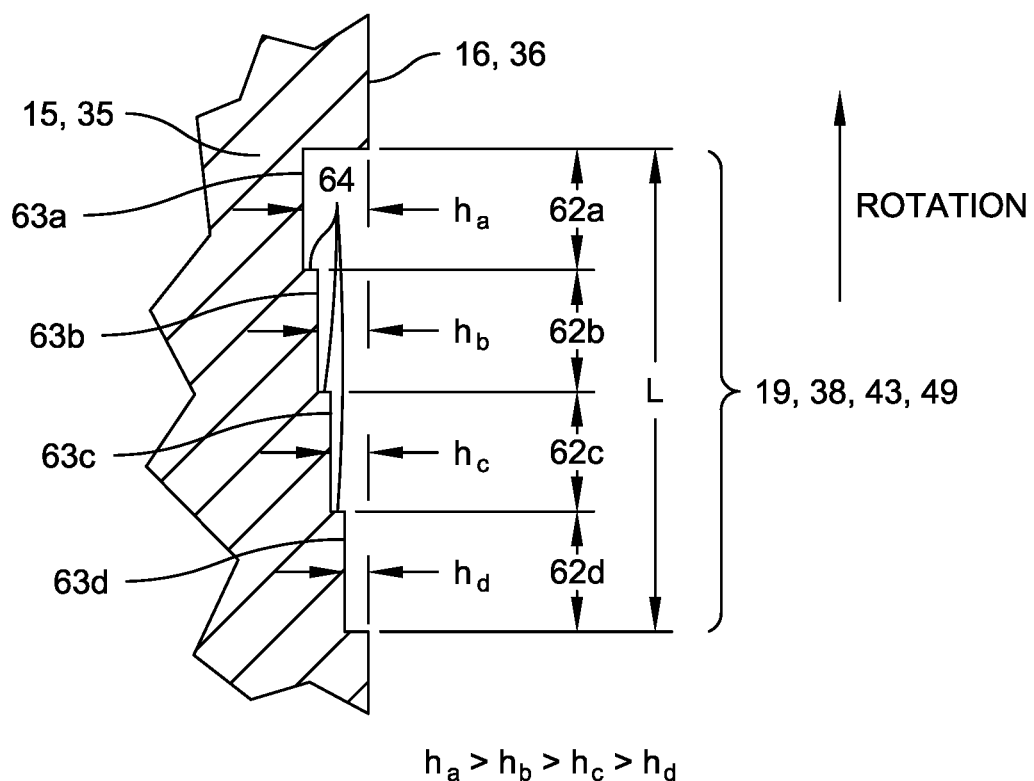
FIG. 16 is a cross section view illustrating a stepped groove with an exemplary profile whereby the depth of each adjoining step decreases in the direction opposite to rotation in accordance with an embodiment of the invention.
Figure 17:
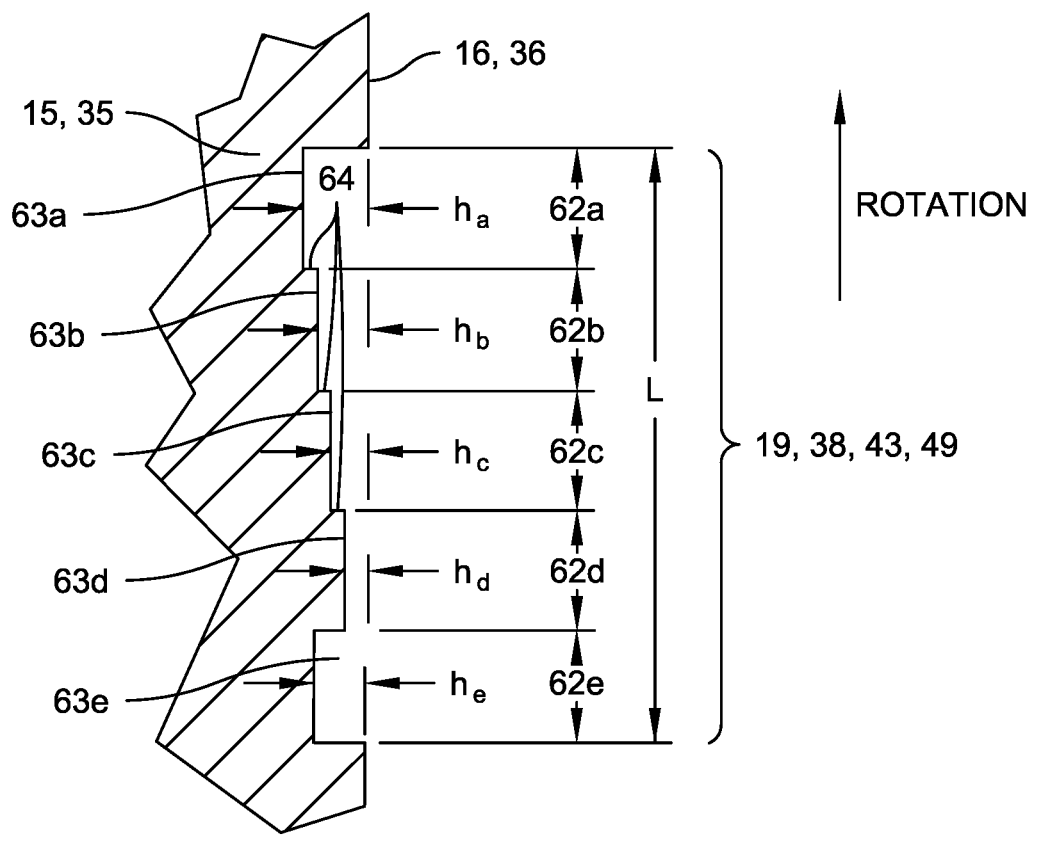
FIG. 17 is a cross section view of a rotatable runner illustrating an alternate stepped groove whereby the depth of at least one adjoining step decreases in the direction opposite to rotation and the depth of at least one adjoining step increases in the direction opposite to rotation in accordance with an embodiment of the invention.

Referring now to FIGS. 16 and 17, exemplary radial and axial grooves 19, 38, 43, 49 with four steps 62a-62d and five steps 62a-62e, respectively, are shown in an end-to-end configuration along the outer annular surface 16, 36 of a rotatable runner 15, 35. The steps 62a-62d, 62a-62e form a single pocket-like structure that opens outward in the direction of the outer annular surface 16, 36. FIG. 16 illustrates the stepwise orientation of the steps 62a-62d whereby the first step 62a, second step 62b, third step 62c, and fourth step 62d separately extend into the rotatable runner 15, 35 at four depths $h_a$, $h_b$, $h_c$, $h_d$, respectively. FIG. 17 illustrates the stepwise orientation of the steps 62a-62e whereby the first step 62a, second step 62b, third step 62c, fourth step 62d, and fifth step 62e separately extend into the rotatable runner 15, 35 at five depths $h_a$, $h_b$, $h_c$, $h_d$, $h_e$ respectively. In preferred embodiments, the depths $h_a$, $h_b$, $h_c$, $h_d$ should decrease incrementally ($h_a > h_b > h_c > h_d$) in the direction opposite of the rotational direction of the rotatable runner 15, 35. However, it is only required that at least one downstream step 62b-62d be at a depth less than one upstream step 62a-62c. In other embodiments, it might be advantageous to include at least one downstream step 62b-62e at a depth $h_b$, $h_c$, $h_d$, $h_e$ greater than the depth $h_a$, $h_b$, $h_c$, $h_d$ of at least one upstream steps 62a-62d.

Referring again to FIGS. 16 and 17, the depths $h_a$, $h_b$, $h_c$, $h_d$, $h_e$ generally represent the distance from the outer annular surface 16, 36 to the base 63a-63e of each respective step 62a-62e, although other methods of determining the depths $h_a$, $h_b$, $h_c$, $h_d$, $h_e$ are possible. Each base 63a-63e is defined by a surface of generally planar extent along the rotatable runner 15, 35; however, other shapes are possible. The bases 63a-63e may be oriented so that two or more such bases 63a-63e are parallel, as shown in FIGS. 16 and 17. Regardless of the shape and orientation of each base 63a-63e, the transition from one step 62a-62d to another step 62b-62e defines a base shoulder 64. The base shoulder 64 represents an abrupt change or discontinuity in the depth profile between the inlet and outlet end of the diagonal groove 19, 38, 43 and the axial groove 49.

As the rotatable runner 15, 35 rotates, a gas adjacent to or communicated onto the rotatable runner 15, 35 flows into and along the steps 62a-62e in the direction opposite to the rotational direction of the rotatable runner 15, 35. In addition to or in place of the flow patterns implemented by the various groove structures 17, 37, 41, 55 as otherwise described herein, interaction between the gas and each base shoulder 64 redirects the circumferential flow along each step 62a-62e so that some or all of the gas is locally directed radially outward toward the first and second annular seal rings 3, 4 or 23, 24. The result is turbulent and/or non-turbulent flow adjacent to each base shoulder 64 causing localized pressure discontinuities along the pressure profile described herein that enhance the thin-film layer 20 formed between the outer annular surface 16, 36 and first and second annular seal rings 3, 4 or 23, 24. The enhanced stiffness of the resultant thin-film layer 20 allows for higher operating differential pressures without the seal contacting the runner which extends seal life and lowers heat generation. The gas that leaks thru the thin-film layer 20 prevents or minimizes a lubricant from leaking into the sealing chamber and/or entering one or both lower pressure compartments 5, 6.

Figure 18:
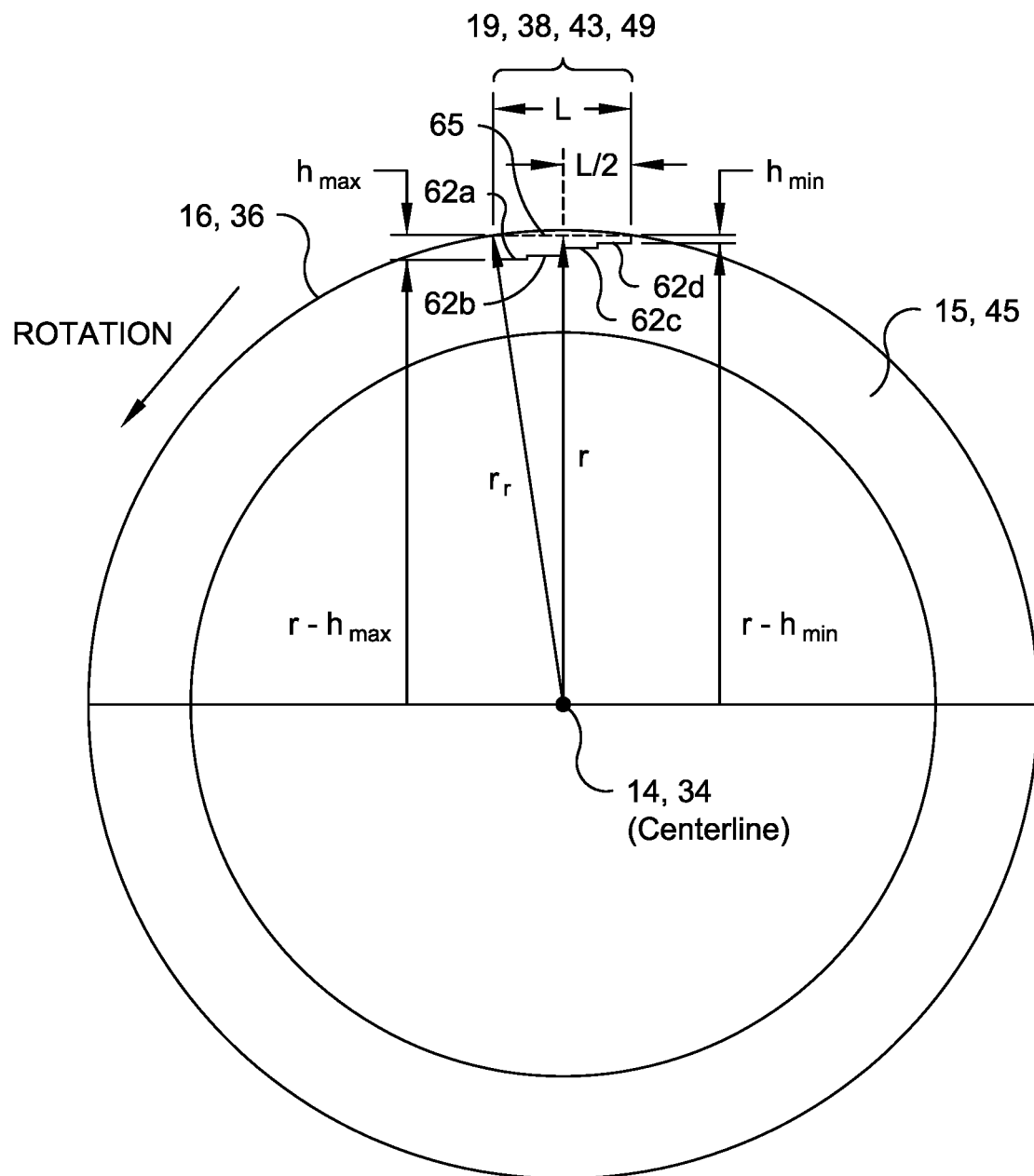
FIG. 18 is a cross section view illustrating dimensions along a rotatable runner and a stepped groove for calculating the distance ratio (R) based on the adjusted radial distance (r−h) over the runner radius ($r_r$) whereby the upper distance ratio ($R_U$) corresponds to the shallowest step (($r-h_{min}$)/$r_r$) and the lower distance ratio ($R_L$) corresponds to the deepest step (($r-h_{max}$)/$r_r$).

Referring now to FIG. 18, a groove 19, 38, 43, 49 is shown along the outer annular surface 16, 36 of a rotatable runner 15, 35. The groove 19, 38, 43, 49 is shown with steps 62a-62d arranged stepwise so that the deepest step 62a is at the leftmost or upstream end and the shallowest step 62d is at the rightmost or downstream end. The groove 19, 38, 43, 49 is defined to include a length (L) centered with the centerline 14, 34 so that one-half of the length (L) is to the left of the centerline 14, 34 and one-half of the length (L) is to the right of the centerline 14, 34. Each step 62a-62d has a unique depth (h) whereby the deepest groove defines the maximum depth ($h_{max}$) and the shallowest groove defines the minimum depth ($h_{min}$). The left end of the leftmost step 62a and the right end of the rightmost step 62d intersect the outer annular surface 16, 36 thereby defining a line 65. The line 65 intersects the radial distance (r), drawn from the centerline 14, 34, at a right angle.

The location of each base 63a-63e may be defined as by distance ratio (R) representing the radial distance (r) adjusted by the depth (h) of a step 62a-62e over the runner radius $r_r$. The distance ratio (R) is calculated by the equation $$R = \frac{r-h}{r_r} \quad (1)$$

where r is further calculated by the equation $$r = \sqrt{r_r^2 - \left(\frac{L}{2}\right)^2} \quad (2)$$

whereby the combination of equations (1) and (2) yields the equation $$R = \frac{\sqrt{\left(r_r^2 - \left(\frac{L}{2}\right)^2\right)} - h}{r_r} \quad (3)$$

Figure 19A:
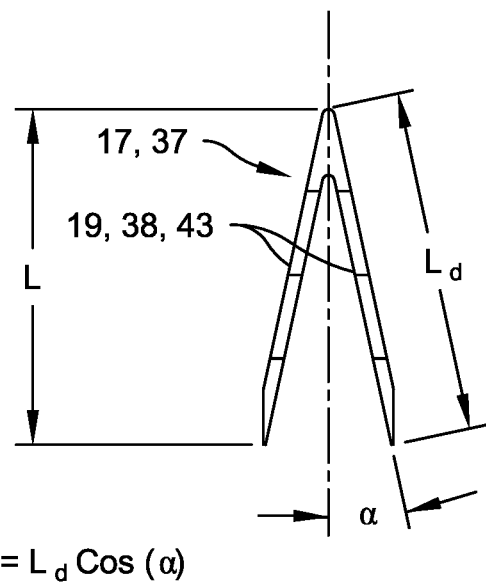
FIG. 19a is an enlarged view illustrating the length (L) of a groove structure with stepped grooves aligned diagonal to the direction of rotation in accordance with an embodiment of the invention.
Figure 19B:
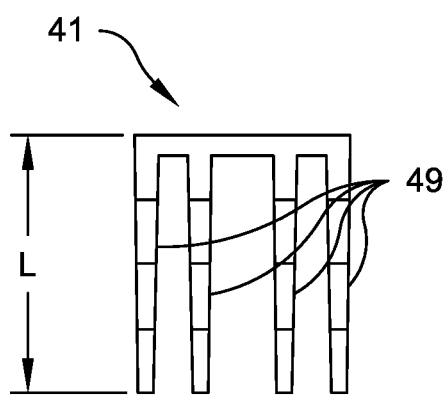
FIG. 19b is an enlarged view illustrating the length (L) of a groove structure with stepped grooves aligned along the direction of rotation in accordance with an embodiment of the invention.

For purpose of Equation (3), the length (L) corresponds to the chord or circumferential length as described in FIGS. 19a and 19b after all appropriate adjustments (if required) and the depth (h) of a groove 62a-62e corresponds to the vertical distance between line 65 and the base 63a-63e. If the base 63a-63e is non-planar or angled, then a maximum depth or an average depth may be appropriate for calculational purposes. The lower and upper bounds for the distance ratio (R) for a groove 19, 38, 43, 49 are calculable for a given length (L) and runner radius ($r_r$) where the lower distance ratio ($R_L$) corresponds to the maximum depth ($h_{max}$) and the upper distance ratio ($R_U$) corresponds to the minimum depth ($h_{min}$).

It may be advantageous in some applications to include one or more shoulders along both bottom wall and side walls of a hydrodynamic groove within a groove structure. These multi-axis stepped grooves, several examples illustrated in FIGS. 20a-28g, are applicable to the various embodiments described herein. While various embodiments of multi-axis stepped grooves described with reference to two grooves intersecting and communicable with a feed groove, it is understood that the scope of groove structures includes two or more grooves with or without a feed groove.

Referring now to FIGS. 20a-21b, a groove structure 66 is positioned along the outer annular surface 68 of a rotatable runner 67 whereby the groove structure 66 includes grooves 69 which intersect a feed groove 70. Although one groove structure 66 is illustrated for descriptive purposes in FIGS. 20a-27b, it is understood that a plurality of such groove structures 66 are situated about the outer annular surface 68, such as shown in FIGS. 2, 3, and 5-14, so as to properly maintain a thin-film layer 20 between a runner 15 or 35 and a paired arrangement of seal rings 3, 4 or 23, 24.

Referring again to FIGS. 20a-21b, the feed groove 70 is communicable with the grooves 69 so that a gas entering the feed groove 70 thereafter flows into each groove 69. The resultant flow pattern requires the gas within the feed groove 70 to be separated so that a portion of the gas enters each groove 69. The grooves 69 are positioned with respect to the feed groove 70 so that the gas portion flows into and then along each groove 69 from an upstream end 81 to a downstream end 82. The resultant flow pattern is in a direction opposite to the rotation direction of the rotatable runner 67.

Referring again to FIGS. 20a-21b, each groove 69 includes two or more steps 71, although three steps 71 are illustrated by way of example. Each step 71 includes and is defined by a base wall 72 which corresponds to the bottom of the groove 69. Base walls 72 are situated relative to one another so that the effective groove depth $D_G$ decreases along the groove 69 from the upstream end 81 to the downstream end 82. Each two adjoining steps 71 are separated by a base shoulder 73. The base shoulder 73 is an abrupt change or discontinuity in the depth profile of the groove 69. The base shoulder 73 is disposed between a pair of base walls 72 so that the deeper end of the base shoulder 73 contacts the downstream side of one base wall 72 and the less deep end of the base shoulder 73 contacts the upstream side of another base wall 72. An additional base shoulder 73 may be positioned at the downstream end 82 to terminate the groove 69. The resulting profile formed by the base walls 72 and the base shoulders 73 defines the floor or base portion of a groove 69. In some embodiments, a base shoulder 73 may be located at the interface between the feed groove 70 and a groove 69, as illustrated in FIGS. 20a-21b. In other embodiments, the depths of the feed groove 70 and a groove 69 at the inlet end of the groove structure 66 may be the same so that the transition avoids a base shoulder 73 therebetween, as illustrated in FIGS. 25a-27b.

Referring again to FIGS. 20a-21b, each groove 69 further includes a pair of side walls 74. The side walls 74 are disposed about and intersect two or more base walls 72 to define the shape of a groove 69. Each side wall 74 may include one or more side shoulders 75. A side shoulder 75 is an abrupt change or discontinuity in the width profile of the groove 69. The side shoulder 75 is disposed along a side wall 74 so that the groove width $W_G$ upstream from the side shoulder 75 is wider than the groove width $W_G$ downstream from the side shoulder 75. The resulting profile formed by each side wall 74 and corresponding side shoulder(s) 75 define the lateral bounds of a groove 69 whereby the effective groove width $W_G$ decreases along the groove 69 from the upstream end 81 to the downstream end 82.

Figure 20A:
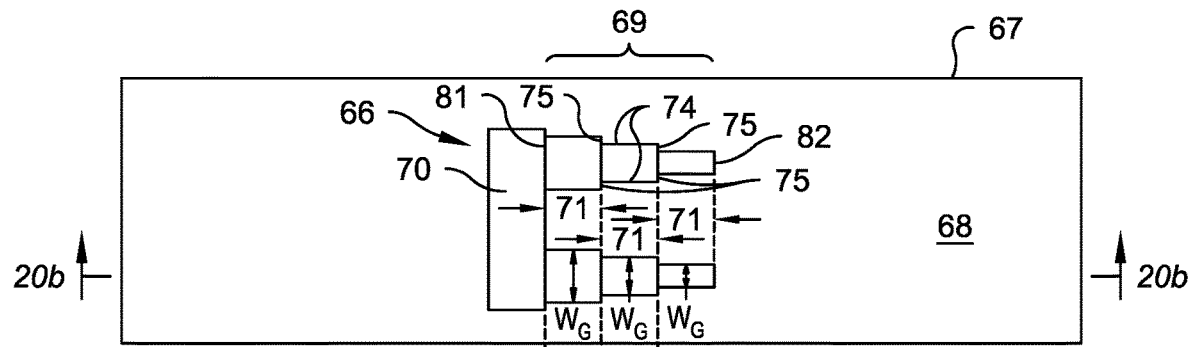
FIG. 20a is a circumferential side view illustrating a rotatable runner with a groove structure including a feed groove communicating with grooves whereby each groove further includes side shoulders and base shoulders which intersect and the side shoulders arranged in an opposed arrangement in accordance with an embodiment of the invention.
Figure 20B:
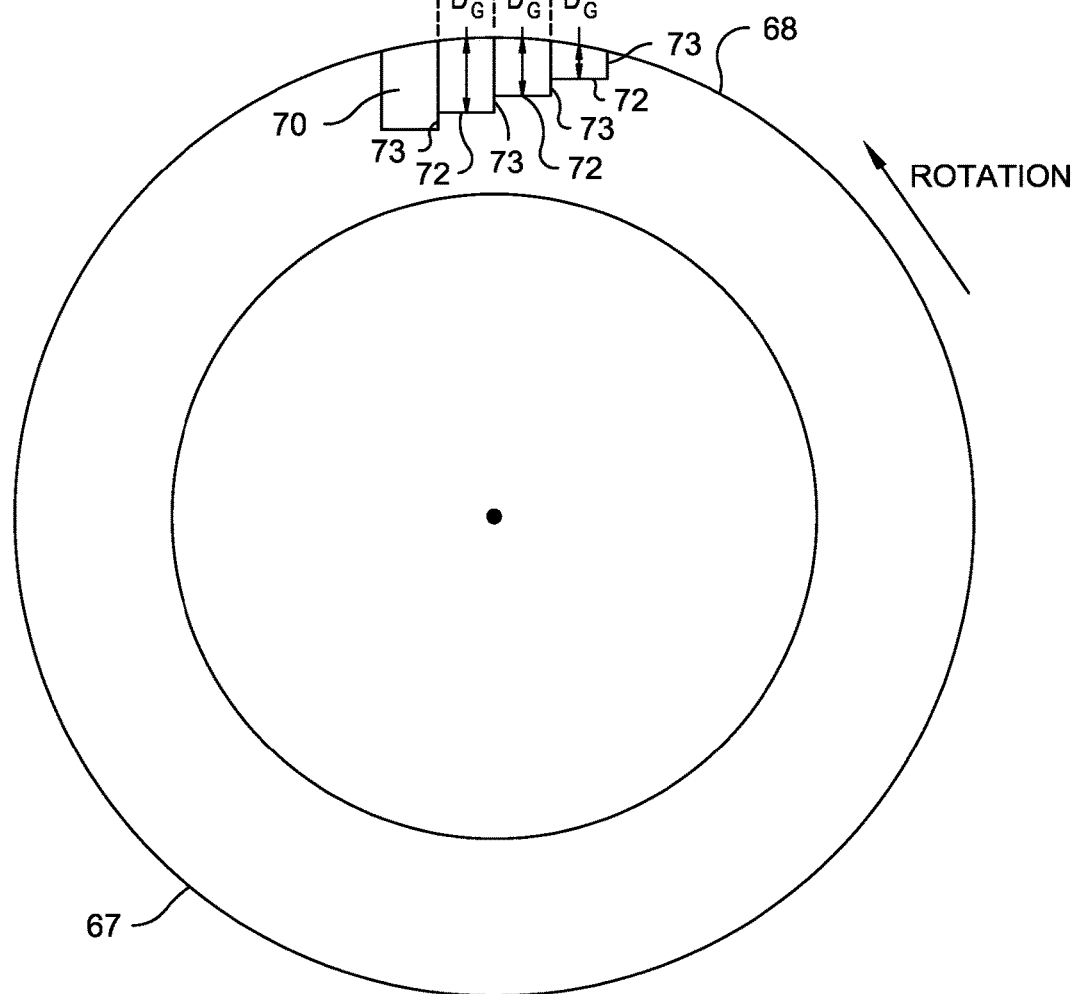
FIG. 20b is a cross section view illustrating a rotatable runner with a groove structure including a feed groove communicating with grooves whereby each groove further includes side shoulders and base shoulders which intersect and the side shoulders arranged in an opposed arrangement in accordance with an embodiment of the invention.
Figure 22:
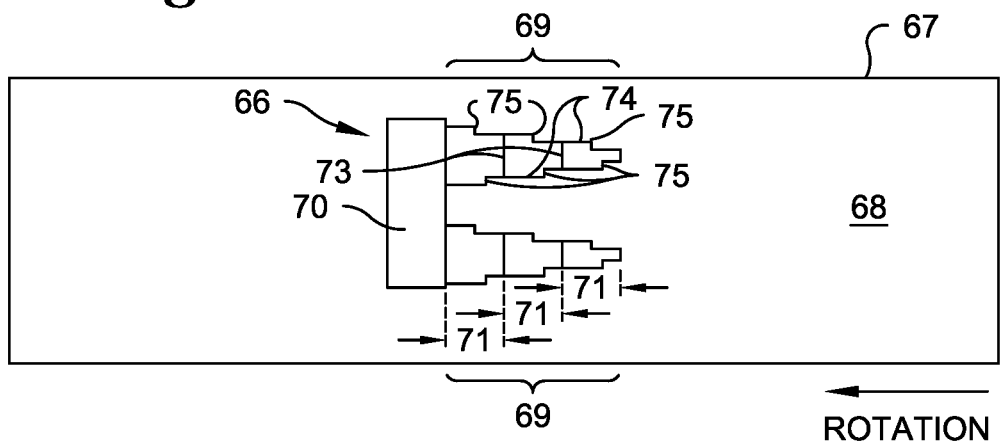
FIG. 22 is a circumferential side view illustrating a rotatable runner with a groove structure including a feed groove communicating with grooves whereby each groove further includes side shoulders and base shoulders which are offset and the side shoulders are arranged in an offset arrangement in accordance with an embodiment of the invention.
Figure 23:
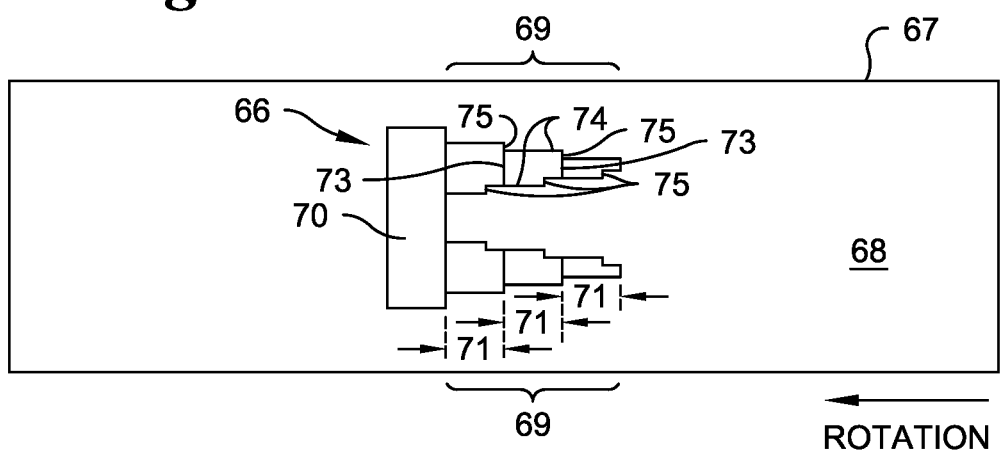
FIG. 23 is a circumferential side view illustrating a rotatable runner with a groove structure including a feed groove communicating with grooves whereby each groove further includes side shoulders and base shoulders wherein one side shoulder intersects a base shoulder and other side shoulders are arranged in an offset arrangement with respect to the intersecting side shoulder in accordance with an embodiment of the invention.
Figure 24:
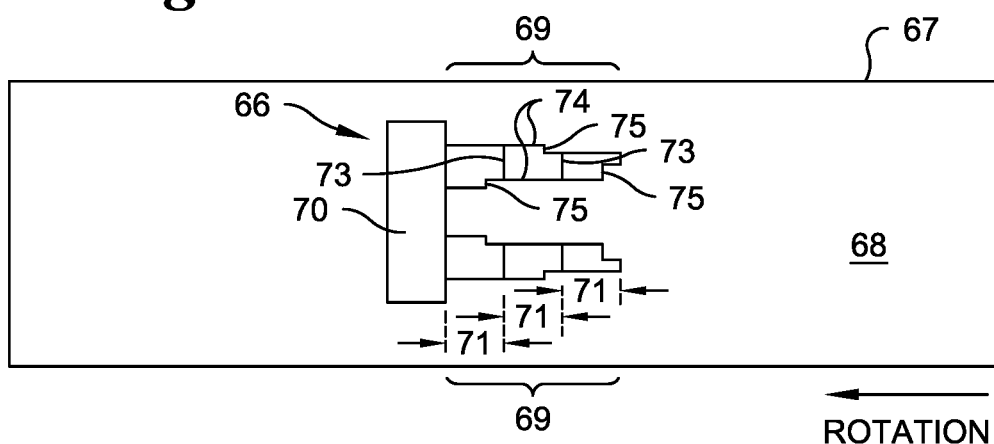
FIG. 24 is a circumferential side view illustrating a rotatable runner with a groove structure including a feed groove communicating with grooves whereby each groove further includes side shoulders and base shoulders wherein a pair of side shoulders are disposed about a base shoulder and the side shoulders are arranged in an offset arrangement in accordance with an embodiment of the invention.
Figure 28A:
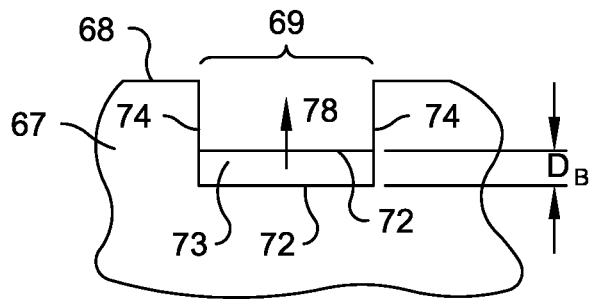
FIG. 28a is a cross section view in the downstream direction illustrating a rotatable runner with a base shoulder within a groove when the base shoulder does not intersect a side shoulder in accordance with an embodiment of the invention.
Figure 28B:
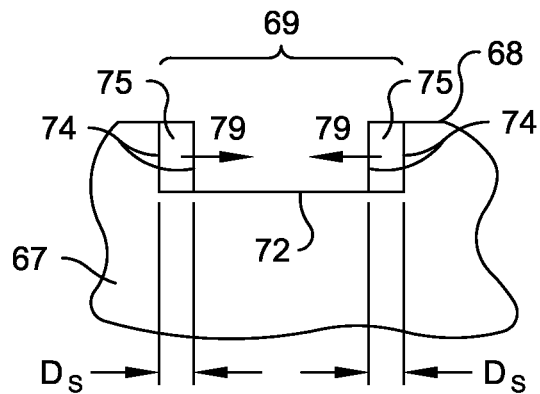
FIG. 28b is a cross section view in the downstream direction illustrating a rotatable runner with a pair of side shoulders arranged in an opposed arrangement within a groove when the side shoulders do not intersect a base shoulder in accordance with an embodiment of the invention.
Figure 28C:
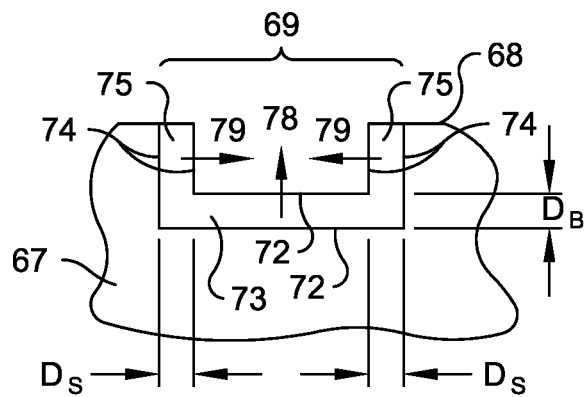
FIG. 28c is a cross section view in the downstream direction illustrating a rotatable runner with intersecting base shoulder and side shoulders in accordance with an embodiment of the invention.

Referring now to FIGS. 20a, 20b and 28c, side shoulders 75 may be situated so as to intersect the base shoulder 73. The side shoulders 75 are aligned in an opposed arrangement whereby one side shoulder 75 along one side wall 74 is directly across from another side shoulder 75 along another side wall 74. The side shoulders 75 are further aligned with the base shoulder 73 forming a substantially U-shaped wall along a plane which intersects a groove 69 between two adjoining steps 71, as generally illustrated in FIG. 28c. A narrowing of both the groove depth $D_G$ between adjoining steps 71 via a base shoulder 73 and the groove width $W_G$ between adjoining steps 71 via the side shoulders 75 reduces the local volume from one step 71 to another step 71 causing a corresponding increase in the effective local pressure of the gas in the downstream step(s) 71. This higher effective pressure improves the stiffness and sealing properties of a thin film, an example of the latter being the thin-film layer 20 between runner 15 or 35 and sealing rings 3, 4 or 23, 24 illustrated in FIGS. 2-3 and 5-15.

Referring now to FIGS. 21a, 21b, 28a and 28b, side shoulders 75 may be situated in an offset arrangement with respect to a base shoulder 73. In these embodiments, the base shoulder 73 is disposed between a pair of side shoulders 75 along each side wall 74. Two side shoulders 75 are aligned in an opposed arrangement along a plane which bisects the groove 69 upstream from the base shoulder 73 whereby one side shoulder 75 along one side wall 74 is directly across from another side shoulder 75 along another side wall 74. Two other side shoulders 75 are aligned in an opposed arrangement along a plane which bisects the groove 69 downstream from the base shoulder 73 whereby one side shoulder 75 along one side wall 74 is directly across from another side shoulder 75 along another side wall 74. The separation between base shoulder 73 and paired side shoulders 75 results in a decrease in the groove depth $D_G$ at the interface between adjoining steps 71 as illustrated in FIG. 28a *and a decrease in the groove width $W_G$ both upstream and downstream from the base shoulder* 73 as illustrated FIG. 28b. The bifurcated narrowing causes corresponding increases in the effective local pressure of the gas along each step 71 and between adjoining steps 71.

Figure 28D:
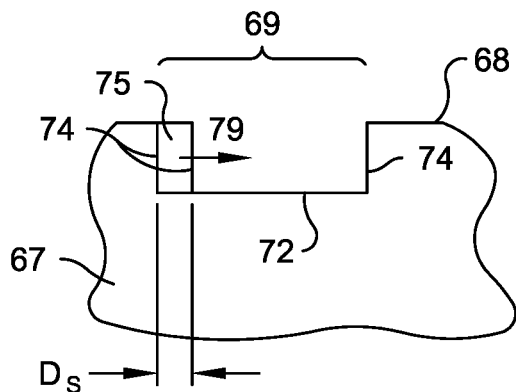
FIG. 28d is a cross section view in the downstream direction illustrating a rotatable runner with a side shoulder arranged at a left side within a groove when the side shoulder is not arranged in an opposed arrangement with another side shoulder and the side shoulder does not intersect a base shoulder in accordance with an embodiment of the invention.
Figure 28E:
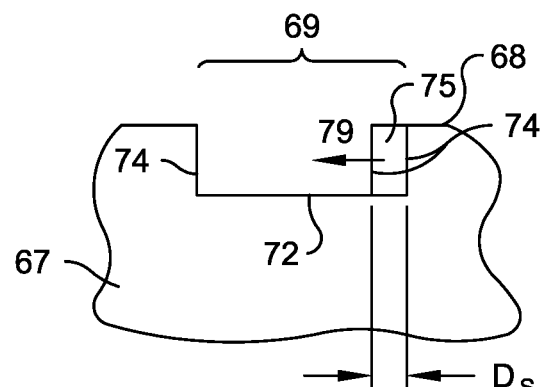
FIG. 28e is a cross section view in the downstream direction illustrating a rotatable runner with a side shoulder arranged at a right side within a groove when the side shoulder is not arranged in an opposed arrangement with another side shoulder and the side shoulder does not intersect a base shoulder in accordance with an embodiment of the invention.

Referring now to FIGS. 22, 28a, 28d and 28e, side shoulders 75 may be situated in an offset arrangement with respect to the base shoulder 73. In these embodiments, the base shoulder 73 is disposed between a pair of side shoulders 75 along each side wall 74. Two side shoulders 75 are aligned in an offset arrangement upstream from the base shoulder 73 whereby one side shoulder 75 along one side wall 74 is not directly across from another side shoulder 75 along another side wall 74. Two other side shoulders 75 are aligned in an offset arrangement downstream from the base shoulder 73 whereby one side shoulder 75 along one side wall 74 is not directly across from another side shoulder 75 along another side wall 74. The separation between base shoulder 73 and side shoulders 75 causes a decrease in the groove depth $D_G$ at the interface between adjoining steps 71 as illustrated in FIG. 28a and causes a two-step decrease in the groove width $W_G$ upstream and downstream from the base shoulder 73 as generally illustrated in FIGS. 28d and 28e. The separate and bifurcated narrowing causes corresponding increases in the effective local pressure of the gas along each step 71 and between adjoining steps 71.

Figure 28F:
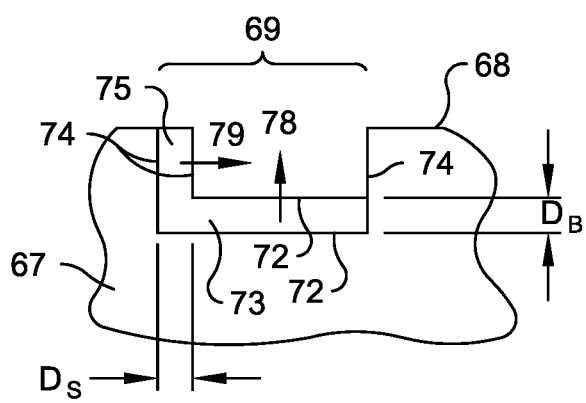
FIG. 28f is a cross section view in the downstream direction illustrating a rotatable runner with a side shoulder arranged at a left side within a groove when the side shoulder is not arranged in an opposed arrangement with another side shoulder and the side shoulder intersects a base shoulder in accordance with an embodiment of the invention.
Figure 28G:
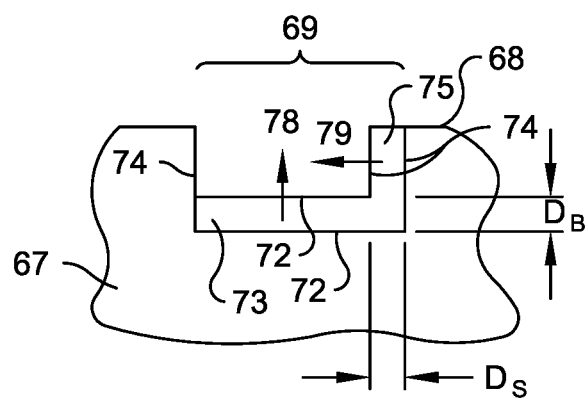
FIG. 28g is a cross section view in the downstream direction illustrating a rotatable runner with a side shoulder arranged at a right side within a groove when the side shoulder is not arranged in an opposed arrangement with another side shoulder and the side shoulder intersects a base shoulder in accordance with an embodiment of the invention.

Referring now to FIGS. 23, 28d, 28e, 28f, and 28g, side shoulders 75 may be situated in an intersecting arrangement and an offset arrangement with respect to the base shoulder 73. In these embodiments, one side shoulder 75 intersects the base shoulder 73 along one side wall 74 and the base shoulder 73 is disposed between a pair of side shoulders 75 along another side wall 74. For the paired side shoulders 75, one side shoulder 75 is upstream and another side shoulder 75 is downstream from the intersecting base shoulder 73 and side shoulder 75. The intersecting base shoulder 73 and side shoulder 75 causes a decrease in the groove depth $D_G$ and the groove width $W_G$ at the interface between adjoining steps 71 as illustrated in FIG. 28f or 28g. Each remaining side shoulders 75 causes a decrease in the groove width $W_G$ upstream and downstream from the base shoulder 73 as generally illustrated in FIG. 28d or 28e. The separate and bifurcated narrowing causes corresponding increases in the effective local pressure of the gas along each step 71 and between adjoining steps 71.

Referring now to FIGS. 24, 28a, 28d and 28e, side shoulders 75 may be situated in an offset arrangement with respect to the base shoulder 73. In these embodiments, the base shoulder 73 is disposed between a pair of side shoulders 75. One side shoulder 75 is upstream along one side wall 74 and another side shoulder 75 is downstream along another side wall 74. The separation between the base shoulder 73 and side shoulders 75 causes a decrease in the groove depth $D_G$ at the interface between adjoining steps 71 as illustrated in FIG. 28a. The offset arrangement between a side shoulder 75 and the base shoulder 73 causes a decrease in the groove width $W_G$ upstream and downstream from the base shoulder 73 as generally illustrated in FIGS. 28d and 28e. The separate and bifurcated narrowing causes corresponding increases in the effective local pressure of the gas along each step 71 and between adjoining steps 71.

Referring again to FIG. 22, a groove 69 with an asymmetric, stepped profile may be positioned at two or more locations along a feed groove 70 so to form a groove structure 66 which is likewise asymmetric. In these embodiments, the groove 69 is repeated along the feed groove 70 without inversion.

Referring again to FIGS. 23 and 24, a groove 69 with an asymmetric, stepped pattern may be positioned at two or more locations along a feed groove 70 so to form a groove structure 66 which is symmetric, that is the left-side groove 69 is a mirror image of the right-side groove 69. In these embodiments, the groove 69 is repeated along the feed groove 70 with appropriate inversion.

Referring now to FIGS. 20a-24, both side walls 74 and base walls 72 may be oriented in a parallel configuration regardless of the number, location(s) and dimensional properties of side shoulders 75 and base shoulders 73. The resultant profiles cause an abrupt reduction, to an otherwise uniform cross-sectional area along a groove 69, after the location of each side shoulder(s) 75 and/or each base shoulder(s) 73. Each abrupt decrease in cross-sectional area corresponds to an abrupt increase in velocity and/or pressure of the gas. In other embodiments, it may be advantageous to include additional features to the various grooves described herein which permit for a more continuous reduction in the cross-sectional area along other portions of a groove.

Referring now to FIGS. 25a and 25b, the base walls 72 may be tapered so that the cross-sectional area along a step 71 gradually decreases from upstream to downstream. In these embodiments, the step 71 is tapered so that the depth at the upstream side is greater than the depth at the downstream side. One or more base shoulders 73 disposed between two or more base walls 72 and/or one or more side shoulders 75 along one or both side walls 74 may facilitate abrupt changes in the cross-sectional area along a groove 69 as required by the application. The side walls 74 may be disposed in a parallel arrangement regardless of the location of the side shoulders 75 so that changes to the cross-section area along a groove 69 are determined by the taper of the base wall 72, the number, location and dimensions of the base shoulder(s) 73, and the number, location and dimensions of the side shoulder(s) 75.

Referring now to FIGS. 26a and 26b, the side walls 74 may be tapered so that the cross-sectional area along at least a portion of each step 71 gradually decreases from upstream to downstream. A side wall 74 is tapered in part or whole so that the upstream width of a groove 69 is greater than the downstream width of the same groove 69. One or more base shoulders 73 disposed between two or more base walls 72 and/or one or more side shoulders 75 along one or both side walls 74 may facilitate abrupt changes in the cross-sectional area along a groove 69 as required by the application. The base walls 72 may be disposed in a parallel arrangement regardless of the location of the base shoulders 73 so that changes to the cross-section area along a groove 69 are determined by the taper of each side wall 74, the number, location and dimensions of the base shoulder(s) 73, and the number, location and dimensions of the side shoulder(s) 75.

Figure 27A:
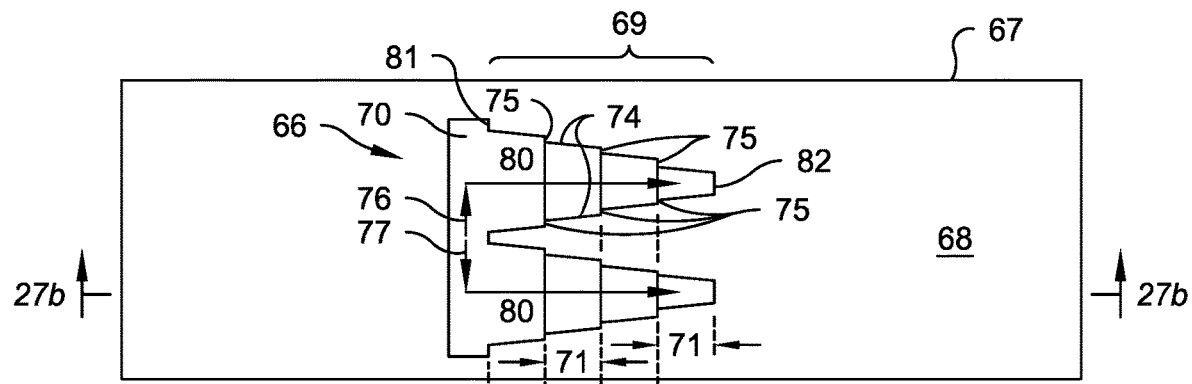
FIG. 27a is a circumferential side view illustrating a rotatable runner with a groove structure including a feed groove communicating with grooves whereby each groove further includes side shoulders disposed along tapered side walls and base shoulders disposed between tapered base walls in accordance with an embodiment of the invention.
Figure 27B:
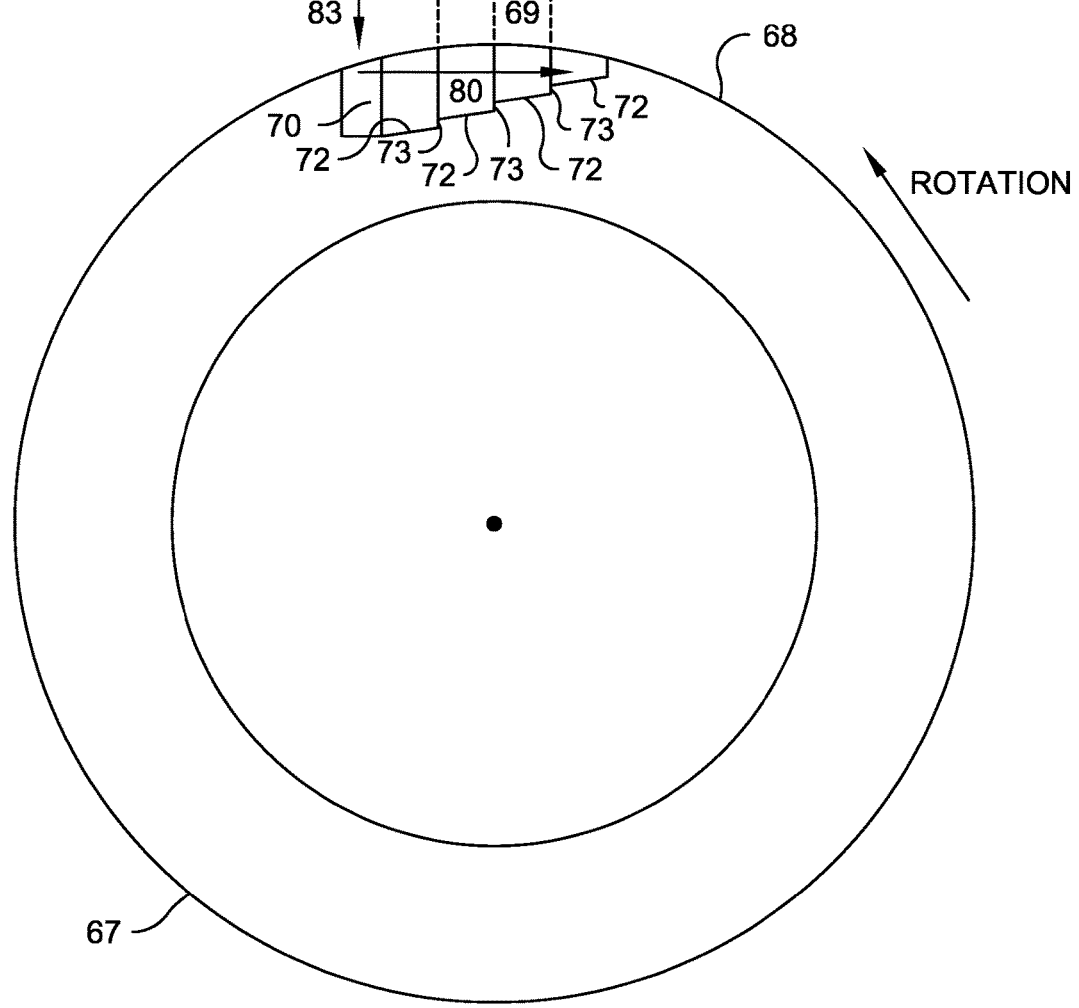
FIG. 27b is a cross section view illustrating a rotatable runner with a groove structure including a feed groove communicating with grooves whereby each groove further includes side shoulders disposed along tapered side walls and base shoulders disposed between tapered base walls in accordance with an embodiment of the invention.

Referring now to FIGS. 27a and 27b, both base walls 72 and side walls 74 may be tapered as otherwise separately described in FIGS. 25a-26b so that the cross-sectional area along each step 71 gradually decreases from upstream to downstream. Base shoulder(s) 73 and/or side shoulder(s) 75 may facilitate abrupt changes in the cross-sectional area along a groove 69 as required by the application. Resultant changes to the cross-section area along a groove 69 are determined by the degree of taper for the base walls 72 and each side wall 74, the number, location and dimensional properties of the base shoulder(s) 73, and the number, location and dimensional properties of the side shoulder(s) 75.

Figure 10:
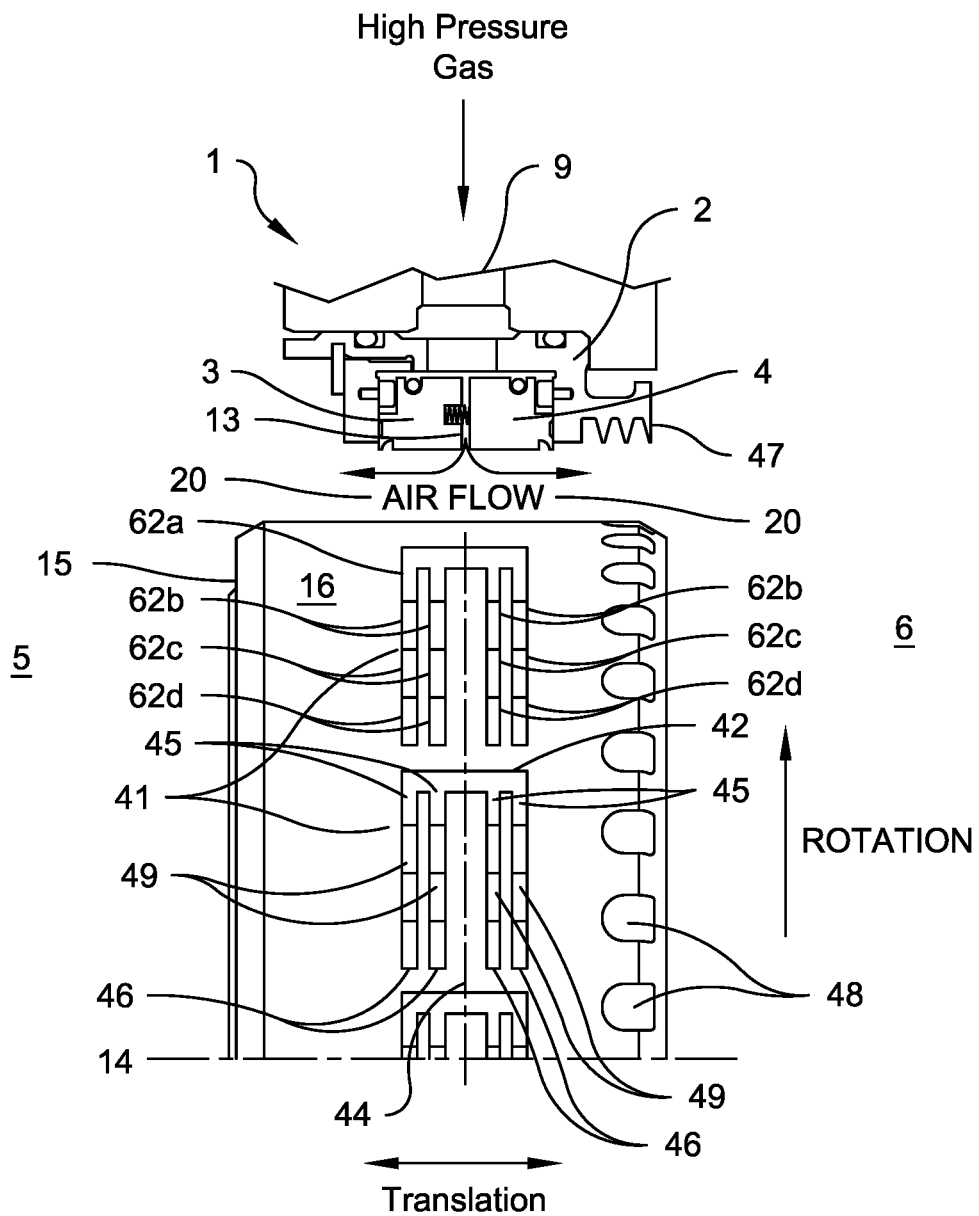
FIG. 10 is a partial cross section view illustrating an annular seal assembly including a pair of annular seal rings separated by a gap within a seal housing with an optional windback thread disposed about a rotatable runner attached to a shaft (cross section of annular seal assembly and runner below centerline and shaft not shown) and optional slots positioned along one end of the rotatable runner adjacent to the windback thread wherein an outer annular surface along the runner includes a plurality of multi-groove structures separately disposed thereon whereby each groove includes at least two steps and each multi-groove structure communicates with both seal rings in accordance with an embodiment of the invention.

Referring again to FIGS. 27a and 27b, a source flow 83 is communicated into the feed groove 70. The source flow 83 may correspond to the gas which passes between the annular seal rings 3, 4 as generally illustrated in FIG. 10 or which exits through holes 61 along a rotatable runner 35 as illustrated in FIG. 15. The source flow 83 will prefer to exit the feed groove 70 causing flow into the grooves 69. Before entering the grooves 69, the source flow 83 is separated so that a portion of the gas entering the feed groove 70 is directed into each groove 69. By way of example, the source flow 83 is separated into a first portion 76 which flows into one groove 69 and a second portion 77 which flows into a second groove 69 when the feed groove 70 is communicable with two grooves 69. After entering each groove 69, the first portion 76 and the second portion 77 generally prefer a pathway from the upstream end 81 to the downstream end 82 thereby establishing a longitudinal flow 80, which is also understood to be circumferential in form, in each groove 69. The longitudinal flow 80 traverses the groove 69 so as to interact with parallel and tapered features of the base wall 72 and side walls 74, base shoulder(s) 73 between adjacent base walls 72, and side shoulder(s) 75 along side walls 74. Each interaction may redirect the flow and increase velocity and/or pressure of at least a portion of the longitudinal flow 80.

Referring now to FIGS. 27a and 28a, the transition between adjoining steps 71 may include only a base shoulder 73 disposed between a pair of base walls 72. At least a portion of the longitudinal flow 80 which interacts with, that is flows into or is impeded and slowed down by, the base shoulder 73 is locally redirected as an outward radial flow 78. The outward radial flow 78 is locally redirected so as to be generally perpendicular to the longitudinal flow 80 adjacent to the base shoulder 73. The resultant flow enhance the stiffness of a thin film produced along the annular seal rings 3, 4 by the groove structures 66. The cross-sectional area of the groove 69 is reduced by the area corresponding to the base shoulder depth $D_B$ as the longitudinal flow 80 flows from a step 71 with a deeper base 72 to a next step 71 with a less deep base 72. The smaller cross-sectional area causes a corresponding increase to the velocity and/or pressure of the gas immediately after the base shoulder 73.

Referring now to FIGS. 27a and 28b, a pair of side shoulders 75 may be disposed along a pair of side walls 74. At least a portion of the longitudinal flow 80 which interacts with, that is flows into or is impeded and slowed down by, each side shoulder 75 is locally redirected as a lateral flow 79. Each lateral flow 79 is locally redirected so as to be generally perpendicular to the longitudinal flow 80 adjacent to the side shoulders 75. The resultant flow pattern may cause the lateral flows 79 to interact, that is converge, thereby enhancing the stiffness of a thin film produced along the annular seal rings 3, 4 by the groove structures 66. The cross-sectional area of the groove 69 is reduced by the areas corresponding to the side shoulder depth $D_S$ as the longitudinal flow 80 flows from a wider portion of a step 71 to a less wide portion of the same step 71. The smaller cross-sectional area causes a corresponding increase to the velocity and/or pressure of the gas immediately after the side shoulders 75.

Referring now to FIGS. 27a and 28c, the transition between adjoining steps 71 may include a base shoulder 73 disposed along a base wall 72 and a pair of side shoulders 75 disposed between a pair of side walls 74. At least a portion of the longitudinal flow 80, which interacts with (either flows into or is impeded and slowed down by) the base shoulder 73, is locally redirected as an outward radial flow 78 as described above for FIG. 28a. At least a portion of the longitudinal flow 80, which interacts with (flows into or is impeded and slowed down by) each side shoulder 75, is locally redirected as a lateral flow 79 as described above for FIG. 28b. The resultant flow patterns may cause the outward radial flow 78, the lateral flows 79, and the longitudinal flow 80 to interact, that is converge, thereby enhancing the stiffness of a thin film produced along the annular seal rings 3, 4 by the groove structures 66. The cross-sectional area of the groove 69 is reduced by the areas corresponding to the base shoulder depth $D_B$ and both side shoulder depths $D_S$ as the longitudinal flow 80 traverses from one step 71 into another step 71. The smaller cross-sectional area causes a corresponding increase to the velocity and/or pressure of the gas immediately after the base shoulder 73 and the side shoulders 75.

Referring now to FIGS. 27a, 28d and 28e, a side shoulder 75 may be disposed along a left side wall 74 as in FIG. 28d or a right side wall 74 as in FIG. 28e. At least a portion of the longitudinal flow 80, which interacts with a side shoulder 75, is locally redirected as a lateral flow 79 in the direction of the side wall 74 without corresponding side shoulder 75. The lateral flow 79 is locally redirected so as to be generally perpendicular to the longitudinal flow 80 adjacent to the side shoulder 75. In some embodiments, the lateral flow 79 may impinge the side wall 74 opposite of the side shoulder 75. The resultant flow pattern may enhance the stiffness of a thin film produced along the annular seal rings 3, 4 by the groove structures 66. The cross-sectional area of the groove 69 is reduced by the areas corresponding to the side shoulder depth $D_S$ as the longitudinal flow 80 passes from a wider portion of a step 71 to a less wide portion of the same step 71. The smaller cross-sectional area causes a corresponding increase to the velocity and/or pressure of the gas immediately after the side shoulder 75.

Referring now to FIGS. 27a, 28f and 28g, the transition between adjoining steps 71 may include a base shoulder 73 disposed along a base wall 72 and either a left side shoulder 75 disposed along a side wall 74 as in FIG. 28f or a right side shoulder 75 disposed along a side wall 74 as in FIG. 28g. At least a portion of the longitudinal flow 80, which interacts with the base shoulder 73, is locally redirected as an outward radial flow 78 as described for FIG. 28a. At least a portion of the longitudinal flow 80, which interacts with a side shoulder 75, is locally redirected as a lateral flow 79 as described for either FIG. 28d or FIG. 28e. The resultant flow patterns may cause the outward radial flow 78, the lateral flow 79, and the longitudinal flow 80 to interact, that is converge, with or without further interaction with or impingement of the side wall 74 without a side shoulder 75, thereby enhancing the stiffness of a thin film produced along the annular seal rings 3, 4 by the groove structures 66. The cross-sectional area of the groove 69 is reduced by the areas corresponding to the base shoulder depth $D_B$ and one side shoulder depth $D_S$ as the longitudinal flow 80 traverses from one step 71 into another step 71. The smaller cross-sectional area causes a corresponding increase to the velocity and/or pressure of the gas immediately after the base shoulder 73 and the side shoulders 75.

Features of the groove structure 66 and the grooves 69 with base and lateral steps, in particular, are applicable to the various other embodiments described herein so as to form a thin film between a pair of annular seal rings 3, 4 (or 23, 24) and rotatable runners 15, 35, 67. By way of example and reference to FIGS. 27a-28g, the source flow 83 may be communicated into a feed groove 70 communicable with at least two grooves 69. The source flow 83 may be a gas which originates either adjacent to the annular seal rings 3, 4 as provided for in FIGS. 1-13 or from a source within the rotatable runner 67 as provided for in FIGS. 14 and 15. The communicability between feed groove 70 and grooves 69 may be permitted by intersecting contact therebetween. Each groove 69 includes an upstream end 81 and a downstream end 82 generally aligned along the rotation direction of the rotatable runner 67. Portions of the source flow 83 entering the feed groove 70 separately flow into the grooves 69. The resultant flow pattern between feed groove 70 and grooves 69 requires a separation of the source flow 83 at the upstream ends 81 of the grooves 69. The separation may be permitted by an opening at the interface between the feed groove 70 and each groove 69 and/or the overall geometric configuration therebetween. The portion of the source flow 83 entering each groove 69 is then directed by the base walls 72 and the side walls 74 from the upstream end 81 to the downstream end 82. The axial flow of gas along each groove 69 establishes the longitudinal flow 80 therein. The floor of each groove 69 may include at least two base walls 72 whereby each adjacent pair of base walls 72 is disposed about a base shoulder 73. The base shoulder 73 facilitates a radial translation whereby the upstream base wall 72 is deeper than the downstream base wall 72. A portion of the longitudinal flow 80 may flow into the base shoulder 73 so as to interact therewith resulting in a redirection of the flow vector whereby the affected longitudinal flow 80 flows radially outward from the groove 69 as an outward radial flow 78. Each side wall 74 along a groove 69 may include one or more side shoulders 75 which facilitate an axial translation whereby the upstream width of the groove 69 is less than the downstream width. A portion of the longitudinal flow 80 may flow into the side shoulder 75 so as to interact therewith resulting in a redirection of the flow vector whereby the affected longitudinal flow 80 flows transversely within the groove 69 as a lateral flow 79. The resultant lateral flow(s) 79 and outward radial flow(s) 78 are perpendicular to one another and to the longitudinal flow 80.

Referring now to FIGS. 28c, 28f, and 28g, one or more lateral flow(s) 79 and the outward radial flow 78 may converge after redirection by the side shoulder(s) 75 and the base shoulder 73, respectively. In preferred embodiments, convergence occurs when the side shoulder(s) 75 and the base shoulder 73 intersect along a plane which traverses a groove 69. The convergence may result in a mixing or subsequent redirection of the flow streams with or without the longitudinal flow 80 thereafter facilitating enhancement to the stiffness of a thin-film layer between sealing rings and runner.

Referring now to FIGS. 20a-27b, one or more lateral flow(s) 79 may be formed downstream and/or upstream with respect to an outward radial flow 78. In preferred embodiments, a lateral flow 79 formed via a side shoulder 75 along one side wall 74 may be directed into the other side wall 74. The resultant impingement may cause a mixing or subsequent redirection of or by the impinging flow so as to enhance the stiffness of a thin-film layer between sealing rings and runner.

Referring now to FIG. 28b, a pair of lateral flows 79 may converge after redirection by a pair of opposed side shoulders 75. In preferred embodiments, convergence occurs when the side shoulders 75 intersect along a plane which traverses a groove 69. The convergence may result in a mixing or subsequent redirection of the two flow streams with or without the longitudinal flow 80 facilitating enhancement to the stiffness of a thin-film layer between sealing rings and runner.

The grooves with base and lateral steps described herein are also applicable to embodiments wherein a plurality of single grooves with or without feed groove are disposed about a rotatable runner to form a thin film which seals the interface between one annular seal ring and the runner. These multi-axis stepped grooves, several illustrated by way of example in FIGS. 31a-38b, are applicable to the various embodiments described herein so as to properly maintain a thin-film layer 20 between a rotatable runner 67, 15, or 35 and an annular seal ring 3 or 4 or 23 or 24. In some embodiments described throughout this application, it may be advantageous for the base wall(s) 72 and/or the side wall(s) 74 to be planar, non-planar, and/or angled in part of whole.

Figure 29:
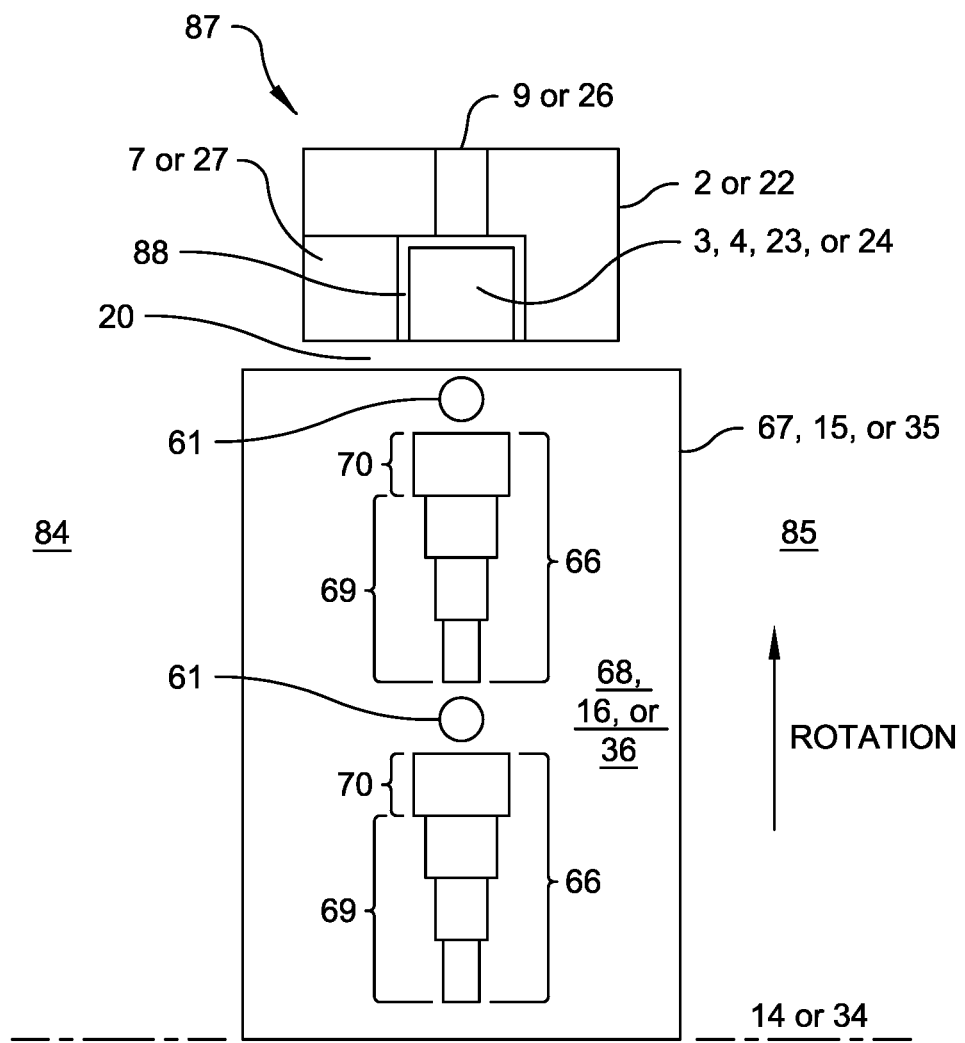
FIG. 29 is a partial cross section view illustrating an annular seal assembly including an annular seal ring within a seal housing with optional inlet disposed about a rotatable runner with optional hole attached to a shaft (annular seal assembly and runner below centerline and shaft not shown) wherein an outer annular surface along the runner includes a plurality of groove structures separately disposed thereon whereby each groove structure includes an optional feed groove and a stepped groove arranged to communicate with the seal ring in accordance with an embodiment of the invention.
Figure 30:
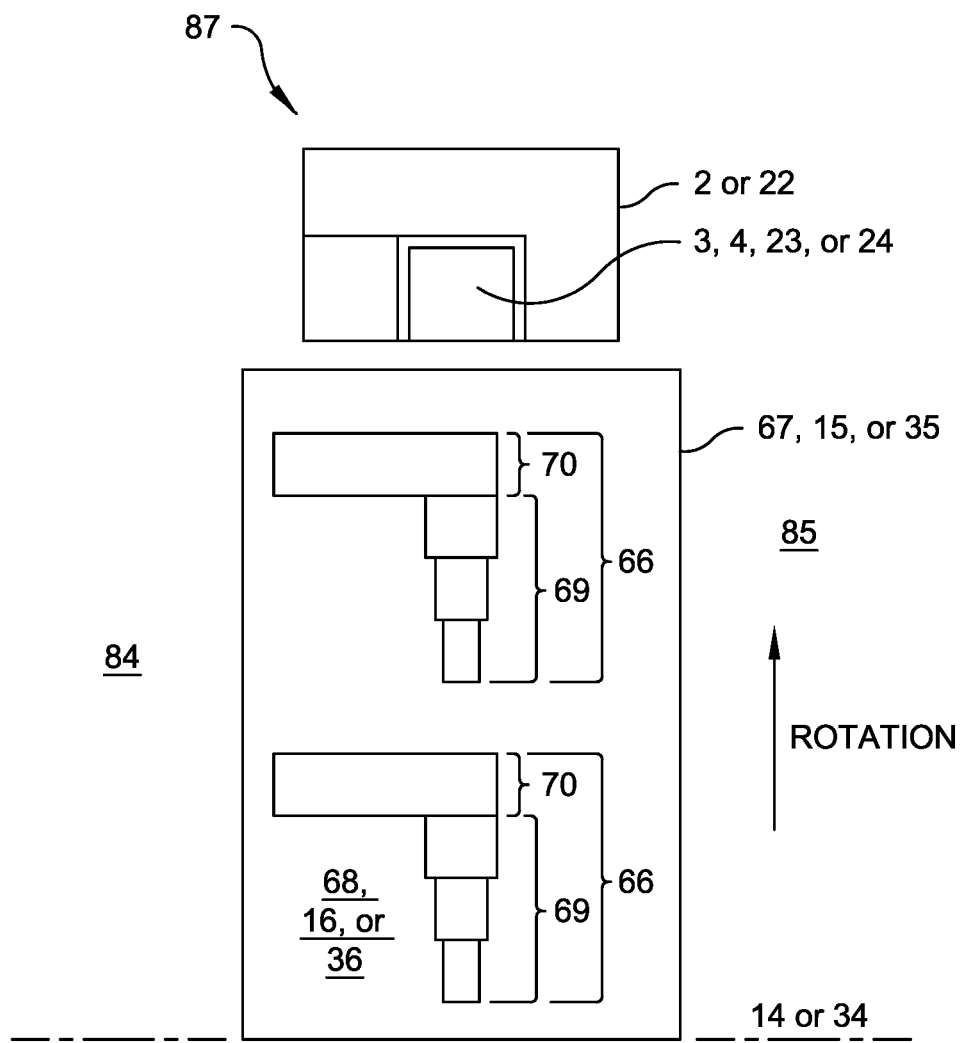
FIG. 30 is a partial cross section view illustrating an annular seal assembly including an annular seal ring within a seal housing disposed about a rotatable runner attached to a shaft (annular seal assembly and runner below centerline and shaft not shown) wherein an outer annular surface along the runner includes a plurality of groove structures separately disposed thereon whereby each groove structure includes an optional feed groove biased toward a compartment and a stepped groove arranged to communicate with the seal ring in accordance with an embodiment of the invention.

Referring now to FIGS. 29 and 30, a seal assembly 87 may include an annular seal ring 3, 4, 23, or 24 within an annular seal housing 2 or 22 disposed about a rotatable runner 67, 15, or 35, the latter rotatable about a centerline 14 or 34. The annular seal ring 3, 4, 23, or 24 may be secured within the annular seal housing 2 or 22 via an insert 7 or 27, other sealing ring, and/or other suitable means understood in the art. In some embodiments, the annular seal housing 2 or 22 may include an inlet 9 or 26 and a gap 88 may be disposed between one or more sides of the annular seal ring 3, 4, 23, or 24 and the annular seal housing 2 or 22 and/or the insert 7 or 27, such as illustrated by way of example in FIG. 29. Fluid passes through the inlet 9 or 26 and around the annular seal ring 3, 4, 23, or 24 before impinging groove structures 66 along the outer annular surface 68, 16, or 36 of the rotatable runner 67, 15, or 35 to form a thin-film layer 20 between the annular seal ring 3, 4, 23, or 24 and the rotatable runner 67, 15, or 35. In other embodiments, the rotatable runner 67, 15, or 35 may include one or more holes 61 adjacent to groove structures 66 disposed along the outer annular surface 68, 16, or 36 of the rotatable runner 67, 15, or 35, such as illustrated by way of example in FIG. 29. Fluid passes through the holes 61 before impinging the groove structures 66 to form a thin-film layer 20 between the annular seal ring 3, 4, 23, or 24 and the rotatable runner 67, 15, or 35. In yet other embodiments, a portion of a groove structure 66, preferably an optional feed groove 70, extends toward and is thereby biased in the direction of one compartment 84 or 85, such as illustrate by way of example in FIG. 30. Fluid within a compartment 84 or 85 nearest to the feed groove 70 enters the feed groove 70 and is directed into the groove 69 to form a thin-film layer 20 between the annular seal ring 3, 4, 23, or 24 and the rotatable runner 67, 15, or 35. Regardless as to source and direction of the fluid, it is understood that the groove structures 66 include a groove 69 and an optional feed groove 70. The feed groove 70 may be advantageous in some applications to communicate fluid or more fluid into the groove 69 from the inlet 9 or 26 or the hole 61 in FIG. 29 or the biased feed groove 70 in FIG. 30. The groove 69 includes multi-axis features as described herein beneficial to formation and/or properties of the thin-film layer 20. Although one groove structure 66 is illustrated for descriptive purposes in FIGS. 31a-38b, it is understood that a plurality of such groove structures 66 are situated about the outer annular surface 68, 16, or 36.

Referring now to FIGS. 31a-32b, a groove structure 66 is positioned along the outer annular surface 68 of a rotatable runner 67 whereby the groove structure 66 includes a groove 69 which intersects an optional feed groove 70. The feed groove 70 is communicable with the groove 69 so that a gas entering the feed groove 70 thereafter flows into the groove 69. In these and other embodiments, fluid may directly enter a groove 69 without a feed groove 70. The groove 69 is positioned with respect to the feed groove 70 so that the gas flows into and then along the groove 69 from an upstream end 81 to a downstream end 82. The resultant flow pattern is in a direction opposite to the rotation direction of the rotatable runner 67.

Referring again to FIGS. 31a-32b, the groove 69 includes two or more steps 71, although three steps 71 are illustrated by way of example. Each step 71 includes and is defined by a base wall 72 which corresponds to the bottom of the groove 69. Base walls 72 are situated relative to one another so that the effective groove depth $D_G$ decreases along the groove 69 from the upstream end 81 to the downstream end 82. Each two adjoining steps 71 are separated by a base shoulder 73. The base shoulder 73 is an abrupt change or discontinuity in the depth profile of the groove 69. The base shoulder 73 is disposed between a pair of base walls 72 so that the deeper end of the base shoulder 73 contacts the downstream side of one base wall 72 and the less deep end of the base shoulder 73 contacts the upstream side of another base wall 72. An additional base shoulder 73 may be positioned at the downstream end 82 to terminate the groove 69. The resulting profile formed by the base walls 72 and the base shoulders 73 defines the floor or base portion of a groove 69. In some embodiments, a base shoulder 73 may be located at the interface between the feed groove 70 and a groove 69, as illustrated in FIGS. 31a-32b. In other embodiments, the depths of the feed groove 70 and a groove 69 at the inlet end of the groove structure 66 may be the same so that the transition avoids a base shoulder 73 therebetween, such as illustrated in FIGS. 36a-38b.

Referring again to FIGS. 31a-32b, the groove 69 further includes a pair of side walls 74. The side walls 74 are disposed about and intersect two or more base walls 72 to define the shape of a groove 69. Each side wall 74 may include one or more side shoulders 75. A side shoulder 75 is an abrupt change or discontinuity in the width profile of the groove 69. The side shoulder 75 is disposed along a side wall 74 so that the groove width $W_G$ upstream from the side shoulder 75 is wider than the groove width $W_G$ downstream from the side shoulder 75. The resulting profile formed by each side wall 74 and corresponding side shoulder(s) 75 define the lateral bounds of a groove 69 whereby the effective groove width $W_G$ decreases along the groove 69 from the upstream end 81 to the downstream end 82.

Figure 31A:
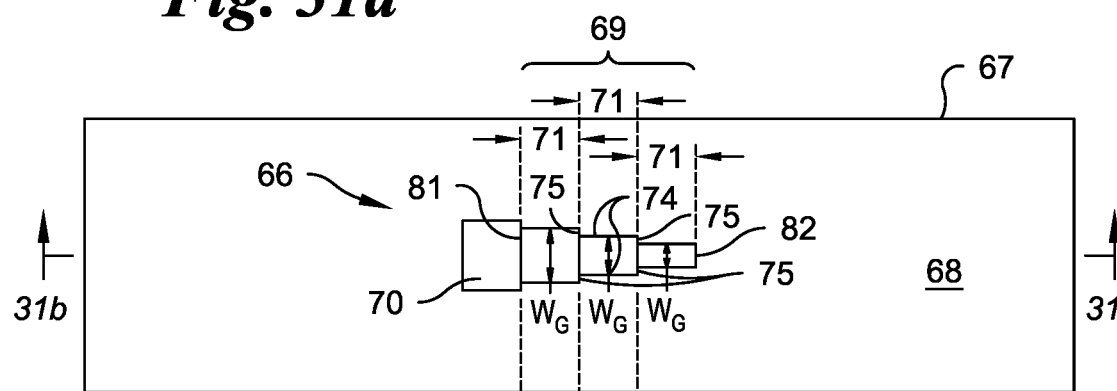
FIG. 31a is a circumferential side view illustrating a rotatable runner with a groove structure including a feed groove communicating with a groove whereby the groove further includes side shoulders and base shoulders which intersect and the side shoulders arranged in an opposed arrangement in accordance with an embodiment of the invention.
Figure 31B:
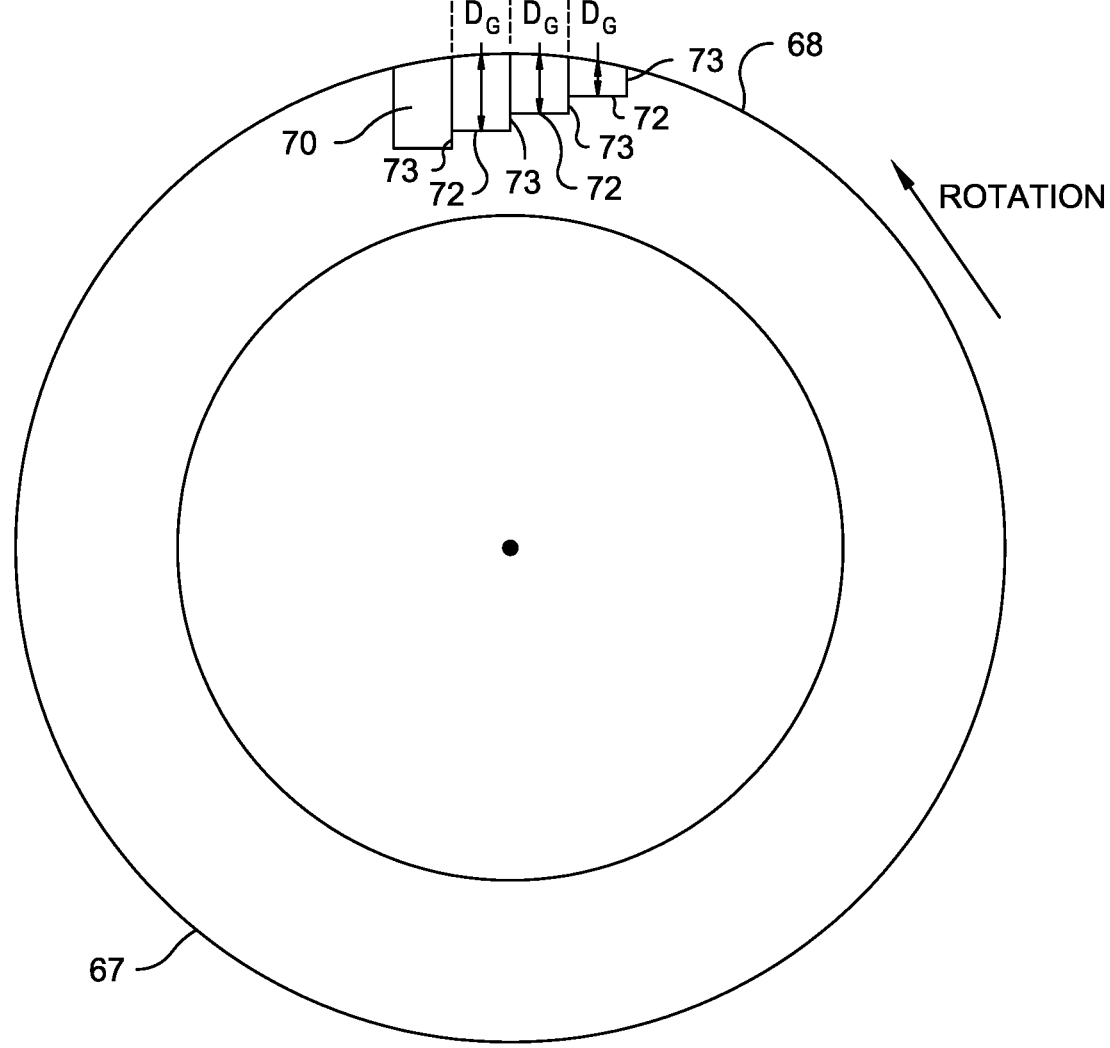
FIG. 31b is a cross section view illustrating a rotatable runner with a groove structure including a feed groove communicating with a groove whereby the groove further includes side shoulders and base shoulders which intersect and the side shoulders arranged in an opposed arrangement in accordance with an embodiment of the invention.
Figure 33:
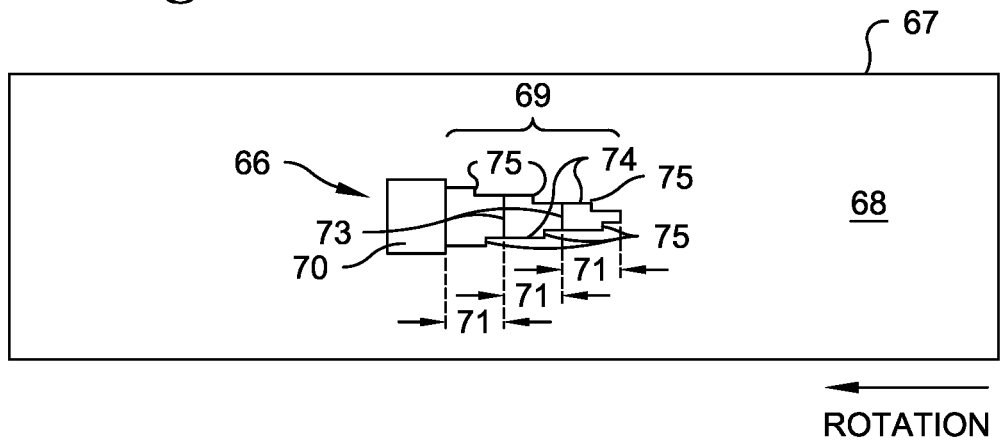
FIG. 33 is a circumferential side view illustrating a rotatable runner with a groove structure including a feed groove communicating with a groove whereby the groove further includes side shoulders and base shoulders which are offset and the side shoulders are arranged in an offset arrangement in accordance with an embodiment of the invention.
Figure 34:
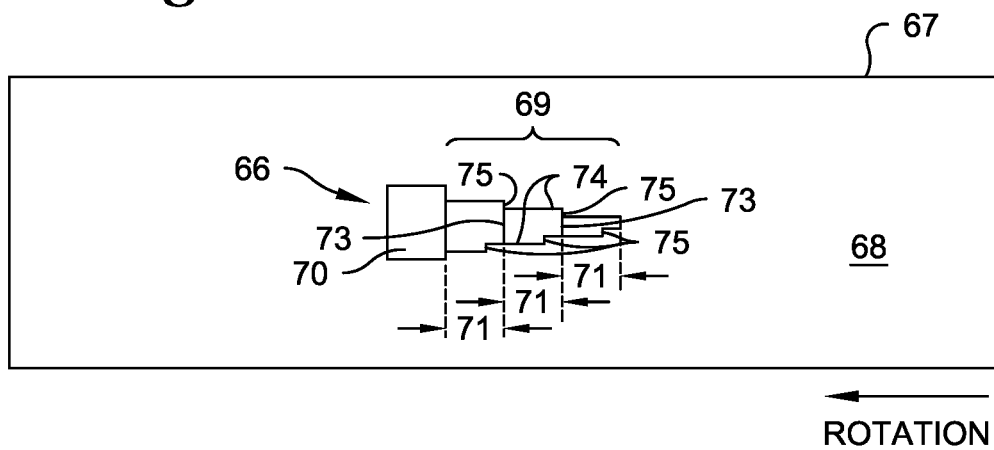
FIG. 34 is a circumferential side view illustrating a rotatable runner with a groove structure including a feed groove communicating with a groove whereby the groove further includes side shoulders and base shoulders wherein one side shoulder intersects a base shoulder and other side shoulders are arranged in an offset arrangement with respect to the intersecting side shoulder in accordance with an embodiment of the invention.
Figure 35:
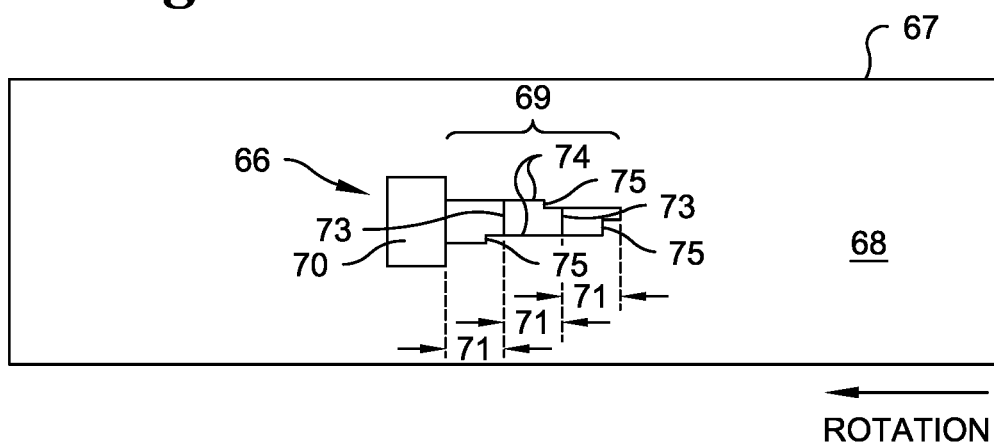
FIG. 35 is a circumferential side view illustrating a rotatable runner with a groove structure including a feed groove communicating with a groove whereby the groove further includes side shoulders and base shoulders wherein a pair of side shoulders are disposed about a base shoulder and the side shoulders are arranged in an offset arrangement in accordance with an embodiment of the invention.

Referring now to FIGS. 31a, 31b and 28c, side shoulders 75 may be situated so as to intersect the base shoulder 73. The side shoulders 75 are aligned in an opposed arrangement whereby one side shoulder 75 along one side wall 74 is directly across from another side shoulder 75 along another side wall 74. The side shoulders 75 are further aligned with the base shoulder 73 forming a substantially U-shaped wall along a plane which intersects a groove 69 between two adjoining steps 71, as generally illustrated in FIG. 28c. A narrowing of both the groove depth $D_G$ between adjoining steps 71 via a base shoulder 73 and the groove width $W_G$ between adjoining steps 71 via the side shoulders 75 reduces the local volume from one step 71 to another step 71 causing a corresponding increase in the effective local pressure of the gas in the downstream step(s) 71. This higher effective pressure improves the stiffness and sealing properties of a thin film, an example of the latter being the thin-film layer 20 between rotatable runner 67 and annular sealing ring 3, 4, 23, or 24 illustrated in FIGS. 29 and 30.

Referring now to FIGS. 32a, 32b, 28a and 28b, side shoulders 75 may be situated in an offset arrangement with respect to a base shoulder 73. In these embodiments, the base shoulder 73 is disposed between a pair of side shoulders 75 along each side wall 74. Two side shoulders 75 are aligned in an opposed arrangement along a plane which bisects the groove 69 upstream from the base shoulder 73 whereby one side shoulder 75 along one side wall 74 is directly across from another side shoulder 75 along another side wall 74. Two other side shoulders 75 are aligned in an opposed arrangement along a plane which bisects the groove 69 downstream from the base shoulder 73 whereby one side shoulder 75 along one side wall 74 is directly across from another side shoulder 75 along another side wall 74. The separation between base shoulder 73 and paired side shoulders 75 results in a decrease in the groove depth $D_G$ at the interface between adjoining steps 71 as illustrated in FIG. 28a and a decrease in the groove width $W_G$ both upstream and downstream from the base shoulder 73 as illustrated FIG. 28b. The bifurcated narrowing causes corresponding increases in the effective local pressure of the gas along each step 71 and between adjoining steps 71.

Referring now to FIGS. 33, 28a, 28d and 28e, side shoulders 75 may be situated in an offset arrangement with respect to the base shoulder 73. In these embodiments, the base shoulder 73 is disposed between a pair of side shoulders 75 along each side wall 74. Two side shoulders 75 are in an offset arrangement upstream from the base shoulder 73 whereby one side shoulder 75 along one side wall 74 is not directly across from another side shoulder 75 along another side wall 74. Two other side shoulders 75 are in an offset arrangement downstream from the base shoulder 73 whereby one side shoulder 75 along one side wall 74 is not directly across from another side shoulder 75 along another side wall 74. The separation between base shoulder 73 and side shoulders 75 causes a decrease in the groove depth $D_G$ at the interface between adjoining steps 71 as illustrated in FIG. 28a and causes a two-step decrease in the groove width $W_G$ upstream and downstream from the base shoulder 73 as generally illustrated in FIGS. 28d and 28e. The separate and bifurcated narrowing causes corresponding increases in the effective local pressure of the gas along each step 71 and between adjoining steps 71. Other offset arrangements are possible, one non-limiting example being the inversion or mirror image of the design shown in FIG. 33.

Referring now to FIGS. 34, 28d, 28e, 28f, and 28g, side shoulders 75 may be situated in an intersecting arrangement and an offset arrangement with respect to the base shoulder 73. In these embodiments, one side shoulder 75 intersects the base shoulder 73 along one side wall 74 and the base shoulder 73 is disposed between a pair of side shoulders 75 along another side wall 74. For the paired side shoulders 75, one side shoulder 75 is upstream and another side shoulder 75 is downstream from the intersecting base shoulder 73 and side shoulder 75. The intersecting base shoulder 73 and side shoulder 75 causes a decrease in the groove depth $D_G$ and the groove width $W_G$ at the interface between adjoining steps 71 as illustrated in FIG. 28f or 28g. Each remaining side shoulders 75 causes a decrease in the groove width $W_G$ upstream and downstream from the base shoulder 73 as generally illustrated in FIG. 28d or 28e. The separate and bifurcated narrowing causes corresponding increases in the effective local pressure of the gas along each step 71 and between adjoining steps 71. Other offset arrangements are possible, one non-limiting example being the inversion or mirror image of the design shown in FIG. 34.

Referring now to FIGS. 35, 28a, 28d and 28e, side shoulders 75 may be situated in an offset arrangement with respect to the base shoulder 73. In these embodiments, the base shoulder 73 is disposed between a pair of side shoulders 75. One side shoulder 75 is upstream along one side wall 74 and another side shoulder 75 is downstream along another side wall 74. The separation between the base shoulder 73 and side shoulders 75 causes a decrease in the groove depth $D_G$ at the interface between adjoining steps 71 as illustrated in FIG. 28a. The offset arrangement between a side shoulder 75 and the base shoulder 73 causes a decrease in the groove width $W_G$ upstream and downstream from the base shoulder 73 as generally illustrated in FIGS. 28d and 28e. The separate and bifurcated narrowing causes corresponding increases in the effective local pressure of the gas along each step 71 and between adjoining steps 71. Other offset arrangements are possible, one non-limiting example being the inversion or mirror image of the design shown in FIG. 35.

Referring now to FIGS. 31a-35, both side walls 74 and base walls 72 may be oriented in a parallel configuration or a non-parallel configuration regardless of the number, location(s) and dimensional properties of side shoulders 75 and base shoulders 73. The resultant profiles cause an abrupt reduction, to an otherwise uniform cross-sectional area along a groove 69, after the location of each side shoulder(s) 75 and/or each base shoulder(s) 73. Each abrupt decrease in cross-sectional area corresponds to an abrupt increase in velocity and/or pressure of the gas. In other embodiments, it may be advantageous to include additional features to the various grooves described herein which permit for a more continuous reduction in the cross-sectional area along other portions of a groove.

Referring now to FIGS. 36a and 36b, the base walls 72 may be tapered so that the cross-sectional area along a step 71 gradually decreases from upstream to downstream. In these embodiments, the step 71 is tapered so that the depth at the upstream side is greater than the depth at the downstream side. One or more base shoulders 73 disposed between two or more base walls 72 and/or one or more side shoulders 75 along one or both side walls 74 may facilitate abrupt changes in the cross-sectional area along a groove 69 as required by the application. The side walls 74 may be disposed in a parallel arrangement regardless of the location of the side shoulders 75 so that changes to the cross-section area along a groove 69 are determined by the taper of the base wall 72, the number, location and dimensions of the base shoulder(s) 73, and the number, location and dimensions of the side shoulder(s) 75.

Figures 37A, 37B:
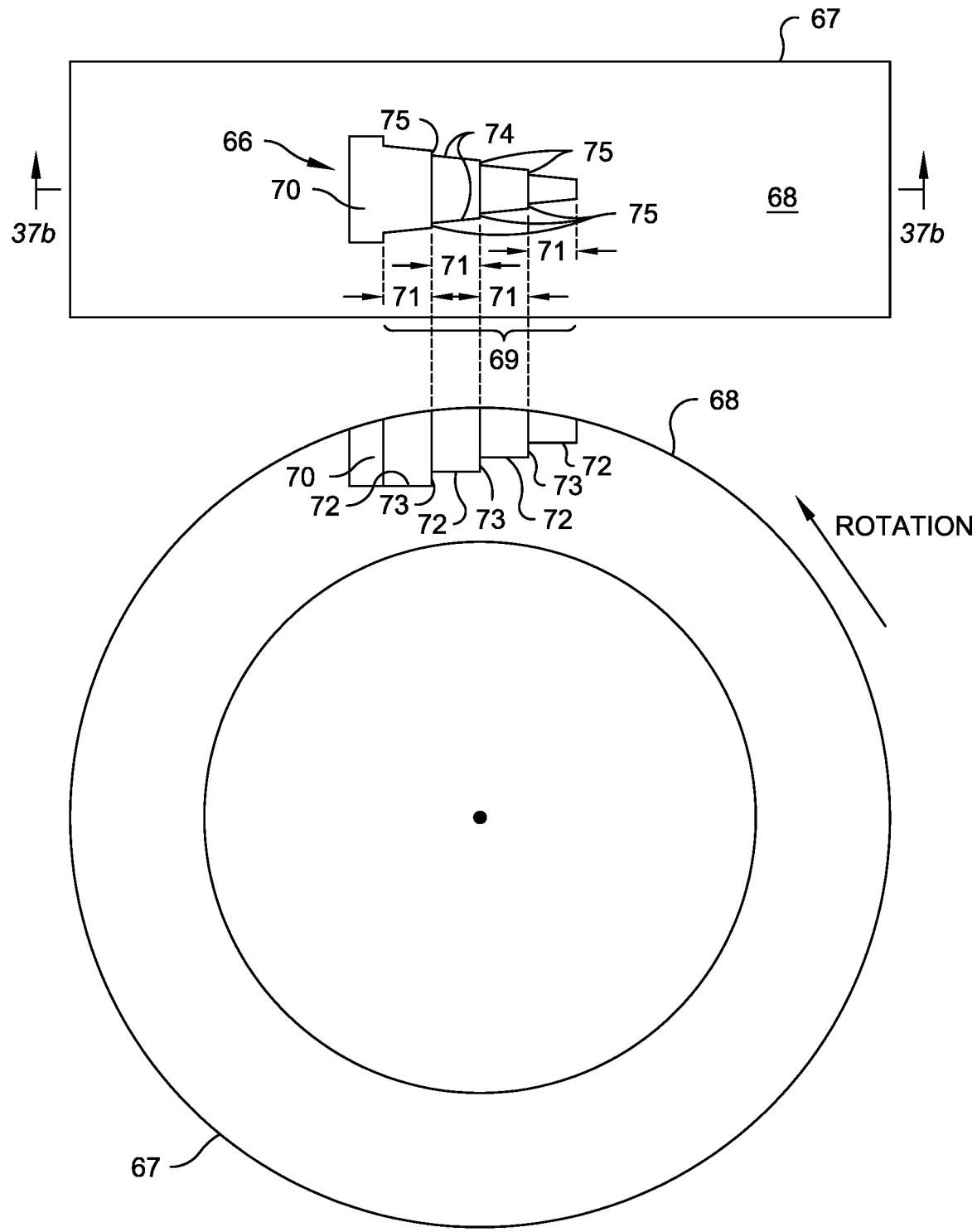
FIG. 37a is a circumferential side view illustrating a rotatable runner with a groove structure including a feed groove communicating with a groove whereby the groove further includes side shoulders disposed along tapered side walls and base shoulders disposed between parallel base walls in accordance with an embodiment of the invention.
FIG. 37b is a cross section view illustrating a rotatable runner with a groove structure including a feed groove communicating with a groove whereby the groove further includes side shoulders disposed along tapered side walls and base shoulders disposed between parallel base walls in accordance with an embodiment of the invention.

Referring now to FIGS. 37a and 37b, the side walls 74 may be tapered so that the cross-sectional area along at least a portion of each step 71 gradually decreases from upstream to downstream. A side wall 74 is tapered in part or whole so that the upstream width of a groove 69 is greater than the downstream width of the same groove 69. One or more base shoulders 73 disposed between two or more base walls 72 and/or one or more side shoulders 75 along one or both side walls 74 may facilitate abrupt changes in the cross-sectional area along a groove 69 as required by the application. The base walls 72 may be disposed in a parallel arrangement regardless of the location of the base shoulders 73 so that changes to the cross-section area along a groove 69 are determined by the taper of each side wall 74, the number, location and dimensions of the base shoulder(s) 73, and the number, location and dimensions of the side shoulder(s) 75.

Figures 38A, 38B:
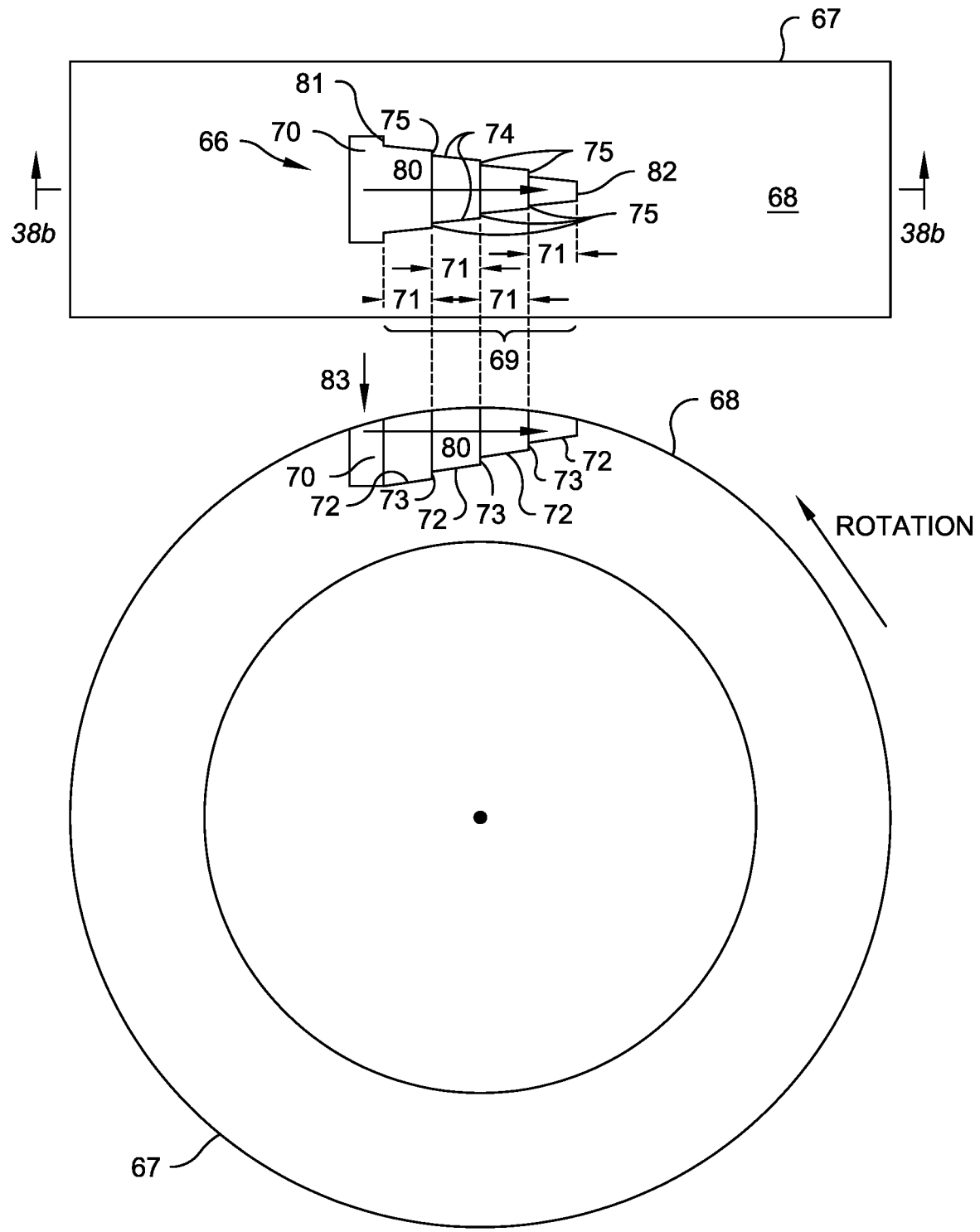
FIG. 38a is a circumferential side view illustrating a rotatable runner with a groove structure including a feed groove communicating with a groove whereby the groove further includes side shoulders disposed along tapered side walls and base shoulders disposed between tapered base walls in accordance with an embodiment of the invention.
FIG. 38b is a cross section view illustrating a rotatable runner with a groove structure including a feed groove communicating with a groove whereby the groove further includes side shoulders disposed along tapered side walls and base shoulders disposed between tapered base walls in accordance with an embodiment of the invention.

Referring now to FIGS. 38a and 38b, both base walls 72 and side walls 74 may be tapered as otherwise separately described in FIGS. 36a-37b so that the cross-sectional area along each step 71 gradually decreases from upstream to downstream. Base shoulder(s) 73 and/or side shoulder(s) 75 may facilitate abrupt changes in the cross-sectional area along a groove 69 as required by the application. Resultant changes to the cross-section area along a groove 69 are determined by the degree of taper for the base walls 72 and each side wall 74, the number, location and dimensional properties of the base shoulder(s) 73, and the number, location and dimensional properties of the side shoulder(s) 75.

Referring again to FIGS. 38a and 38b, a source flow 83 is communicated into the feed groove 70 or directly into the groove 69. The source flow 83 may correspond to the gas which passes around the annular seal ring 3, 4, 23, or 24 as generally illustrated in FIG. 29 or which exits through holes 61 along a rotatable runner 67 as also illustrated in FIG. 29 or which enters a feed groove 70 biased toward one compartment 84 or 85 as illustrated in FIG. 30. The source flow 83 will prefer to exit the feed groove 70 causing flow into the groove 69. After entering the groove 69, a longitudinal flow 80 is established, which is understood to be circumferential or linear in form. The longitudinal flow 80 traverses the groove 69 so as to interact with feature(s) of the base wall 72 and the side walls 74, the base shoulder(s) 73 between adjacent base walls 72, and the side shoulder(s) 75 along side walls 74. Each interaction may redirect the flow and increase velocity and/or pressure of at least a portion of the longitudinal flow 80.

Referring now to FIG. 28a, the transition between adjoining steps 71 may include only a base shoulder 73 disposed between a pair of base walls 72. At least a portion of the longitudinal flow 80 which interacts with, that is flows into or is impeded and slowed down by, the base shoulder 73 is locally redirected as an outward radial flow 78. The outward radial flow 78 is locally redirected so as to be generally perpendicular to the longitudinal flow 80 adjacent to the base shoulder 73. The resultant flow enhance the stiffness of a thin film produced along the annular seal ring 3, 4, 23, or 24 by the groove structures 66. The cross-sectional area of the groove 69 is reduced by the area corresponding to the base shoulder depth $D_B$ as the longitudinal flow 80 flows from a step 71 with a deeper base 72 to a next step 71 with a less deep base 72. The smaller cross-sectional area causes a corresponding increase to the velocity and/or pressure of the gas immediately after the base shoulder 73.

Referring now to FIG. 28b, a pair of side shoulders 75 may be disposed along a pair of side walls 74. At least a portion of the longitudinal flow 80 which interacts with, that is flows into or is impeded and slowed down by, each side shoulder 75 is locally redirected as a lateral flow 79. Each lateral flow 79 is locally redirected so as to be generally perpendicular to the longitudinal flow 80 adjacent to the side shoulders 75. The resultant flow pattern may cause the lateral flows 79 to interact, that is converge, thereby enhancing the stiffness of a thin film produced along the annular seal ring 3, 4, 23, or 24 by the groove structures 66. The cross-sectional area of the groove 69 is reduced by the areas corresponding to the side shoulder depth $D_S$ as the longitudinal flow 80 flows from a wider portion of a step 71 to a less wide portion of the same step 71. The smaller cross-sectional area causes a corresponding increase to the velocity and/or pressure of the gas immediately after the side shoulders 75.

Referring now to FIG. 28c, the transition between adjoining steps 71 may include a base shoulder 73 disposed along a base wall 72 and a pair of side shoulders 75 disposed between a pair of side walls 74. At least a portion of the longitudinal flow 80, which interacts with (either flows into or is impeded and slowed down by) the base shoulder 73, is locally redirected as an outward radial flow 78 as described above for FIG. 28a. At least a portion of the longitudinal flow 80, which interacts with (flows into or is impeded and slowed down by) each side shoulder 75, is locally redirected as a lateral flow 79 as described above for FIG. 28b. The resultant flow patterns may cause the outward radial flow 78, the lateral flows 79, and the longitudinal flow 80 to interact, that is converge, thereby enhancing the stiffness of a thin film produced along the annular seal ring 3, 4, 23, or 24 by the groove structures 66. The cross-sectional area of the groove 69 is reduced by the areas corresponding to the base shoulder depth $D_B$ and both side shoulder depths $D_S$ as the longitudinal flow 80 traverses from one step 71 into another step 71. The smaller cross-sectional area causes a corresponding increase to the velocity and/or pressure of the gas immediately after the base shoulder 73 and the side shoulders 75.

Referring now to FIGS. 28d and 28e, a side shoulder 75 may be disposed along a left side wall 74 as in FIG. 28d or a right side wall 74 as in FIG. 28e. At least a portion of the longitudinal flow 80, which interacts with a side shoulder 75, is locally redirected as a lateral flow 79 in the direction of the side wall 74 without corresponding side shoulder 75. The lateral flow 79 is locally redirected so as to be generally perpendicular to the longitudinal flow 80 adjacent to the side shoulder 75. In some embodiments, the lateral flow 79 may impinge the side wall 74 opposite of the side shoulder 75. The resultant flow pattern may enhance the stiffness of a thin film produced along the annular seal ring 3, 4, 23, or 24 by the groove structures 66. The cross-sectional area of the groove 69 is reduced by the areas corresponding to the side shoulder depth $D_S$ as the longitudinal flow 80 passes from a wider portion of a step 71 to a less wide portion of the same step 71. The smaller cross-sectional area causes a corresponding increase to the velocity and/or pressure of the gas immediately after the side shoulder 75.

Referring now to FIGS. 28f and 28g, the transition between adjoining steps 71 may include a base shoulder 73 disposed along a base wall 72 and either a left side shoulder 75 disposed along a side wall 74 as in FIG. 28f or a right side shoulder 75 disposed along a side wall 74 as in FIG. 28g. At least a portion of the longitudinal flow 80, which interacts with the base shoulder 73, is locally redirected as an outward radial flow 78 as described for FIG. 28a. At least a portion of the longitudinal flow 80, which interacts with a side shoulder 75, is locally redirected as a lateral flow 79 as described for either FIG. 28d or FIG. 28e. The resultant flow patterns may cause the outward radial flow 78, the lateral flow 79, and the longitudinal flow 80 to interact, that is converge, with or without further interaction with or impingement of the side wall 74 without a side shoulder 75, thereby enhancing the stiffness of a thin film produced along the annular seal ring 3, 4, 23, or 24 by the groove structures 66. The cross-sectional area of the groove 69 is reduced by the areas corresponding to the base shoulder depth $D_B$ and one side shoulder depth $D_S$ as the longitudinal flow 80 traverses from one step 71 into another step 71. The smaller cross-sectional area causes a corresponding increase to the velocity and/or pressure of the gas immediately after the base shoulder 73 and the side shoulders 75.

Features of the groove structure 66 and the groove 69 with base and lateral steps, in particular, are applicable to the various other embodiments described herein so as to form a thin film between an annular seal ring 3, 4, 23, or 24 and a rotatable runner 67. By way of example with reference to FIGS. 27a-28g, the source flow 83 may be communicated either into a feed groove 70 communicable with a groove 69 or directly into a groove 69. The source flow 83 may be a gas which originates adjacent to the annular seal ring 3, 4, 23, or 24 as provided for in FIG. 29 or from a source within the rotatable runner 67 as provided for in FIG. 29 or from a source within a compartment 84 or 85 as provided for in FIG. 30. The communicability between feed groove 70 and groove 69 may be permitted by intersecting contact therebetween. The groove 69 includes an upstream end 81 and a downstream end 82 generally aligned along the rotation direction of the rotatable runner 67. The source flow 83 either enters the feed groove 70 and then flows along the groove 69 or enters and flows along the groove 69. The source flow 83 entering the groove 69 is then directed by the base walls 72 and the side walls 74 from the upstream end 81 to the downstream end 82. The axial flow of gas along the groove 69 establishes the longitudinal flow 80 therein. The floor of the groove 69 may include at least two base walls 72 whereby each adjacent pair of base walls 72 is disposed about a base shoulder 73. The base shoulder 73 facilitates a radial translation whereby the upstream base wall 72 is deeper than the downstream base wall 72. A portion of the longitudinal flow 80 may flow into the base shoulder 73 so as to interact therewith resulting in a redirection of the flow vector whereby the affected longitudinal flow 80 flows radially outward from the groove 69 as an outward radial flow 78. Each side wall 74 along a groove 69 may include one or more side shoulders 75 which facilitate an axial translation whereby the upstream width of the groove 69 is less than the downstream width. A portion of the longitudinal flow 80 may flow into the side shoulder 75 so as to interact therewith resulting in a redirection of the flow vector whereby the affected longitudinal flow 80 flows transversely within the groove 69 as a lateral flow 79. The resultant lateral flow(s) 79 and outward radial flow(s) 78 may be perpendicular to one another and to the longitudinal flow 80.

Referring now to FIGS. 28c, 28f, and 28g, one or more lateral flow(s) 79 and the outward radial flow 78 may converge after redirection by the side shoulder(s) 75 and the base shoulder 73, respectively. In preferred embodiments, convergence occurs when the side shoulder(s) 75 and the base shoulder 73 intersect along a plane which traverses a groove 69. The convergence may result in a mixing or subsequent redirection of the flow streams with or without the longitudinal flow 80 thereafter facilitating enhancement to the stiffness of a thin-film layer between sealing ring and runner.

Referring now to FIGS. 31a-38b, one or more lateral flow(s) 79 may be formed downstream and/or upstream with respect to an outward radial flow 78. In preferred embodiments, a lateral flow 79 formed via a side shoulder 75 along one side wall 74 may be directed into the other side wall 74. The resultant impingement may cause a mixing or subsequent redirection of or by the impinging flow so as to enhance the stiffness of a thin-film layer between sealing ring and runner.

Referring now to FIG. 28b, a pair of lateral flows 79 may converge after redirection by a pair of opposed side shoulders 75. In preferred embodiments, convergence occurs when the side shoulders 75 intersect along a plane which traverses a groove 69. The convergence may result in a mixing or subsequent redirection of the two flow streams with or without the longitudinal flow 80 facilitating enhancement to the stiffness of a thin-film layer between sealing ring and runner.

The description above indicates that a great degree of flexibility is offered in terms of the present invention. Although various embodiments have been described in considerable detail with reference to certain preferred versions thereof, other versions are possible. Therefore, the spirit and scope of the appended claims should not be limited to the description of the preferred versions contained herein.

What is claimed is:

1. A circumferential seal assembly comprising:
   (a) an annular seal housing disposed between a pair of compartments;
   (b) a rotatable runner;
   (c) an annular seal ring disposed within said annular seal housing and disposed about said rotatable runner; and
   (d) a plurality of groove structures disposed along an outer annular surface of said rotatable runner, each said groove structure includes a groove, said annular seal ring disposed about said grooves, a source flow communicated into said groove to form a longitudinal flow therein;
   wherein:
      each said groove includes at least two adjoining steps whereby each said step defined by a base wall, said base walls arranged along said groove to decrease depthwise in direction opposite to rotation of said rotatable runner, two adjoining said base walls disposed about a base shoulder, each said base shoulder locally redirects said longitudinal flow to form an outward radial flow in direction of said annular seal ring;
      said base walls bounded by and intersecting a pair of side walls, each said side wall includes at least two side shoulders which narrow said groove widthwise and locally redirect said longitudinal flow away from one said side wall to form a lateral flow in direction of other said side wall;
      a first pair of said side shoulders oppposedly arranged upstream from one said base shoulder whereby said side shoulders being aligned, said first pair extend into said rotatable runner to one said base wall at a first depth relative to said outer annular surface so that said base wall has a first width upstream from said first pair and a second width downstream from said first pair;
      a second pair of said side shoulders oppposedly arranged downstream from said one said base shoulder whereby said side shoulders being aligned, said second pair extend into said rotatable runner to other said base wall at a second depth relative to said outer annular surface so that said base wall has a third width upstream from said second pair and a fourth width downstream from said second pair;
      said first depth being greater than said second depth;
      said first width being greater than said second width;
      said third width being greater than said fourth width;
      said second width being equal to said third width;
      said lateral flows intersect each other and said longitudinal flow upstream from said outward radial flow;
      said lateral flows intersect each other and said longitudinal flow downstream from said outward radial flow.

2. The circumferential seal assembly of claim 1, wherein at least one said base wall being tapered.

3. The circumferential seal assembly of claim 1, wherein at least one said side wall being tapered.

4. The circumferential seal assembly of claim 1, wherein said base walls and said side walls being tapered.

5. The circumferential seal assembly of claim 1, wherein said source flow passes through an inlet along said annular seal housing and around said annular seal ring before being received by said groove.

6. The circumferential seal assembly of claim 1, wherein said source flow passes through a hole along said rotatable runner before being received by said groove.

7. The circumferential seal assembly of claim 1, wherein said source flow being from one of said compartments.

8. The circumferential seal assembly of claim 1, wherein at least one said groove structure includes a feed groove which receives said source flow and directs said source flow into said groove.

9. The circumferential seal assembly of claim 8, wherein said source flow passes through an inlet along said annular seal housing and around said annular seal ring before being received by said feed groove.

10. The circumferential seal assembly of claim 8, wherein said source flow passes through a hole along said rotatable runner before being received by said feed groove.

11. The circumferential seal assembly of claim 8, wherein said source flow being from one of said compartments.

12. A method for forming a thin film between an annular seal ring and a rotatable runner comprising the steps of:
   (a) communicating a source flow into a groove disposed along said rotatable runner, said groove includes at least two base walls interposed between and bounded by two side walls, a base shoulder interposed between two adjacent said base walls, a first side shoulder disposed along each said side wall, said first side shoulders being aligned upstream from said base shoulder, said first side shoulders extend into said rotatable runner to one said base wall at a first depth relative to an outer annular surface of said rotatable runner so that said base wall has a first width upstream from said first side shoulders and a second width downstream from said first side shoulders, a second side shoulder disposed along each said side wall, said second side shoulders being aligned downstream from said base shoulder, said second side shoulders extend into said rotatable runner to other said base wall at a second depth relative to said outer annular surface so that said base wall has a third width upstream from said second side shoulders and a fourth width downstream from said second side shoulders, said first depth being greater than said second depth,
said first width being greater than said second width,
said third width being greater than said fourth width,
said second width being equal to said third width,
an annular seal housing disposed between a pair of compartments,
said annular seal ring disposed within said annular seal housing and disposed about said rotatable runner;

(b) forming a longitudinal flow within said groove from said source flow;

(c) redirecting said longitudinal flow via interaction with said first side shoulders to form two first lateral flows upstream from an outward radial flow;

(d) converging said first lateral flows with each other and said longitudinal flow;

(e) redirecting said longitudinal flow via interaction with said base shoulder to form said outward radial flow;

(f) redirecting said longitudinal flow via interaction with said second side shoulders to form two second lateral flows downstream from said outward radial flow; and (g) converging said second lateral flows with each other and said longitudinal flow.

13. The method of claim 12, wherein said communicating step includes said source flow passing around said annular seal ring before entering said groove.

14. The method of claim 12, wherein said communicating step includes said source flow passing through a hole along said rotatable runner before entering said groove.

15. The method of claim 12, wherein said communicating step includes said source flow originating from one said compartment at one side of said rotatable runner before entering said groove.

16. The method of claim 12, wherein said communicating step includes said source flow passing through a feed groove before entering said groove.

17. The method of claim 16, wherein said source flow passes around said annular seal ring before entering said feed groove.

18. The method of claim 16, wherein said source flow passes through a hole along said rotatable runner before entering said feed groove.

19. The method of claim 16, wherein said source flow originates from one said compartment at one side of said rotatable runner.

20. The method of claim 12, wherein said converging steps enhance said thin film.

* * * * *